Figure 1:
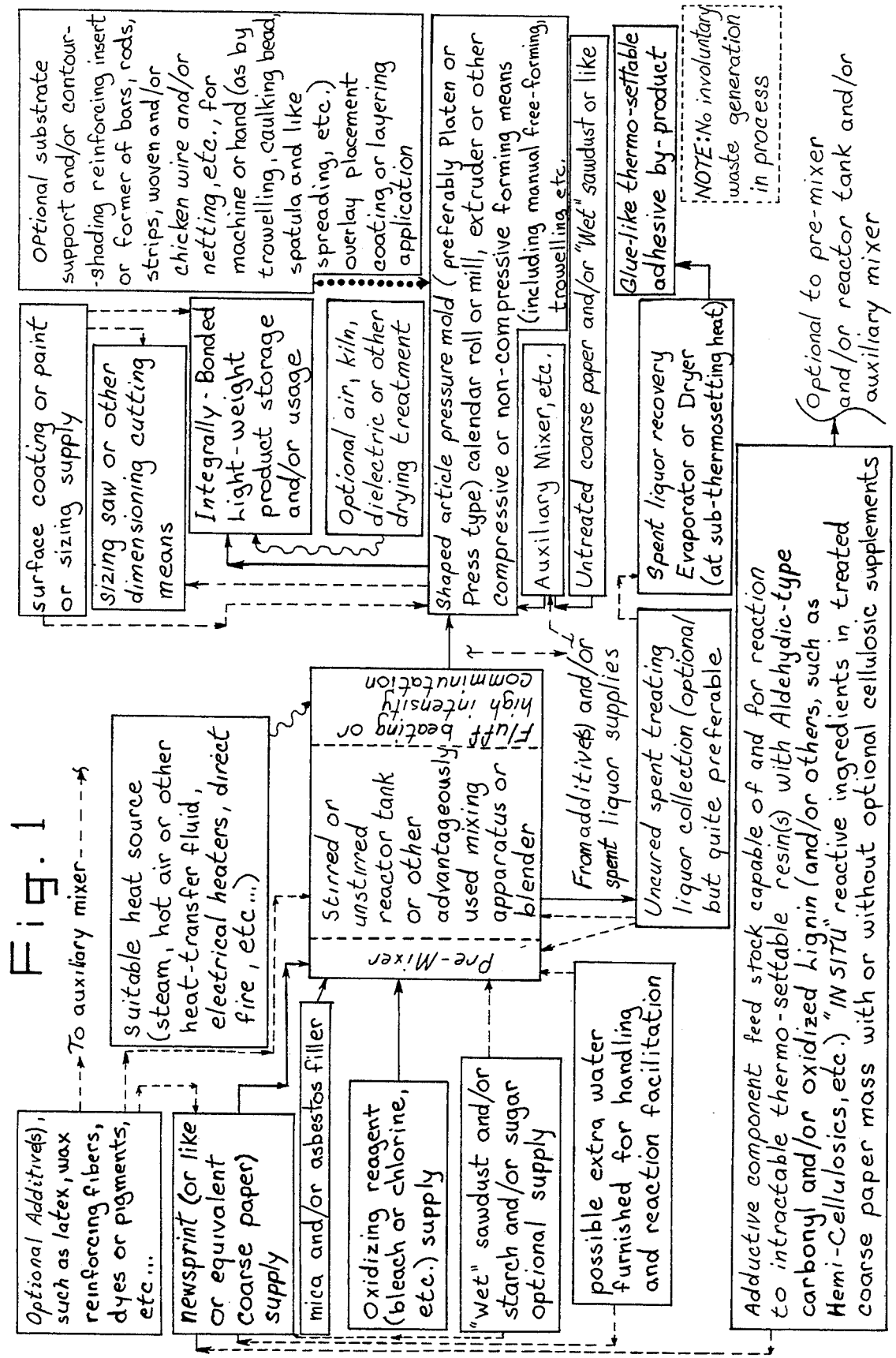

United States Patent [19]

Rudy, deceased

[11] Patent Number: 5,348,621

[45] Date of Patent: Sep. 20, 1994

[54] LOW BULK AND LIGHT-WEIGHT PRODUCTS

[75] Inventor: Norbert J. Rudy, deceased, represented by Christopher J. Rudy, late of Midland, Mich.

[73] Assignee: Coalition Technologies, Limited, Birmingham & Midland, Mich.

[21] Appl. No.: 39,509

[22] Filed: Mar. 29, 1993

Related U.S. Application Data

[60] Continuation of Ser. No. 569,517, Aug. 20, 1990, abandoned, which is a division of Ser. No. 668,709, Nov. 6, 1984, abandoned, which is a continuation-in-part of Ser. No. 464,925, Feb. 8, 1983, abandoned, and a continuation-in-part of Ser. No. 440,036, Nov. 8, 1982, abandoned, which is a continuation-in-part of Ser. No. 399,681, Jul. 16, 1982, Pat. No. 4,496,718, and a continuation-in-part of Ser. No. 212,110, Dec. 2, 1980, abandoned, and a continuation-in-part of Ser. No. 90,829, Nov. 1, 1979, abandoned.

[51] Int. Cl.$^5$ ............................................. D21H 21/18
[52] U.S. Cl. ............................. 162/100; 162/142; 162/147; 162/150; 162/158; 162/163; 162/164.1; 162/164.3; 162/181.1; 162/181.6; 162/182
[58] Field of Search ............... 162/9, 100, 147, 175, 162/163, 164.3, 164.1, 145, 181.6, 142, 158, 182, 150; 156/62.2

[56] References Cited

U.S. PATENT DOCUMENTS

| | | | |
|---|---|---|---|
| 3,434,917 | 3/1969 | Kraus et al. | 162/145 |
| 3,916,057 | 10/1975 | Hatch et al. | 162/181.6 |
| 4,007,312 | 2/1977 | Stofko et al. | 156/62.2 |
| 4,111,730 | 9/1978 | Balatinecz | 156/62.2 |
| 4,377,440 | 3/1983 | Gasland | 162/147 |
| 4,454,005 | 6/1984 | Stofko et al. | 162/81 |

FOREIGN PATENT DOCUMENTS

| | | | |
|---|---|---|---|
| 46-18270 | 5/1971 | Japan | 162/147 |
| 1129642 | 10/1968 | United Kingdom | 162/147 |

OTHER PUBLICATIONS

Krulak, V.H., Comment, "The Waste of Requiring Paper Recycling", *The Detroit News*, Oct. 26, 1992, p. 7A.

*Primary Examiner*—Peter Chin
*Attorney, Agent, or Firm*—Christopher John Rudy

[57] ABSTRACT

Composition board and various other synthetic or artificial panel and the like structures a well as manually-formable compositions of paste-like consistency for substitution as putty, caulking or molding clays, etc., all of which can be internally reinforced for better-strength structural purposes, are fabricated and made into desired strong and excellently-utile shaped article products of manufacture and the like under various forming conditions for the purpose from coarse paper starting material (viz, common "newsprint", kraft paper, cardboards, etc.) which starting material may optionally have "wet" sawdust and/or other undried cellulosic inclusions therein all of which, advantageously and economically, is converted by treatment thereof with certain non-azotizing, non-alklai, nascently-operative and -reacting strong oxidizing agents including such things as common household bleach (i.e. NaOCl) preparations and its like, more-strongly formulated or concentrated forms as well as various possible equivalents thereof and substituents therefor such as bleach powder, (i.e., $Ca(OCl)_2$), swimming pool chlorine-, bromine- and/or oxygen-releasing compounds, elemental chlorine and so forth to get a complex carbohydrate and/or lignin, etc., break-down resulting in an internally- and intrinsically-so-generated, at least partially hydrophylic, water-absorptive (i.e., actually "water-absorbing") binding material capable of converting the treated coarse paper mass upon fabrication thereof into integrally-bonded structurally-shaped product, which compositions in their preparatory make-up are filled or loaded with mica (including expanded mica) and/or asbestos to obtain very light weight and low density product articles in the usual instance. Other additaments (if so desired but not as a necessity) can also be incorporated in the involved masses such as, without limitation, other fillers, colorants, reinforcing inclusions, cross-linking "adducts" and so on and so forth to many times materially beneficiate and even yet further improve the products obtained from the mica and/or asbestos (preferably expanded mica) loaded and including converted coarse paper starting raw stock masses. Low cost shelters and housing structures, or sections thereof, are advantageously possible to get with present products.

20 Claims, 3 Drawing Sheets

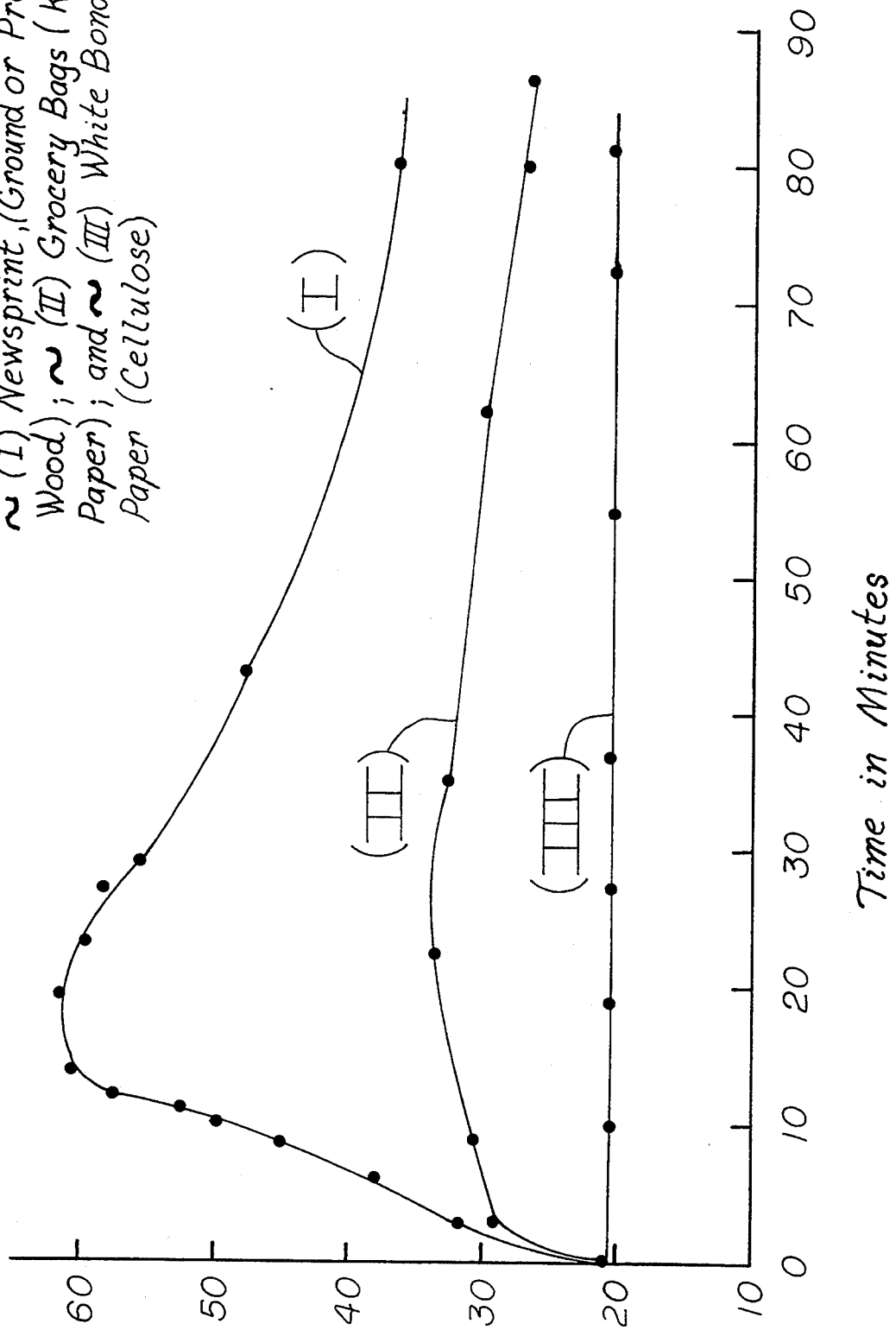

LOW BULK AND LEIGHT-WEIGHT PRODUCTS

CROSS-REFERENCES TO RELATED APPLICATIONS

This is a continuation of Ser. No. 07/569,517 filed Aug. 20, 1990, abandoned, which is a division of Ser. No. 06/668,709 filed Nov. 6, 1984, abandoned, which is a continuation-in-part (i.e., "C-I-P") of all three (3) of the co-pending applications for United States Letters Patent(s) of the present Applicant which were respectively filed: as the latest of these, Feb. 8, 1983 and having Ser. No.: 06/464,925 abandoned, which is here referred to also as "Appl'n. #5" and is entitled "COMPOSITION BOARD AND SO FORTH DIRECT FROM NEWSPRINT AND THE LIKE"; and, prior to that ("Appl'n. #4") as the next-to-latest of these, Nov. 8, 1982 and having Ser. No.: 06/440,036 abandoned, which is entitled "INTRINSICALLY-GENERATED, RESIN-BONDED COMPOSITE BOARD AND THE LIKE DIRECTLY FROM 'WET' SAWDUST AND OTHER UNDRIED CELLULOSICS"; and, yet-prior to that as the second-to-latest of these ("Appl'n. #3), Jul. 6, 1982 and having Ser. No.: 06/339,681 which is now U.S. Pat. No. 4,496,718 (Jan. 29, 1985) and is entitled "INTEGRALLY BONDED COMPOSITIONS OF CELLULOSICS AND PRODUCTS THEREOF DIRECTLY FROM WET SAWDUST AND THE LIKE" (with said "Appl'n. #5" being a continuation-in-part of said "Appl'n. #4" and that (viz., "Appl'n. #4") in turn being a continuation-in-part of said co-pending "Appl'n. #3") so that and accordingly this instant application is likewise and in order (as are said "Appl'ns. #3, 190 4 and #5) another and still-additional descender continuation-in-part of now-abandoned ultimate Parent Applications, the latter of which ("Appl'n. #2") having been one entitled "INTEGRALLY BONDED CELLULOSIC COMPOSITIONS AND PRODUCTS DIRECTLY FROM WET SAWDUST AND THE LIKE" which was filed Dec. 2, 1980 and bore Ser. No.: 06/212,110 and which, in yet-further-turn, was a continuation-in-part of also now-abandoned and the first-Parent Application ("Appl'n. #1") entitled "INTEGRALLY BONDED WOOD COMPOSITIONS AND PRODUCTS DIRECTLY FROM WET SAWDUST" which carried Ser. No.: 06/090,829 and was filed on Nov. 1, 1979, abandoned.

The totalities of the entire contexts, subject matters, revelations and disclosures of each, every and all of said "Appl'ns. #1, #2, #3, #4 and #5" are herein and hereinafter fully referred-to, included as if herewith written out and completely-incorporated by reference so as, in effect, to make and become an integral and intimately-associated part hereof and, in particular, the following Written-Portion of the Specification of the instant Application.

BACKGROUND OF THE INVENTION

There is and continues to be encountered an ever-increasing, voluminous demand for "ersatz" or substitute wood-based, conventional plastic(s) and/or thereof-derived products for utilization in place of boards, sheets and other cuttings and constructional sizings of normally-sawn or usually-milled lumber and various sorts of timber wood stock(s) as well as variously-shaped and -fabricated articles of plastic(s) materials. The same applies to many other forms and end-use preparations of large numbers of goods and products other than those that are structural building, insulation, sound-proofing and the like purposes. Free- and irregular-form configurations useful and/or needed for many purposes are includable in the latter types of oftentimes rather important manufactures.

This, as it now has been for many decades, remains so as to such modernly-common products as plywood, composite board (of either a standard grade which is not particularly intended or adapted for outdoor or exterior usages or the so-called "tempered" board which has marked water- and/or moisture-resistance and is frequently employed where resistance to the damp and weatherability are factors influencing its durability and attractiveness for being selected to use). Light-weight insulating, sound-deadening materials for covered, over-laid or otherwise sheathed and enclosed building arrangements fall within the broad range of such products. The same applies to those insulating, sound-damping and/or other structurally-functional materials are made with decorative and appealing surface features and appearances to adapt them for exposed installation whether in indoor or outdoor, or both, situations of application.

The product known and commercially-available as "MASONITE" {Reg. TM} is an excellent example of high quality, high strength and well-dimensioned composite hardboard which finds wide usage in replacement of typical lumber for constructional purposes; generally at least meeting and frequently exceeding the qualities of equivalent and/or replaceable conventionally-milled timber stock (viz., that sawed into beams, planks, boards, etc., of convenient sizes) insofar as concerns its characteristics and properties as a material of construction. Notwithstanding, "MASONITE" does tend to be a relatively-heavy product with a density that usually is at least that of natural wood. Another good synthetic structural building board product (generally of a much lighter nature than is "MASONITE") is that commercially-available under the Trade-Designation "Super 440" which is obtainable from the HOMASOTE COMPANY of West Trenton, N.J. 08628.

Thus and co-relative with the foregoing, there is being acutely-experienced a growing requirement and more pressing demand for low-bulk and light-weight products imbued with the indicated characteristics and, especially in connection therewith, wherein the same also insulate excellent thermal insulating properties.

Good evidence of this is to be found as a well-established thing in and from such a prestigious Reference Source as the Kirk-Othmer Publication (more-fully cited infra) in Volume 13 thereof at Page 597. Another indication of more recent analogous import is to be found in CZECHOSLOVAK Patent No.: CS 192,139 dated Jan. 31, 1982.

The above-indicated capabilities in goods and products of the mentioned characterization is not only of great interest for the fabrication of pre-formed board- and slab-like structures (such as in "MASONITE", "Super 440" and their likes and equivalents), but in and for compositions and resulting constructions therefrom that are more-or-less freely-formable, without the scope of conventional molding, pressing and calendaring operations, by hand or with the aid of spatula-like implements, trowels (including those of the varieties known as: "garden"; "curbing"; "corner"—especially "outside corner"; "guttering"; "pointing"; "brick"; "plastering";

"circle" or "inside cove"; and "radius"), knives and scalpels or other knife-like devices; scrapers or "chasers" and the like; pottery-forming implements and elements; and so on and so forth.

Some good evidence of what is currently-occurring during the present time period to drastically-escalate the costs and prices of normal, natureal lumber goods and derivatives thereof such as paper products (including coarse papers, carboards, etc.) therefrom, at least in the UNITED STATES OF AMERICA, is revealed and somewhat spelled out in the Article entitled "TROUBLE IN TIMBER COUNTRY" which occurs at Pages 30-32, inclusive, of the Dec. 13, 1982 Edition of INDUSTRY WEEK.

At least for newsprint recycling and analogous paper product manufactures (including cardboards) from reconstituted goods, a noticeable increase in paper and cardboard recovery activities for the purpose has been seriously undertaken. This is evident even in such parochial and provincial reports thereabout as appeared at Page A6 of the Publication entitled SAGINAW COUNTY (MICHIGAN) *WEEKLY*, a local Newspaper, which appeared thereat in the Tuesday, Nov. 19, 1982 Edition thereof in an Article entitled "*Group Creating Jobs Out Of Ordinary Trash*".

The use, additionally of waste paper (especially of the "coarse grade" as hereinafter more fully characterized) and/or cardboard and or sawdust as a fill for various adhesively-bound—including usages of plastics materials to contain and provide cohesion for the filler—or otherwise integrated products in which the indicated materials are substituted for other possible filling constituents seems, at least on-hand, to consitute logical possibiliy(ies) for getting at and pragmatically circumventing the indicated problems. In fact, a fair amount of work has been done and activity expended along this line.

There are, however, several significant and deleterious difficulties and drawbacks involved in heretofore-known attempts to product wooden-like or resembling articles from waste paper, cardboard and so forth, as well as from sawdust, especially as those commodities perforce have been utilized in prior practice. These include the facts and circumstances that:

(1). Coarse paper goods, including such items as newsprint, kraft paper, cardboard and so forth and whether or not in virgin and as manufactured or waste form(s) are not particularly amenable in any normally-as-obtained condition and structure to be directly utilized as a filler or loading material for incorporation into and integration by and with typical and conventional sorts and varieties of resin and/or plastic(s) binder systems and the like. This, of course, contemplates obviously different treatment and reconstitution of waste paper, etc., in conventional "recycle" reclamation procedures in which the waste paper is simply used to replace or extend fresh wood or other vegetable fiber pulp or stock in a more-or-less standard paper-making procedure. For resin-binding applications, however, waste paper and the like is extremely difficult to handle and mix—even with intensive-mixing apparatus—with binder systems whether or not the paper stock is used directly-as-is in normally-flat and usually rather-thinly planar sheet- or web-like form(s); this being so even when the coarse paper stock is shredded or otherwise comminutated (as, for example, to be subdivided and size-reduced by shredding, cutting, confetti-making and equivalent or analogous techniques into strips, squares, circles, etc.) or, as may be attempted, crumpled or subjected to the like sort of physical distortion and form-transfer(s) of the sheet stock for material handling purposes. In other words, there is typically and ordinarily no easy achievement of interblending paper goods (excepting for true laminate constructions) into homogenous and uniform masses with most common binding agents. The relative "dryness" or parched condition of most coarse paper stock also adds to the complexity and difficult of this, as can be readily appreciated. Along this line, the moisture content of most coarse paper goods usually lies in the 7 or 8 to 10-12 percent of actual (taken on total weight) moisture (i.e., water) content range; with something on the order of 9 or so %, by way of illustration, being common for the usual either fresh or waste newsprint(s).

(1'). Explicitly more specifically-informative of the immediate foregoing in connection with paper(s), its (and their) manufactures, and the recycling thereof additional reference may be had to said Kirk-Othmer Publication (cited completely infra) in: Volume 16, Pages 768-770 and 773, inclusive; Volume 19, Pages 392, 395-397, 408, 409, 416 and 417, inclusive; and Volume 19, Pages 941 and 986-991, inclusive thereof.

(2). As to situations wherein sawdust (or equivalent comminuted cellulosic) particles are employed—which typically and usually, despite the fact that exceptions to and variances from the indicated normality, have and are of particulated dimensional characteristics which are on an average particle size reckoning that is ordinarily not much if any more than the No. 10 Size, advantageously less than the No. 12 Size, in the U.S. SIEVE SERIES—must be dried prior to the previously-developed utilizations thereof so as to have an already-standardized and -established maximum moisture content that is between about 3 and about 15 weight percent (i.e., "wt. %"). Now then, "wet" sawdust and the bulk of its equivalent comminuted cellulosic natural plant or "vegetable" counterparts as from undried tree cuttings and other sources (depending on particular species taken and, to some extent, involved location and Season of the taking) has a natural moisture content of from about 40 to about 100 wt. %; a fair average for this being in the neighborhood of 60-70 wt. %. In this connection, the indicated wt. % ranges must be understood and accepted in accordance with the common terminology and definition applied in the trade for given moisture content in such materials. Accordingly and as regards at least "wet" sawdust, the 100% moisture content level is one which, when equated to an absolute relative constituent parts by weight (i.e., "pbw") basis, means 100 parts of the sawdust and its associated contents as contained in the wood wherefrom it is obtained and 100 pbw water. In other words, the moisture content given is based on that percentage of water in the composition based on and compared to the content of the remaining non-aqueous content(s) of the wood (or the like) from which a given "wet" sawdust lot has been obtained. It is thus readily deducible that (by kiln-drying or the like oven-heating procedures), in order to prepare conventionally-suitable, Specification(s)-meeting, filler-grade sawdust, it is necessary to remove from the "wet" sawdust anywhere from about 97 wt. %, as a maximum, to 35 wt. %, as a minimum, of the original water content of the "wet" starting material to be converted into or incorporated in some sort of desired product. The heat energy required for such water ridding of and from the "wet" sawdust or the like is, quite obviously, enormous; with the expense of same, especially under current conditions and factors of cost for typically-employed fuels, tending to attach almost prohibitive aspects thereabout and thereto.

(3). Binding of dried sawdust and the like wood- or other vegetable-based filler has only heretofore been with relatively expensive and more or less complex and technically-demanding binder systems, including plastic or resin binders. In illustration of this, reference may be had to the complicated and not uncostly nor uneasy technology involved for such purposes as is disclosed, inter alia, in U.S. Pat. Nos.: 1,642,846; 2,645,587; 2,851,730; 3,309,444; 3,391,038; 3,493,527; 3,554,941; 3,560,255; 3,649,442; 3,787,344; 3,790,401; 3,806,562; 3,956,541; and 4,165,409. As a basically-different curiosity (for present purposes) relating to lightweight brick of clay, sawdust and mortar, see the excerpt identified as "Fin-Times 12-1718, Page 11, CKAR" which appears at Page 12 of the "TECHNICAL SURVEY" for Dec. 23, 1978. Note also Page 1,548 of the "RUBBER HANDBOOK" (40th Ed.). A recent typical illustration of the state of the art involved in the binding into fabricated shaped articles of cellulosic materials is to be found in the March 1982 Issue (at Page 82 thereof) of the INTERNATIONAL HARVESTER News (a House Organ known as "THE FURROW") which describes the use of dyed straw pressed together into decorative useful objects using resin for the cohesively-binding purpose. Another somewhat-remote state-of-art Article of iterest is entitled "Corn Starch: A Low-cost Route To Novolac Resins" by John P. Mudde appearing at Page 69 of "MODERN PLASTICS" for February 1980.

(4). Further to the sort of art mentioned in the above Item (3), reference may be had to the rather comprehensive explanation of various particulated wood products to be found in the 3rd Edition (as well as in earlier complications) of the aforesaid famous Kirk-Othmer "ENCYCLOPEDIA OF CHEMICAL TECHNOLOGY" published by John Wiley & Sons, Inc. of New York City. This authoritative source provides definitions of hardboard, particle board, "MASONITE" (Reg. TM), insulating board, the so-called dry process board, composition board and so on and so forth; including good descriptions of the method(s) of their respective manufacture—all of which depend more or less on the inclusion and effect for binding of various synthetic resin adhesives. It is noteworthy to observe at Page 377 of Volume 22 of said 3rd Edition the expression as a generality that "wood is seldom used where resistance to chlorine and hypochlorite solution is required".

(5). Additional art of interest illustrating plainly contrastive and diverse techniques for the surface adhesion of and between veneers and/or equivalent layers of pre-formed and already-dried wood and/or wood-based structures (whether or not prepared from particulated starting materials) may be found in U.S. Pat. Nos.: 4,007,312 and 4,183,997 which depend for the already-shaped article surface cohesion effect primarily on employment of certain catalysts and conduction of the procedure under generally non-alkaline (or, at least, not pronouncedly alkaline) conditions for the particularized laminating operation which is not adapted to bind together for fabrication into desired structural forms any comminutated and "wet" starting cellulosic materials.

(6). Other art, remotely involved, having no particular bearing on the binding of coarse paper whether or not extended with "wet" sawdust, per se, and/or its comminuted raw cellulosic likes and equivalents in undried or substantially undried condition and form (e.g., meaning with respect to the latter that most if not all of the natural water in the "wet" sawdust, etc., particles being treated remains there at the beginning of the integrally-bonding fabricating procedure) includes U.S. Pat. Nos.: 2,187,016; 2,676,884, 3,536,578 (dealing, by way of particularization, with the addition of an oxidizing agent not reactive with starch to a paperboard material which is sized with starch); 3,859,108; 4,107,379; and 4,234,658 (the last-identified, for example, dealing with the bonding of subdivided wood or bark (somewhat analogous to wood, etc., pulp for paper) with an adhesive made up of ground-up foliage that has been treated with formaldehyde).

(7). Additionally, the prior art (besides requiring, as has been noted, use of dried sawdust or the like) has almost invariably aimed itself at the capability and desideration of providing: "super"-(as it were)-type goods having high-quality and literally impeccable characteristics as an essential; very good finish and tolerance potential(s); and high strength in the finished, fabricated sawdust and the like or at least analogous particles which are bonded together into composites (such, by way of repeated illustration, as the well-known and already-referred-to phenol-formaldehyde and/or urea-formaldehyde resin-bonded chip and/or particle board and similar manufactures that have gained widespread acceptability and usage in the market).

Despite all above-mentioned and additional which is utilized in and/or known to the art, the possibility of direct usage of coarse paper and/or its likes or equivalents for answer(s) to and solution(s) of the indicated problems appears to have been inadequately addressed and not satisfactorily resolved. This seems to be the case notwithstanding the enigmatic fact that there is a literal super-abundance of coarse paper goods, as well as "wet" sawdust and the like or equivalent fibrous plant cellulosic materials in current available and largely non-utilized supply. In many locations, waste newsprint, kraft paper and cardboard as well as "wet" sawdust and/or its suitable alternatives can be had for no or little more than handling and/or shipping charges; being unfortunately (and distressingly to possessors thereof) in not great demand. Furthermore and of increasingly significant moment insofar as concerns waste paper and such things as "wet" sawdust and the like utilization or beneficial disposal or application, environmental restrictions in many locales now prevent burning for fuel purposes (especially on an industrial basis) of such materials.

And, along with these deficiencies, lacks and drawbacks nothing in applicable prior art appears to realistically concern itself with nor suggest, teach, lead to or provide the instantly-contemplated, unique and estimable compositions and products derived and produced directly from coarse paper or the like in the way so crucially direct and indigenously advantageous as in the present contribution to and advance in the art.

FIELD AND PURVIEW OF THE INVENTION

The present invention concerns itself with advantageous and novel compositions and shaped article product derived directly therefrom from and with coarse paper starting raw material stock which are: readily and easily prepared throughout all phases and steps of manufacture; of good and reliable consistency; characterized in having exceptionally-attractive low-bulk and light-weight features and properties as well as, in further enhancement of the general desiderations of same, being both exceptionally good insofar as concerns their thermal- (including at relatively high temperature) and-/or sound insulating capabilities and particulars; adapted to be made into desired shaped and/or applied article form by conventional molding, pressing, extrusion and the like or equivalent techniques and/or, for many advantageous and desirable applications, also conveniently and beneficially shapable or formable for desired object or other applied provision by hand or with manually utilized tools much in the same manner as plaster, cement, pottery clay(s), caulking, etc.; dependable for performance in and for appropriate applications and workings thereof and therewith; and, generally, quite worthwhile and very pleasing with regard to various utilities and adaptabilities for many things and applications when measured against and in comparison with comparable, heretofore-known, wooden-bonded or -filled compositions and articles (or analogues thereof from paper stock), including composition board(s), plasters and mastics, staturary and pottery clays, caulking(s) and so on and so forth.

The shaped article products of the present invention resulting from the compositions thereof and their method of manufacture are, as indicated, especially well adapted (although by no means limited thereto) to more-or-less "free-forming" fabrications and applications (wherein and whereby, as is evident to those skilled in the art, mechanical and machine implementations for shaped article product realization is not relied upon). In this (as well, of course in product formulation(s) with moldings, compressions, extrusions and their likes or equivalents) it is oftentimes optionally advantageous and of great benefit—at least strength-wise—to the resulting article of manufacture being made for use to incorporate in the form being made some sort of suitable substrate support (and/or alternatively, skin or laminate covering) and/or actual contour-forming and/or -shaping insert or "former" such as, without limitation thereto: metal, plastic or otherwise compositioned (such as in fiber constructions) bars, rods, strips; woven and/or the so-called "chicken-wire" and/or netting(s) of metal or other material(s) of construction, etc., for hand or even machine formation(s)—as by trowelling, caulking bead or the like, spatula or trowel and the like spreading(s), etc., overlay placement(s).

More specifically (but without any confinement or restruction thereto), the more predominant and advantageous aspects and good portents of the instant invention include the provision(s) of:

(i). A water-based composition that has and exhibits the unusual property of literally not (or, at most, hardly and to a very minuscule degree, if any) shrinking and/or contracting upon drying or being dried, this generally resulting upon and after final drying and finishing of the preferred composition of a dry, strong, composite product (especially one in shaped article from whether machine- or manually-made) with the desirable light density and thermal insulation value in the range(s) of those associated with conventional balsa wood (i.e., that from the tropical AMERICAN tree known as *Ochroma lagopus*);

(ii). A clay- (or putty-)-like composition that is kneadable or masticatory in nature and shapeable by hand or the like and, further, bakable under relatively mild conditions of applied heat at elevated temperature to yield finally-formed and shaped, fabricated articles and objects that have a density on the general order of only about $\frac{1}{8}$ to 1/10 that of ordinary and conventional-weight clay products;

(iii). A novel sort of hand-, gun- and/or otherwise machine-applicable caulking compound or composition which, upon drying after desired placement, becomes an effective thermal seal and insulator and exhibits a very low density as compared to that of presently-known commercial caulking materials which, typically, is on the general order of only about 1/5 to 1/10 of the latter;

(iv). A spreadable composition which does not run or sag, or either, when provided internal support therefor (such as chicken wire, mesh or the like or equivalent metal or other reinforcement) and, after its application, dried in reasonably and acceptably short order without mandatory external application of heat to yield a firm and solid finished surface, which composition, inter alia, has great utility when applied by the technique of coating of layering it over some suitable sort of open or foraminous reinforcement and holding support for the preparation of various art, novelty and utilitarian craft products such as, by way of illustration, statuary, bird and other animal feeders, bird cages and the like, and so on and so forth as well as for cores for other structures for additional subsequent protective and structural coverings for which such composition-coated core or shell constructions provide a substrate base and/or internal framing, as it were, for said subsequent overlay of cement, plaster, plastic (thermoplastic or thermosetting), etc., in order to furnish shelters and housings for people, domesticated (including farm) animals, storage and so on and so forth;

(v). Structures and shelters analogous to but somewhat more sophisticated than some of those described in the above Item (iv) which are suitable for such things and fulfilments as low-cost and other housing and structures and dwellings which provide adequate protection from the elements (including sun, wind, rain, cold, snow, heat, dust, etc.) and which, in basic essence, consist of, say, a light or otherwise preliminary framework (done and made in the conventional manner and way) over which chicken wire or like or equivalent mesh or net or metal lath or the like reinforcing is positioned (which, as is above indicated, may be of materials of construction other than metal) so as to form the construction core or shell for the final structure being made over which is spread, coated and/or shaped to a thickness in inch Measure of, for example, between about $\frac{1}{8}$" and about 1" or so of an aqueous-based, self-drying (or easily-driable) composition or readily-spreadable and/or -coatable character prior to drying that is in accordance with those of the present invention;

(vi). A trowelable or equivalently-spreadable and -applicable material or composition product which, when dry (by self-drying or with assistance of applied external heating) forms and lends an extra layer of thermal (as well as sound) insulation which is suitable for post-insulating and after-covering existing housing and other structures which composition product, for example as one of those in accordance with the present invention, is comprised of expanded mica or a related inorganic filler bonded by bleach-treated newsprint and/or other equivalently-modified coarse paper; and/or (vii). Construction or composite board type of fabricated articles of manufacture (which, optionally, may also contain internal reinforcement(s) and/or be of "sandwich-type"—i.e., having surface skin layers or veneers thereon and thereover) made in general pursuance with the known techniques for such fabrications involving, amongst other Steps, pressing or molding, dying, etc., of a composition in accordance with the present invention that is suitable for and adapted to the purpose, which products are also attractive because of and characterizable by their exceptional lightness and relatively low-density features and which, also likewise, exhibit very desirable and advantageous qualities of heat- and/or -sound insulating qualities and capabilities.

The achievement and provision of all indicated are amongst the principle aims and objectives of the invention; with even more and additionally other benefits and advantages derivable in and from present practice and embodimental possibilities appearing and becoming more evident in the ensuing description and Written-Portion of this Specification.

SUMMARY OF THE INVENTION

The present invention, in its genesis and unexpectable evolution and as derives from the founding discovery on which it is based, broadly pertains to highly-improved, advantageous and unprecedented, optimumly-prepared and quite (in essence and substance) pragmatic, integrally-bonded, wood-like and composition board and the like-resembling or alternative manually-formable putty- and clay-like masses and products prepared from coarse paper stock, such as newsprint, kraft paper, cardboard, etc., (often beneficially pre-"fluffed" or beaten) by chemically-involved transfer thereof into intrinsically-self-binding masses that are shapable and workable compositions readily utilizable in the manner of plaster, etc, and, also which are readily formable into boards, planks, slats and other desired shaped article configurations under the influence of at least self-curing aging but, usually in the latter instance with greater advantage, by subjection of same to the influence of suitable heat at an elevated temperature and, most advantageously (although not absolutely necessary) under a satisfactory consolidating pressure applied by any one of several suitable means to achieve final density desiderata in the finished article of manufacture.

In many instances, it is beneficial and useful to extend or mix (either at commencement or in later stages of preparation) the coarse paper stock that is utilized with a "wet" sawdust and/or the like undried plant cellulosic (which usually, as indicated, contains from 40–100, or so including more or less, wt. % water) in and for the provision of the intrinsically-self-binding masses involved. A pre-beating or "fluffing" treatment (which diminishes apparent bulk density) is also frequently very helpful.

The coarse paper stock(s) employed, whether or not extended by or mixed with "wet" sawdust or the like or equivalent starting stuff supplements (and whether or not pre-beaten or "fluffed"), by treatment under suitable conditions with an openable and effective strong and nascently-active, non-azotizing, non-alkali oxidizing reagent, has/have the potential to be converted by in situ-provided, intractable resin-making transformation of at least a portion of the coarse paper, etc., starting materials into a resin-providing constituent (or, and much more accurately, a myriad mixture of intra- and self- or otherwise-reactable resin-providing components) that more-or-less are in the nature of aldehydic carbonyl compounds and/or oxidized lignin derivatives and/or oxidized hemi-cellulosics (much of which entire transformed mass is also likely to be at least partially carboxylated reacted ingredients along with other naturally-contained components of coarse paper(s) as well as other undried plant cellulosics, such as "wet" sawdust, when such are involved in the coarse paper mass being treated.

To facilitate the reaction between the indicated type(s) of strong oxidizing reagent and the cellulosic, hemi-cellulosic and other carbohdrate ingredients along with lignin(s) in coarse paper stock utilized in the practice of the present invention, it is generally desirable to add some measure of water for such purpose to the starting material. This depends to large extent on the particular oxidizing reagent or mixture of same being utilized. In situations wherein "wet" sawdust or the like or equivalent undried and essentially non-demoisturized plant cellulosic material(s) are included in beginning or subseqent stages of treatment of the coarse paper stock(s) being treated, the purposive provision of water may frequently be regulated or adjusted in accordance with the moisture content of the added "wet" sawdust and the like taking into account in this the relative proportion(s) of coarse paper stock(s) and "wet" sawdust in the then-combined mass undergoing treatment and/or to what extent and degree a "paste-like" working composition material form is wanted.

Additional to "wet" sawdust and the like undried plant cellulosics, it may also be frequently very beneficial to yet further include in the coarse paper stock(s) being treated some proportion, a an optional additional componential supplement, of other lower carbohydrate materials typified by various of the available (some more common than others) starch(es) and/or sugar(s). These oftentimes tend to enhance and contribute materially to the desired intrinsic and in situ resin-generation and -provision in the coarse paper stock(s) undergoing treatment (this being applicable whether or not any supplementation of the reaction mass with "wet" sawdust or the like is done.

In any event, the internally-generated and intrinsically-made resin-providing ingredients resulting from the oxidizing reagent treatment tend or seem to exhibit a more-or-less pronounced capability of utilizing to at least some extent the water of the coarse paper reaction masses involved (whether or not supplemented or handled and made up into admixtures of coarse paper stock(s) with "wet" sawdust or the like and/or starch(es) and/or sugar(s) due to apparently inherent, to greater or lesser extent(s), hydrophilic propensities or analogous behaviorism(s) that are at least quasi or pseudo in such nature or proclivity if not strictly mechanistically so from a fundamental or puristical viewpoint.

Quite often it is also still-additionally advantageous and beneficial to include in the coarse paper reaction masses being treated (whether or not pre-"fluffed" and-/or whether of entirely coarse paper stock or in any of the indicated possible admixtures with "wet" sawdust and the like and/or starch(es) and/or sugar(s)) or shortly after if not coincidental with termination of the oxidizing reaction treatment with a completing addition to the coarse paper stock(s) so-treated resultant stuff(s) to render same even more in the nature of a thermo-settable material for fabrication of an intimately-incorporated, interplended adductive component (or "adduct", as it were) feed stock which is capable of and for reaction to an additionally intractable, thermo-settable complex and largely nondescript bonding resin form and substance with and upon the first-formed resinous ingredients in and of the treated coarse paper(s) mass which, as indicated, is a further reactable and additionally-chemically-combinable stuff. Phenol (also known as carbolic acid, phenic acid, phenylic acid, phenyl hydroxide, hydroxybenzene and oxybenzene), urea (also known as carbamide and/or carbonyldiamide) and certain of its derivatives, melamine, etc., as hereinafter more-fully illustrated are usually very satisfactory "adduct" components for such purposes. The benefit of "adduct" usage is sometimes more noticeably appreciable and apparently magified when the treated coarse paper stock reaction masses (or starting stuffs for purposes of "adduct" incorporation) contain some relatively significant quantity of "wet" sawdust and/or its undried cellulosic likes and equivalents.

The foregoing capitulation of the present invention, all in primary and elementary pursuance of same, is to at least some essential extent more explicitly set forth and delineated in the following, hereto-appended Claims; all of which are here reitterated and incorporated by reference.

More elaborate explanations of what is involved in the practice of the present invention along with expanded description(s) and identification(s) of suitable materials for utilization; as well as working proportional details, preparation conditions and operating and practicing means and parameters, as well as other significant specifics and revelation details of the invention, are also set forth and elucidated and emphasized in the following description and Specification.

COMPONENTIAL INGREDIENTS FOR THE INVENTION

As is evident in the foregoing, successful practice of the present invention is primarily and essentially (initially and preliminarily) dependent in and on the outsetwise reaction between (or inter-reaction and/or inter-combination of) certain carbohydrate materials and substances and very strong oxygen- and/or chlorine-providing and/or -releasing agents and the like. The action of these strong reagents on both wood and wood derivatives and the like or equivalent higher molecular weight carbohydrates as well as (and sometimes with even more pronounced or at least noticeable effect) on the lower molecular weight carbohydrate forms (such as starches and sugars and hemi-cellulosics) as well as lignins, etc., tends to literally open-up, tremendously degrade and break apart the carbohydrate ring structure(s) involved and transform lignins, hemi-cellulosics, etc. into literally innumerable chemical reactants, intermediates and bonding-agent sorts of derivative adhesive materials that tend to be or at least so somewhat appear (if not exceptionally as may occur and be observable) hydrophilic in nature. These, then, regardless of inherent basic capability of water "take-up" in whatever coarse paper stock(s) masses that may be involved and to whatever extent such phenomenon actually occurs, in one or another (and often in a combined) way possibilitate by inherent adhesion-promoting resin or binding-constituent provision in the mass being handled the realization of manufacture of the above- and hereinafter-also-detailed and -mentioned types of "rough", "ersatz" wood-like and -resembling compositions and products as well as many of such that are much beeter than "crude" final form quality.

Now then, and as a well-known relative generality, carbohydrates (including the starches and sugars) are amongst the most abundant constituents of plants and animals wherein they serve many useful functions. They are a source of energy and they form the supporting tissues of plants and some animals in the same way that proteins find utization in and by the majority of animals. With considerable liklihood about it, they are the biological precursors of the other two important vegetable constituents, viz., proteins and fats. Their name is derived from the fact that many sugars have the empirical Formula: $C_nH_{2n}O_n$ or $C_n(H_2O)_n$. Hence, the French applied thereto the name of "hydrate de carbone" from whence comes the appellation carbohydrate; and that name has been retained even though it is not truly descriptive of the actual material and chemical nature of the substances.

Carbohydrates are systematically classified as: monosaccharides; di-, tri- and tetra-saccharides (oligosaccharides); and polysaccharides. Practically all the monosaccharides that occur in nature contain five or six carbon atoms. These, respectively, are known as pentoses and hexoses. They are colorless, crystalline substances possessed of a generally sweet taste. The disaccharides, which are condensation products of two hexose or pentose units, resemble the monosaccharides in taste, color and solubility. The polysaccharides are tasteless, amorphous, insoluble substances of the type Formula: $(C_6H_{10}O_5)_n \cdot H_2O$ or $(C_5H_8O_4) \cdot H_2O$, in another formulation, wherein for all of which "n" is known to be large, oftentimes having a numerical value that is greatly in excess of 3,000*. They are converted, on hydrolysis, to $C_6$- or $C_5$-characterizable sugars, as are the simple disaccharides. Cane sugar (sucrose) yields two $C_6$-type sugars, namely glucose and fructose, per the Equation:

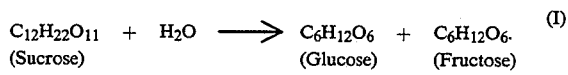

$$C_{12}H_{22}O_{11} + H_2O \longrightarrow C_6H_{12}O_6 + C_6H_{12}O_6 \quad (I)$$
(Sucrose) (Glucose) (Fructose)

*FOOTNOTE:—It is to be noted and given comprehensible account that, quite frequently in chemical structure formulae, the symbolism "(—)· H₂O" is oftentimes intended and taken to mean and represent crystal water in the molecule which is easily driven out and/or removed by and upon drying. However, when such carbohydrate structures as $C_6H_{12}O_6$ are given, the involved end groups in the molecule are obviously from the —OH and —H radicals. Hence, in the above-given Formula, the $(-)_n \cdot H_2O$ structure refers to the —OH and —H end groups insofar as concerns the "H₂O" inclusion therein.

Another excellent Reference source which includes very enlightening information as to various sugars and sugar forms, inter alia, as well as chemical reactions (including oxidations) thereof is the work by Albert L. Lehninger entitled "BIOCHEMISTRY" (1978 Edition) as that is available from Worth Publishers of New York City, as at Pages 258 and 259 thereof.

In general, but with some exceptions, carbohydrate materials are essentially either of a water-soluble or water-insoluble nature (although the latter may be dispersible or suspendable in aqueous medium). Usually, such carbohydrates as starches, sugars and glucosides are water-soluble; notwithstanding that with starches they need not so be but are sometimes of a more truly-descriptive colloidally suspendable nature when put into water.

Typical simpler sugar types of carbohydrates include the following (in which structural depictions it must be taken into account, strictly speaking, that pyran is not a sugar but is a precursor with the classical basic ring formation for sugar(s) which is actually devoid of the ring-attached substituents typically found in the true sugar compositions):

It is to be noted and given comprehensible account that, quite frequently in chemical structure formulae, the symbolism "(—).H₂O" is oftentimes intended and taken to mean and represent crystal water in the molecule which is easily driven out and/or removed by and upon drying. However, when such carbohydrate struc-

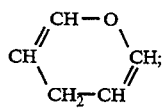

Pyran (II)

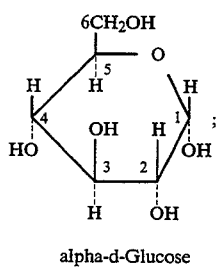

alpha-d-Glucose (III)

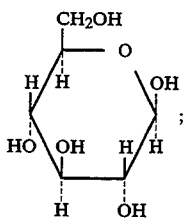

beta-d-Glucose (IV)

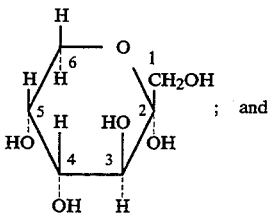

alpha-d-Fructose (V)

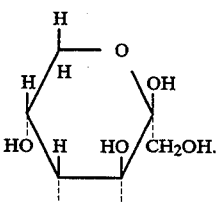

beta-d-Fructose (VI)

The synthetic methylglucosides resulting from the acid-catalyzed action of methanol on glucose exemplify a type of compound of abundant occurrence in plants. These are acetals (comparable to methylglucosides) and are derived from the combination of various hydroxy compounds with various sugars. They are designated specifically as glucosides, mannosides, galactosides, etc.

The group, as a whole, is described by the generic name glycoside. When a sugar is combined with a nonsugar, the latter is described as an aglycone. When the second group is also a sugar unit, the combination is a di-, tri-, or polysaccharide. The glycosides are hydrolyzed by mineral acids to the sugar and the aglycone. For instance arbutin, a glycoside obtained from the bearberry (*Arbutus uva ursi*), yields glucose and hydroquinone on hydrolysis:

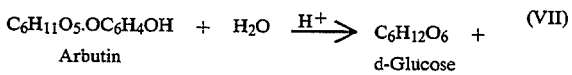

(VII)

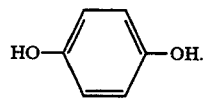

Hydroquinone

Glucose is the most common sugar component, but several interesting sugars occur only as glycosides.

Disaccharides can be regarded as glycosides in which the "aglycone" is a second monosaccharide unit. They resemble the monosaccharides in that they are very soluble in water and have a sweet taste. Only three occur as such in nature, sucrose (cane sugar), lactose (milk sugar), and maltose, and the latter is only occasionally found free. Disaccharides are encountered frequently as glycosides: gentiobiose from amygdalin is one example. Two disaccharides, maltose and cellobiose, are important because they are hydrolysis products of starch and cellulose, respectively. Since they can be obtained in high yield, they are evidently fundamental building units of these complex polysaccharides.

Sucrose on hydrolysis with acids or the enzyme invertase (plants, yeast, animals) yields d-glucose and d-fructose in equal amounts. The mixture of two hexoses is known as "invert" sugar because it is levorotatory whereas sucrose is dextrorotary. Honey is largely invert sugar, i.e.:

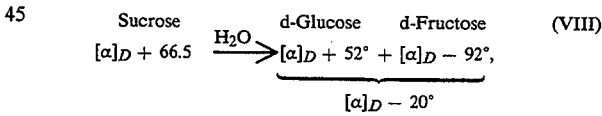

(VIII)

since bees contain invertase. Sucrose does not reduce Fehling's solution or form derivatives with phenylhydrazine, and hence the two sugar units are linked through the glycosidic hydroxyl group of each sugar and contain no free or potential carbonyl groups. Unlike the majority of sugars, sucrose crystallizes readily, probably because it does not undergo mutarotation in solution.

Polysaccharides belong to two general groups. These include, as mentioned, those that are insoluble and form the skeletal structure of plants and some animals; and those that constitute reserve sources of simple sugars (which are liberated as required by the action of enzymes present in the organism). Both types are high molecular weight polymers, often built up from a single pentose or hexose unit. In this respect they differ from the proteins, which are high molecular weight substances containing several repeated units (amino acids).

Cellulose is the most widely distributed skeletal polysaccharide. It constitutes approximately half of the cell-wall material of wood and other plant products. Wood cellulose always occurs in association with hemicelluloses of related structure and with lignin, a nonpolysaccharide. Lignin can be separated (at least partially and according to desired extent) by treating wood with sodium bisulfite and sulfurous acid (sulfite process), or with caustic soda. Recently, anthraquinone pulping, in place of the sulfite process, is finding popularity. Plant celluloses, particularly those of woods, are not homogeneous. They can be separated into alpha-cellulose and beta-cellulose by treatment with caustic soda (i.e., NaOH), in which resultant treated mass the alpha-cellulose is insoluble and beta-cellulose is soluble.* Both are built from glucose units, and the difference probably lies in the degree and type of association.

*FOOTNOTE:—Yet, in another reaction of essential interest in practice of the present invention, the β-cellulose is, as compared to the α-version, better oxidized by such a reagent as NaClO; hence it is the more likely form to be oxidized by any other like or equivalent strong (or stronger) oxidizing reagent.

The isolation of cellobiose, cellotriose, and cellotetrose on hydrolysis of cellulose shows that the glucose units are linked as in cellobiose, hence cellulose can be formulated as long-chain molecules. Under more vigorous conditions, cellulose is hydrolyzed to glucose. A representative cellulose structure is:

natural moisture content) particulated forms of: ground peanut shells or husks; corn cobs; sugar beet fiber; bagasse; walnut, pecan, filbert, Brazil and other nut shells; ground pits from such fruits as cherries, peaches, apricots, plums, olives, etc.; and naturally moist (i.e., undried or undehydrated) comminuted seeds from such various vegetables as melons, squashes, tomatoes, beans and other legumes; and so forth. Important for presently-contemplated reaction purposes and as has been indicated, both coarse paper materials and the optional "wet" sawdust and the like contain quite appreciable quantities in complex mixture of various starches, sugars (such as xylose, arabinose, galactose, etc.), glucosides and so forth. These, as will appear, are reactive with and affected by the strong oxidizing reagents utilized in practice of the invention. Even crushed corn residue from synthetic alcohol production may be beneficially utilized in supplement input as either a "wet" cellulosic or a lower carbohydrate material, or both.

Immediately associated with that at least analogously possible to consider as involved with the above-described wood cellulosic and like or equivalent materials is the fact that, of the several polysaccharides that occur in association with cellulose, two are pentosans. In other words and by way of explanation, they yield pentoses on hydrolysis. The more common one, xylan,

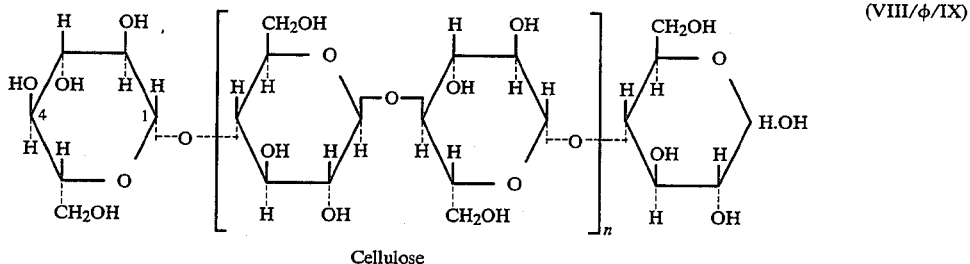

(VIII/φ/IX)

Cellulose

Actually, the highest yields of glucose are only 95% of the theoretical. This may be due to further degradation of glucose or to the presence of small amounts of other units built into the chain. Even carefully purified cellulose contains a small number of carboxyl groups, which (in the plant of cellulose derivation) are probably esterified. These may be formed by oxidation of the potential aldehydic group at one end of the chain, or of primary alcohol groups at C₆ to form a glucuronic acid derivative. Polyglucuronic acids have been isolated from straw and wood.

The remarkable mechanical strength and chemical stability are considered to be a result of micellar structure. Cellulose swells to some extent in water or dilute alkali, but since the crystal lattice is not destroyed, the reaction is said to be intermicellar. The lattice is destroyed whenever solution is effected.

Thus, "wet" sawdust is in essence the above-delineated type of basic cellulosic material with the mentioned high moisture content(s). Perceptibly, unrefined coarse paper is formed of and contains such basic cellulosic material.

Relevant to this, useful raw material source substitutes of wood pulp in and for making coarse paper stocks may also, as is the case with the optional "wet" sawdust or like "wet" cellulosic raw materials for utilization in practice of the present invention, included for the paper itself from or mixtures thereof with undried (i.e., with substantial, if not complete, reservation of is built from d-xylose units linked in the 1- and 4-positions, the structure of which is:

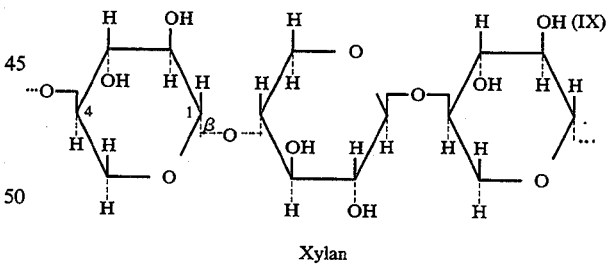

Xylan

Xylan is closely related to polyglucoronic acid with which it is associated in nature and from which it may be produced by decarboxylation. Both are hemicelluloses, as found in wood and other sources amongst the polysaccharides associated with cellulose.

While it frequently is of considerable benefit and advantage for utilization in mixture(s) with the coarse paper, with or without "wet" sawdust, or the like starting material, the use of lower carbohydrates starch(es) and/or sugar(s) is not critical to satisfactory practice of the invention being sometimes good to lower heat demands or lead to more quality in the output product made.

In its basic character, starch is the reserve carbohydrate in the majority of known and cultivated tree, vegetable and other plants. It is hydrolyzed by the enzyme diastase to maltose, or by mineral acids to glucose. Evidently, starch consists of chains composed of maltose units. Structurally, starch can be pictured as:

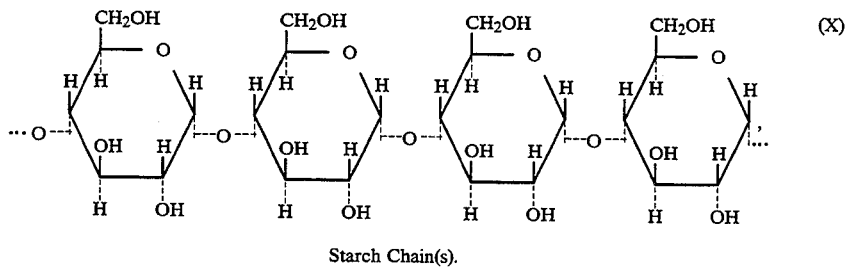

Starch Chain(s).

Starch can be separated into two fractions by treatment with hot water. These are: a soluble component known as amylose (10–20%) and an insoluble residue, amylopectin (80–90%). Both substances yield glucose or maltose on hydrolysis, but differ in several other respects.

Thus, amylose gives a blue color on treatment with iodine, while amylopectin yields a violet to red-violet color. Amylose is completely hydrolyzed by beta-amylase, while only about 60% of amylopectin is hydrolyzed.

The molecular weight of amylose ranges from 10,000–50,000 (osmotic pressure). The value derived by the end-group assay method agrees closely with that obtained by osmotic pressure. This shows that amylose contains only one end group per molecule and, hence, is a long-chain molecule structurally related to cellulose.

The molecular weights of amylopectin samples range from 50,000–1,000,000 (osmotic pressure). End-group assay indicates one end group for each 24–30 glucose units. Consequently, amylopectin must consist of branched chains. The compound 2,3,6-trimethylglucose has been isolated as the main product of hydrolysis of methylated amylopectin. In addition, hydrolysis yields small amounts of 2,3,4,6-tetramethylglucose (corresponding to the end groups) and of 2,3-dimethylglucose plus an isomeric dimethylglucose, possibly the 2,6-dimethyl derivative.

The isolation of 2,3-dimethyglucose shows that branching must occur at the 6-position, since the 1- and 4-positions are involved in the formation of the straight chain. Amylopectin has been pictured as a ramified molecule, in which the exterior branches are linked at the 6- and possibly the 3-position, per the following:

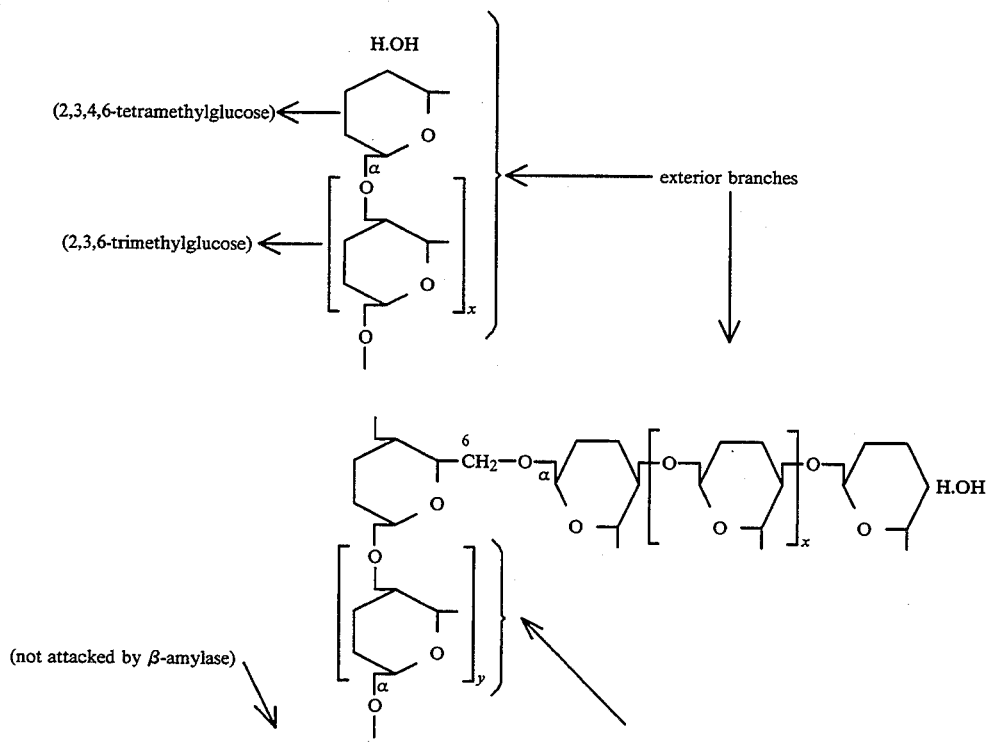

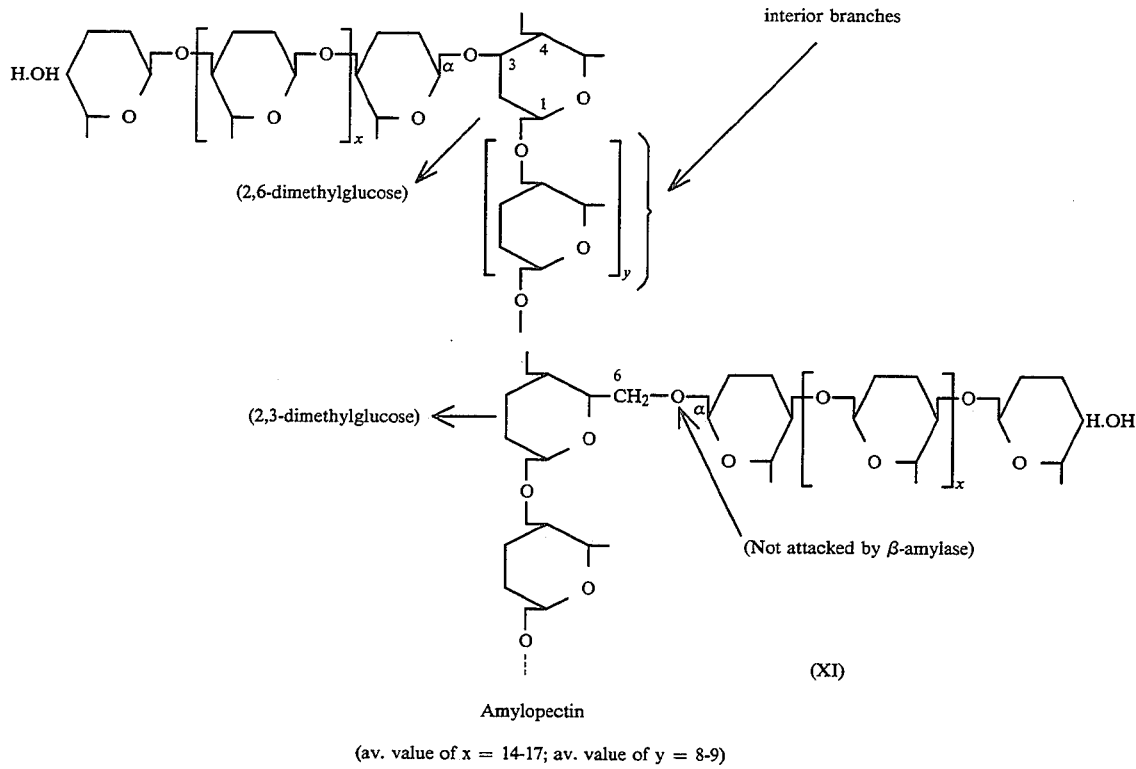

Amylopectin (av. value of x = 14-17; av. value of y = 8-9)

Starch is not hydrolyzed completely by β-amylase because the linkage between the 1α-position of one unit and the 3- or 6-position of another unit offers a point of obstruction to enzyme attack. The interior of the molecule, about 40% of the whole, is unaffected. This residue is known as grenzdextrin, which has a red to brown color when subjected to contact with iodine.

Wheat flour (as well as analogous flours from other cereal grains such as rye, oats and so forth); corn starch (and analogous starches from such grains as millet, maize and so forth) and soy protein flour are suitable lower carbohydrates for resin-producing degradation by and reaction with the oxidizing reagents employed in practice of the invention.

In this, there is a variation in content of nitrogenous and proteinaceous materials inherently contained in the various starches that may be utilized. These non-carbohydrate constituents are additionally helpful for supplemental chemical bonding purposes in the desired coarse paper and the like binder provision so advantageously provided by the effect of and reaction with the strong oxidizing reagent employed. In general, soy protein flour is richest in such nitrogenous components, while wheat flour is leanest insofar as concerns its content of same. Corn starch and the like is intermediate between soy protein flour and wheat flour in its containment of nitrogenous constitutents.

The starch(es) and lower carbohydrate utilized (or at least some portions thereof) may even be from such (generally particulated) vegetable sources as undried potatoes (and/or potato peelings), corncobs, turnips, beets (very rich in sugars), beans, peas, peanuts, coconut and other nut husks, sunflower seeds, safflower seeds, flaxseeds, pumpkin and squash seeds, linseed meal and so forth. In fact, the usually unsaturated oleginous constituents in and with some of these carbohydrates supplies are often materially helpful in bolstering the resin-providing phenomena involved in practice of the present invention.

Of course, mixtures of flours and/or other suitable starches can be employed.

Likewise, the resin-providing materials may be yet further obtained by reaction of the oxidizing reagents with sugars (such as sucrose). Sometimes, however, it happens that the reaction with saccharine carbohydrate derivatives is relatively more vigorous than desired (being, on occasion, even somewhat "explosive" in nature, the same even known to have been used as cheap, "home-made" dynamite).

Notwithstanding, it is oftentimes advantageous to utilize a mixture of sugar(s), such as sucrose, with the flour and/or starch as the basis of the lower carbohydrate employed for constitution of the resin-providing materials. While literally any proportion of sugar(s) can be used for such mixtures, it is usually advantageous for the mixture to contain only a minor proportion of the sugar ingredient. Along this line, the utilization in such starch/sugar mixtures of blackstrap molasses, in an amount on the order of up to 25 wt. %, advantageously between about 5 and 10-15 wt. %, quite beneficially enhances the resin-providing effectiveness of the flour and/or starch material involved. This range fits most sugar supplements, as it does the starch(es) when either are used alone or in admixture. The 49 wt. % minor proportion(s) of same can go as low as 0.1 wt. % or so in usage.

The strong oxygen- and/or chlorine-providing oxidizing reagent employed, as indicated, can be common household bleach (i.e., an aqueous solution of sodium hypochlorite —NaOCl— which is generally unstable out of water solution; having a maximum concentration in solution of about 17 wt. %). Bleach, even at normally-provided concentration as low as 5 wt. % or so, reacts (with vigorous thermogenesis and exothermically) with most starches and sugars as well as hemi-cellulosics and lignins—to give a very hydrophylic and complex material capable of bonding paper(s) and utilizing, to satisfy its hydrophylic appetite, much (if not at all) of the water in moistened coarse paper stock(s) and mixtures thereof with "wet" sawdust and the like or equivalent undried cellulosics. In fact, the paper(s) plus any optional sawdust and equivalent cellulosic, per se, wet in condition is also more-or-less susceptible (but positively so as is above explained) to the resin-providing reaction to the action of bleach or the like; this being an importantly basic manner of practice of the invention.

Other alkali metal hypochlorites, such as potassium hypochlorite (i.e., KOCl), is also utilizable, as are various other alkali metal and alkaline earth metal hypochlorites, (containing either or both of the —ClO and —ClO$_2$ radicals), normal-chlorates (i.e., having the —ClO$_3$ radical therein) and perchlorates (i.e., having the —ClO$_4$ radical therein).

Bleach and many of its usable equivalents, however, do have the disadvantage of being necessarily utilized in aqueous solution; this tending to require greater quantities of same for the resin-providing cellulosics, etc., even when flour and/or starch or sugar-modified flour and/or starch ingredients. Accordingly, it is often more advantageous to utilize normally dry and solid hypochlorites and the like, such as "bleach powder" (i.e., Ca(ClO)$_2$ or Ca(ClO)$_2$.4 H$_2$O) or barium hypochlorite (i.e., Ba(ClO)$_2$).

Such materials as chlorine monoxide (i.e., Cl$_2$O), which is the anhydride of hypochlorous acid (i.e., HClO), may be employed to at least supplement the effectiveness of the above-mentioned reagents. In this connection, the addition of minor proportions of such mineral acids as hydrochloric acid (i.e., HCl) oftentimes is of material and marked assistance to help liberate chlorine from hypochlorites and the like, although the use thereof is totally optional and not material to basic satisfactory practice of the present invention.

Needless to mention, the addition of chlorine monoxide to water (in which it is highly soluble even at such low temperature levels as around 0° C.) makes for the direct formation of aqueous H—Cl—O, which itself is a strong oxidizing reagent. Elemental chlorine, per se, dissolves rather well in water (one volume of water at 10° C. dissolving about 2.7 volumes of Cl$_2$ to give an 0.8 wt. % composition and, even at 20° C. dissolving about 2.3 volumes of Cl$_2$ for a 0.7 wt. % solution and, at 30° C., taking up about 1.8 volumes of Cl$_2$ to provide a 0.5 wt. % composition) to also result in a good oxidizing material. Even the so-called "chlorine water", made from the reaction in aqueous media of potassium chlorate and hydrochloric acid (typically containing about 0.4 wt. % chlorine), gives yet another suitable strong oxidizing reagent.

Of course, suitable mixtures of elemental chlorine and oxygen can, if desired, be directly supplied to and provided in the reaction mass to effectuate the resin-providing product of reaction with the basic given cellulosics, whether or not admixed with the indicated "wet" cellulosics and/or starch(es) and/or sugar(s)

Yet other sources for copious provision of nascent oxygen and chlorine can also be utilized in practice of the present invention. These include, for example, the commonly-employed materials that are available and used for such purposes as swimming pool water purification. Examples of such are the cyanuric acid and cyanuric acid derivatives of the type(s) represented by the Formulae:

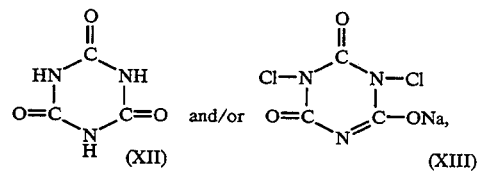

Cyanuric acid
(Derivable, inter alia, directly from urea)

Chloro-sodium salt derivative of cyanuric acid used individually or in combination with other of the strong oxidizing reagents possible to employ.

As is apparent, another important halogen, namely bromine, can be utilized in combination with or in full replacement of the chlorine moieties in any or all of the above-specified chlorine-containing entities, compositions and materials (including mixtures of elemental bromine with oxygen and suitable combinations in any desired proportion of elemental bromine and chlorine with oxygen) for achievement of the mentioned reaction(s) therewith upon and with the given cellulosics used alone or with addition of other lower carbohydrates. All of these strong oxidizing reagents, as has been indicated and is inherent, react nascently and are non-azotizing and non-alkali in basic make-up and nature.

Thus, the treated coarse paper(s) mass(es), including those in admixture(s) with any treated "wet" sawdust (and the like or equivalent treated undried cellulosics which may, including those in mixtures with one or another paper and/or starch(es) or sugar(s) or with "wet" sawdust), are for purposes of many aspects of the present invention and to any desired greater or lesser extent a more-or-less intermediate or basic starting stuff for instant possible considerations.

As is hereinafter more-fully expounded upon and as is adequately revealed in the said above-identified application Ser. Nos. 06/399,681 and 06/440,036, and any treated "wet" sawdust and the like has an instrinsic and inherently-made, naturally-generated resin component therein which, in and of itself, is capable of excellent binding effects (being, as it were, self-reactable in this respect) and, additional thereto and in keeping with the said two inventions, is additionally reactive either in part or at least substantially if not completely with the therein and hereinafter disclosed adducts and/or adductive component feed stock(s) to result in an intractable, more-or-less thermo-settable binding resin material which is provided directly within any treated "wet" sawdust and the like stuff involved. Amazingly, pursuant hereto, treated coarse paper(s) stock(s) respond likewise.

In this connection, it is normally found that in the preparation of the treated coarse papers and the like or equivalent(s) with the appropriate oxidizing reagent utilized there generally results anywhere from between about 10% and about 60% (usually in the neighborhood of from about 20 or so % to about 4%) of the involved undried cellulosic raw or starting material to have been made water-soluble in nature to a significant and pronounced degree. The materials generated by the bleach (and/or other oxidizing reagent) reaction, of course, can serve in and of themselves to bind the residue of the papers and other employed cellulosic during fabrication operations with a good portion of the water-soluble fraction thereof (so rendered by reaction with the oxidizing reagent) being reverted upon individual and/or adduct-assisted (as in keeping with practice of the present invention) setting to water-insoluble material, especially per present contemplations, under the influence of heat at a suitably elevated temperature and, preferably in a large number of situations, under adequate consolidating and densifying pressure(s) during shaped article(s) formation and fabrication thereof.

least in part, a transformation of the involved cellulosics, hemi-cellulosics, starches, sugars, etc., into, inter alia and above and beyond various more-simply-oxidized and/or oxidatively-degraded celllulosic materials into variety or more or less complex and intermixed aldehydic carbonyl substances. These, without limitation thereto and for merely illustrative purposes, likely and to greater-or-lesser extents, are constituted in literally bewildering combination and profusions of such aldehydic carbonyl compounds as:

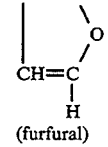

The treated newsprint or other coarse paper(s) and the like intermediate or basic starting stuff utilized in practice of the present invention is commonly found to contain between about 5 wt. % and about 15 wt. %, more frequently on the order of 8 or so (like from 6 to 10) wt %, of the binding material derived from and generated by the reaction with the coarse papers or other cellulosics of the bleach or other oxidizing reagent. In any event, the oxidizing reagent-treated given cellulosic is made so as to contain an adequate componential amount and quality for compositional binding and resulting structural integrity on fabrication thereof, especially when further adduct-treated and -reacted in accordance with the present invention. Thus, this content of the intrinsically-general and resinous binding material resulting from interaction of the oxidizing reagent employed with the coarse newsprint or kraft papers and/or the like may, in broadened ranges, contain from as little as ½–1 wt. % or so to as much as 20 or more wt. % of the so-created resinous binder ingredient.

In keeping with one somewhat more involved manner of practice of the present invention, the initially-internally-generated resinous binder ingredient may be provided with enough inter-reactive adduct to result in entire conversion thereof to adductive component inter- or cross-linked (or equivalent network-producing, cross-bound structure) or, by use of a diminished or lesser (or any desired degree) quantity of the adduct, to only a more-or-less partially adduct-inter-reacted combination.

As indicated and hereinafter more fully expounded upon, the reaction of the oxidizing reagent employed with the coarse paper(s) (and/or admixture of coarse paper stock with "wet" sawdust like or equivalent undried cellulosics including mixtures thereof) involves, at Additional to the oxidized products of the cellulosics, etc., obtained in the treated newsprint or other coarse paper stocks or mixtures there are also obtained various oxidized lignin materials in the said intermediate or starting stuff mass utilized in practice of the present invention. In this connection, numerous references are available dealing in one or another way with the identity and nature of lignin, per se, and many of the derivatives of lignin (all of which, by the way, are generally relatively imprecise and not positively definite), preparation and numerous uses of such materials. Substantial information thereon may be found, by way of illustration, in U.S. Pat. Nos.: 1,848,292; 2,371,136; 2,371,137; 2,491,832; 2,505,304; 2,576,311; 2,800,449; 3,087,923; 3,156,520; and 3,726,850. Still additional art of interest is uncovered in in U.S. Pat. Nos.: Re 18,268; 2,057,117; 2,104,701; 2,399,607; 2,434,626; 4,065,318; 4,069,217; and 4,088,640; as well as in *Acta Chemica Scandinavica*, 4 (1950), Pgs. 228–238; and in the Volume entitled "LIGNINS" by Sarkanen et al.

Another excellent informational source in the lignin area is the Bulletin (No. 131) published by AMERICAN CAN COMPANY of Greenwich, Conn. 06830 entitled "CHEMICALS FROM WOOD".

As has been indicated, the adductive component feed stock capable of and for reaction to intractable sorts of thermo-settable resinous binding substance intrinsically and in situ generated in the coarse papers (alone or in mixture with "wet" sawdust and/or like or equivalent undried cellulosic) mass treat and converted to a fabricatable composition are either of the phenol (i.e., carbolic acid) or phenolic-type(s), urea and/or urea derivative melamine(s) and melamine derivatives and casein and the like, including appropriate and workable mixtures thereof. Nonetheless, a great number of generally polyfunctional other materials may also be utilized for and as adductive component feed stock(s) purposes in practice of the present invention.

Of significance and salient importance in this connection and insofar as concerns the immediately-contemplated extended practice of the present invention, especially with a view to current trends and "taboos" from environmental and ecological points of view, the formable masses and resulting shaped article products involved and made in following of the instant contribution to the art literally invariably and generally are found to contain no appreciable or unacceptable traces of objectionable formaldehyde and the like or equivalent aldehydic carbonyl residues. This, as things have gone and apparently will continue, is a most attractive and commercially-appealing aspect of and benefit integrally realizable in connection with embodimentation(s) of what is contemplated and possible in accordance with the invention. Note, bolstering this and appearing at Pages 12 and 13 in CHEMICAL WEEK for Feb. 9, 1983, the Article entitled "*Working For Compromise On Formaldehyde*" pertinent to the problem.

Amongst the many mono- and poly-hydric phenolic compounds and derivatives that may be utilized in practice of the invention, phenol (or carbolic acid) is preferable from both cost and ready-availability and performance dependability points of view. As is well known, this material (also further known as mentioned above) is of the Structure:

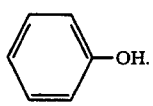

(XXX)

A large proportion of suitable substituted phenolics that may also be satisfactorily utilized are of the generic Formula:

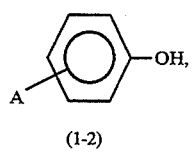

(XXXI)

wherein each ring-substituted ring attachment A may independently be selected from the Group, inter alia, consisting of hydroxyl, halo-, lower alkyl (i.e., usually from methyl to those of not more than about $C_4$ ti $C_6$ or so containment), equivalent lower cycloalkyl (both mono- and povalent), 6 to 10 carbon atom-containing aromatics including ring-substituted variations thereof, and so forth and so on including such with nitro- and amine-substituents.

Illustrative of monohydric and polyhydric phenolic materials (or phenols) which, additional to or in combination with phenyl per se, may be utilized are:

| | | | |
|---|---|---|---|
| $CH_3C_6H_4OH_{(1,2)}$ (o-cresol) | (XXXII); | $CH_3C_6H_4OH_{(1,3)}$ (m-cresol) | (XXXIII); |
| $CH_3C_6H_4OH_{(1,4)}$ (p-cresol) | (XXXIV); | $ClC_6H_4OH_{(1,2)}$ (o-chlorophenol) | (XXXV); |
| $ClC_6H_4OH_{(1,3)}$ (m-chlorophenol) | (XXXVI); | $ClC_6H_4OH_{(1,4)}$ (p-chlorophenol) | (XXXVII); |
| $BrC_6H_4OH_{(1,4)}$ (p-bromophenol) | (XXXVIII); | $HOC_6H_2Cl_{3(1,2,4,6)}$ (2,4,6-trichlorophenol) | (XXXIX); |
| $HOC_6H_2Br_{3(1,2,4,6)}$ (2,4,6-tribromophenol) | (XL); | $HOC_6H_4NO_{2(1,2)}$ (o-nitrophenol) | (XLI); |
| $HOC_6H_4NO_{2(1,3)}$ (m-nitrophenol) | (XLII); | $HOC_6H_4NO_{2(1,4)}$ (p-nitrophenol) | (XLIII); |
| $HOC_6H_3(NO_2)_{2(1,2,4)}$ (2,4-dinitrophenol) | (XLIV); | $HOC_6H_4OCH_{3(1,2)}$ (guaiacol) | (XLV); |
| $HOC_6H_4CH{=}CHCH_{3(1,4)}$ (anol) | (XLVI); | $HOC_6H_2(OCH_3)CH_2CH{=}CH_{2(1,2,4)}$ (eugenol) | (XLVII); |
| $HOC_6H_3(OCH_3)CH{=}CHCH_{3(1,2,4)}$ (isoeugenol) | (XLVIII); | $HOC_6H_4CH_2OH_{(1,2)}$ (saligenin) | (XLIX); |
| $HOC_6H_3(CH_3).CH(CH_3)_{2(1,2,5)}$ (carvacrol) | (L); | $HOC_6H_3(CH_3.CH(CH_3)_{2(1,5,2)}$ (thymol) | (LI); |
| $HOC_6H_4COCH_{3(1,2)}$ ($\phi$-hydroxyacetophenone) | (LII); | $HOC_6H_4COCH_{3(1,4)}$ (p-hydroxyacetophenone) | (LIII); |
| $C_6H_5C_6H_4OH_{(1,2)}$ (o-hydroxydiphenyl) | (LIV); | $C_6H_5C_6H_4OH_{(1,4)}$ (p-hydroxydiphenyl) | (LV); |
| $C_6H_{11}C_6H_4OH_{(1,2)}$ (o-cyclohexylphenol) | (LVI); | $C_6H_{11}C_6H_4OH_{(1,4)}$ (p-cyclohexylphenol) | (LVII); |
| $C_6H_4(OH)_{2(1,2)}$ (catechol) | (LVIII); | $C_6H_4(OH)_{2(1,3)}$ (resorcinol) | (LIX); |
| $C_6H_4(OH)_{2(1,4)}$ (hydroquinone) | (LX); | $C_6H_3(OH)_{3(1,2,3)}$ (pyrogallol) | (LXI); |
| $C_6H_3(OH)_{3(1,2,4)}$ (hydroxyhydroquinone) | (LXII); | $C_6H_3(OH)_{3(1,3,5)}$ (phloroglucinol) | (LXIII); |
| $HOC_6H_4NH_{2(1,2)}$ (o-aminophenol) | (LXIV); | $HOC_6H_4NH_{2(1,3)}$ (m-aminophenol) | (LXV); |
| and/or $HOC_6H_4NH_{2(1,4)}$ (p-aminophenol). | | | (LXVI) |

In general, a multiplicity of phenolic hydroxy groups tends to increase the water-solubility thereof; but that effect can be counteracted by symmetry of structure. Notwithstanding and if necessary, the phenolic adducts employed can be utilized by addition(s) in other suitable inert solvents and/or, if not icorporated directly in or with the treated given cellulosic mass, in dispersions or suspension of same.

It is most advantageous if it is desired to have the classical and truly thermo-setting variety of reaction product with the phenolic adduct(s) employed for combination with the intrinsically generated resinous ingredients in the treated newsprint and/or the like coarse paper masses for the phenol(s) utilized, or at least the great preponderance thereof, to have three (3) reactive positions therein. If the phenol utilized has only two (2) active positions (e.g., o- or p-cresol), the completed resin product tends to be only partially or more-or-less slowly curable. And, in the instances if the involved phenol is substituted one containing only one (1) free active position (as, for example, in 2,4-xylenol), a non-curable (or Novolak-type) product is generally obtained.

Of course, in the last-mentioned instances, the entire adduct-containing mass may nonetheless be readily and simply converted to an excellent resin-bonded mass in the thermo-setting style of procedure by the well known expedient of adding inter-reactive cross-linking quantities (usually on the order of 10–16 wt. % and more often between about 12 and about 14 wt. %, based on total resinous material to be cured) of such a curing agent as hexamethylenetetramine (i.e., "hexa" and of the empirical formula $(CH_2)_6N_4$)-and/or its well known likes and equivalents for such purposes. In such cases, it is also usually advisable (if not actually necessary) to utilize an acidic catalyst of the types well known for use in Novolak-curing reactions in the mass being thermally-set for resin bonding.

Along this line, the quantity of phenolic adduct to utilize and incorporate in the treated newsprint(s) and-/or the like coarse paper(s) mass is generally, on a weight-ratio basis, from about 1:5 to about 1:2 of the phenolic relative to the aldehydic carbonyl-containing intrinsically-generated resinous material in the treated mass; with 1:2½–3 respective ratios being oftentimes more advantageous.

In any event, as is the general case with any of the adductive component feed stock(s) or mixtures thereof to be employed, it is usually satisfactory if an amount, based on total resulting "wet" composition weight, of from about ¼ wt. % or so to as much as 20 or more wt. % of same is utilized, with ranges of from about 1 to about 10 wt. % oftentimes being entirely adequate and satisfactory.

As indicated in connection with Novolak-type situations, catalysts are usually advantageous to utilize. When phenol(s) having multiple free active positions are employed, basic catalysts of the well known type (as, for example, those utilized in processes for making "BAKELITE" {Reg. TM} Brand resin products as obtainable from UNION CARBIDE CORPORATION and its or their likes and equivalents) may be employed with benefit. Along this line, the usual treated coarse papers (alone or mixed with "wet" sawdust and the like undried cellulosic) mass involved is ordinarily at least slightly basic in character so as to inherently favor the typical phenol/formaldehyde and the like resin-providing reaction.

The urea and urea-type and/or derivative compounds that may be utilized (alone or in mixtures with other possible "adducts") in such extended practice of the present invention to enter into condensation sorts of reactions with at least the aldehydic carbonyl ingredients generated in situ in the treated coarse paper(s) and the like or equivalent treated prepared cellulosic masses and also, quite likely, with the oxidized lignin and other oxidized cellulosic, etc., components of same are more particularly illustrated and defined in the following structural portrayals, vis.:

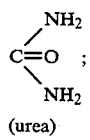
(urea) (LXVII)

$H_2NCONHCONH_2$; (LXVIII)
(biuret)

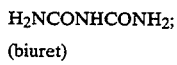
(LXIX)
(monomethylolurea)

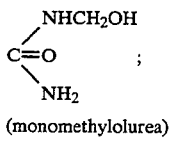
(LXX)
(dimethylolurea)

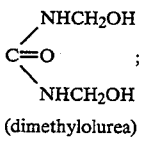
(LXXI)
(methyleneurea)

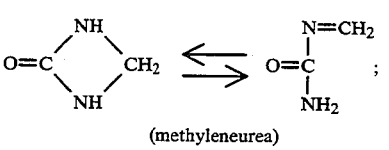
(LXXII)
(methylolmethyleneurea)

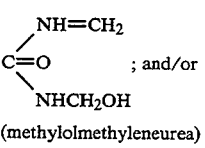
(LXXIII)

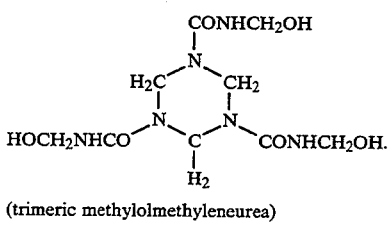
(trimeric methylolmethyleneurea)

As is also indicated, certain generally-natural protein materials (which are amphoteric substances that react with both acids and bases) are also useful—individually or in various combinations—as adductive components in the immediately-contemplated extended practice of the present invention. Of course, casein (a phosphoprotein occurring in milk as well as in beans and nuts) is quite advantageous to utilize. Others useful for the purpose include: egg albumin, silk fibroin; serum globulin; gelatin; insulin; lactoglobulin; hemoglobin; serum albumin and so on and so forth.

A good basic and elementary explanation of the making of condensation-type resins from phenols, ureas, casein and the like proteins, melamines an so forth is available in Chapter 36, especially Pages 902–911 thereof of "ORGANIC CHEMISTRY" by Fieser and Fieser published in 1944 by D. C. HEATH AND COMPANY of Boston, Mass.; all of which is here incorporated by reference.

Accordingly, the melamines of greater importance for use as "adducts" in extended practice of the present invention include:

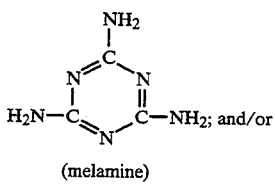

(melamine)

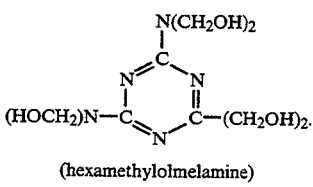

(hexamethylolmelamine)

Still other "adducts" utilized individually in mixtures with other adductive components may be employed as feed stock(s) in such practice of the present invention to react to intractable resin product(s) with the alkehydic carbonyl materials, oxidized lignin and cellulosics and so forth found in at least substantial water-soluble quantity of the treated newsprint and/or the like coarse paper(s) intermediate or starting stuff employed.

These include many satisfactory polyisocyanates which, as typically illustrative of same as commercial materials are those known as MONDUR MR", "MONDUR MRS" and "MONDUR MR-200" (produced by MOBAY CHEMICAL COMPANY) and the "PAPI's" —580, 135 and —27 (manufactured by THE UPJOHN COMPANY of Kalamazoo, Mich. 49001). These, chemically, are polymethylene polyphenylene polyisocyanates which, somewhat more specifically, is illustrated by 4,4'-methylenediphenyldiisocyanate (i.e., "MDI"). Characteristically, such compounds have two or more isocyante groups per molecule thereof. Depending on the particular choice of polyisocyanate that is made, a catalyst to promote the cross-linking and network-building reactions between the respective reactive groups that are involved may, usually with great advantage, be utilized—the same sometimes being literally required. All of this, of course, has equal applicability and pertinence (pursuant to notations along such lines in the foregoing) to other reactive "adducts" adaptable for utilization in practice of the invention; the same in practically all cases being readily determinable by simple and straight-forward testing routine(s). Further along this line, toluene diisocyanate, toluene diisocyanate trimer and the like are other very appropriate polyisocyanates to employ as and/or in adductive component feed stock material(s) in practice of the present invention; this being especially so when such catalytic agents for typical (and likely herein to greater-or-lesser extent involved) —NCO/—CO$_2$H and the like reaction as dibutyl tin dilaurate, stannous octoate and the like or equivalent catalysts for isocyanate-involving reactions employed in effective, as is well known and/or easily reckonable, catalyzing amounts.

The "adducts" employed can also be various of the satisfactory and commercially-available epoxy resins (and equivalents thereof) such as "D.E.N-431", "D.E.N.-439", "D.E.R.-331", "D.E.R.-542", "D.E.R.-661", "D.E.R.-642u", and "D.E.R.-667" (obtainable from THE DOW CHEMICAL COMPANY of Midland, Mich. 48640) and their likes or equivalents, all of which are characterized by their containment therein of the characteristic Structure:

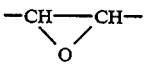 (LXXVI)

in its molecular arrangement. The epoxy resin "adducts" to advantageously employ generally have an epoxy equivalent weight value that is between about 50 and 300, more advantageously in the range from about 150 to 200 or so.

Many divinyl ether type products may also be utilized as adductive components in extended practice of the invention. These, typified by diethyleneglycol divinyl ether (i.e., "DEGDVE") may be generically represented by the Formula:

$$(CH_2\text{=}CH)_{2\text{-}3}\text{-}(O\{CH_2\}_{1\text{-}4})_{2\text{-}20}, \qquad \text{(LXXVII)}$$

all of which are adapted to be and many of which are well known and commonly-employed polyfunctional materials.

Other glycol derivative materials useful as adductive components for present purposes are such materials as ethylene glycol dimethacrylate and trimethylolpropane triacrylate which are includable within the Formula:

$$(CH_2\text{=}CH\text{—}CO_2)_{2\text{-}3}(Z), \qquad \text{(LXXVIII)}$$

wherein X is an alkyl unit containing from 1 to 4 carbon atoms and Z is an alkene or alkenyl constituent of either the straight chain or branched variety which contains from 2 to about 8 or so carbon atome.

Good "adducts" are also achievable (again, as with all other possible adductive component materials possible to employ by simple exercise of common sense merely so that they are not inter-reactive in a "self-defeating" and/or non-purposive or -beneficiating ways for immediately present aims and purposes, utilizable individually and/or in admixture with other varieties of the suitable "adduct(s)" applicable) in adaptation for thermo-settable-mass-producing reaction with the treated given cellulosics by selection for what is needed of one or more of certain alkenyl and/or alkene derivatives of cyanuric acid of the Formula:

$$C_3N_3O_3\text{-}(Z')_{(1\text{-}3)}, \qquad \text{(LXXIX)}$$

wherein each Z' is independently selected from the Group consisting of hydrogen and straight-chained or branched alkene or alkenyl substituents containing from 3 to about 8 carbon atoms. Triallyl isocyanurate and triallyl cyanurate are especially useful species of Formula LXXIX "adducts". As is apparent, at least one (1) of the "Z'" substiuents must be an ethylenically-unsaturated and thereby reactable unit.

Yet another polyvinyl ethers that are capable of adductive component feed stock utilization are, for example, the divinyl products of ordinary dialkyl etheres, such as divinyl diethyl ether, which follow the Formula:

$$H_2C\text{=}(CH\text{—}(CH_2)_a\text{—}O\text{—}(CH_2)_b\text{—}CH\text{=}CH_2, \qquad \text{(LXXX)}$$

wherein both "a" and "b" are independently-selected integers that have a value of 1 to about 4.

Above and beyond the foregoing, still other polyfunctional materials which may be employed as "adduct(s)" in here-contemplated extended practice of the present invention can also be put to good use for purposes thereof. These, as is above indicated, are generally polyfunctional substances that have the capability of interlinkingly reacting with the free carbonyl, carboxylic, oxidized lignin and other oxidized cellulosic moieties in the treated newsprints and/or like or equivalent treated coarse paper(s) employed cellulosic starting stuff that are fundamentally involved in the practice of the invention and under the processing conditions that are involved in that segment of the procedure where and wherein the thermo-settable resinous ingredient or condensation-type resin product is in-process achieved.

Indicative of such chemically suitable "adduct" materials that may beneficially be utilized for the indicated purpose are any one or more of "adduct" or "adduct"-mixtures reactive under the influence of heat at elevated temperatures (especially when the reactivity propensities of same are capable of enhancement under catalytic influence and also, as pertains in most of the involved instances, under consolidating or compacting pressure simultaneously applied as are are constituted by those diols and other polyols, diamines, dithiols and tetrathiols representable by the respective general Formulae:

  (LXXXI)
(diol)

  (LXXXII)
(diamine)

  (LXXXIII)
(dithiol)

  (LXXXIV)
(tetrathiol)

all wherein R is any polyvalent (for the diol, diamine and dithiol types being bivalent while it is tetravalent for the tetrathiols) hydrocarbon unit containing from 1 to about 20 carbon atoms selected from the Group consisting of alkylene, substituted-alkylene, cycloalkylene, substituted-cycloalkylene, di- and other polyvalent aromatic and substituted di- and other polyvalent aromatic arrangement.

Amongst the typifications that may quite deservedly be mentioned of suitable Formulae LXXXI, LXXXII, LXXXIII and LXXXIV materials are: the polyosypropylenediamines, such as "JEFFAMINE D-2000" (Reg. TM) which is one of $M_w$ 2,000; and tetra-2-mercaptopropionyl-oxymethane (of empirical structure {HSCH$_2$CH$_2$COO}$_4$C).

Other varieties of materials nicely suited to be used as the adductive components in and for practice of the present invention include any one or more of the polyalkylene fumarates, maleates, succinates and so forth which tend to condense and/or form cross-linked networks with the intrinsically-generated resinous ingredient in the treated coarse paper and the like intermediate stuffs, including as a more specific representation thereof a hydroxylated propylene oxide maleate of the Formula:

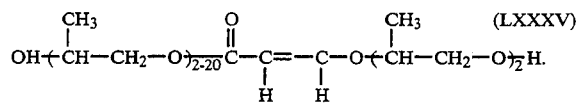

Such Formula LXXXV materials, as is evident, actually are polyols. They are usually obtained in mixtures containing up to 90 wt. % of an alkylated ester form of the polyol using a lower alkyl, such as methyl (i.e., "Me"), butyl (i.e., "Bu"), t-Bu, etc., for the alkylation. A typical alkylated ester derivative found in the usual mixture in which such complex polyols are obtained is one in which the hydroxyl group on the left-hand side of the above Formula LXXXV is replaced by an n-Bu (i.e., "n—C$_4$H$_9$") radical. The alkyl- or other-substituted polyols, like the polyalkoxides of the following Formula ICII, also in many instances tend to have a beneficial plasticizing function in the resulting fabricated coarse papers and the like compositions in which they are incorporated.

Still other inter-reactive agents which may be utilized with advantage as "adducts" in the immediately-contemplated extended practice of the present invention includes many which are also "divinyl-" and/or "diisopropenyl-" and/or "diallyl-" in nature and are of general structure(s) according to one or another of the Formulae:

  (LXXXVI)

  (LXXXVII)

  (LXXXVIII)

; and/or

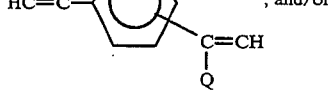  (LXXXIX)

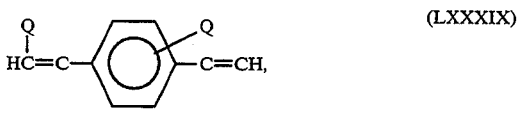

wherein each Q is independently selected from the Group of organic radicals $R_1$, $R_2$ and $R_3$ in which $R_1$ is an aliphatic (including cycloaliphatic) unit containing from 1 to about 12 carbon atoms and $R_2$ and/or $R_3$ is/are aromatic unit(s), including substituted aromatics, containing from 6 to 12 carbon atoms; plus diacrylates and/or dimethacrylates of the respective Formulae (including derivatives thereof):

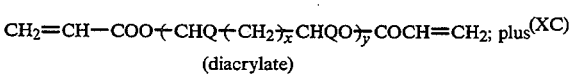  (XC)
(diacrylate)

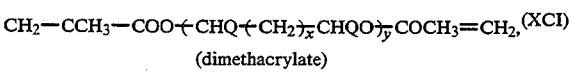  (XCI)
(dimethacrylate)

in each of which Q is as above defined and "x" and "y", independently, are integers having values between 1 and about 100; as well as polyalkoxides of the Formula:

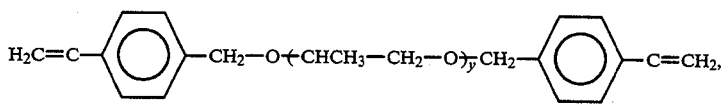

(XCII)

in which "y" is an integer as above defined.

Analogous to the phenomenon mentioned with materials of the above Formula LXXXV, it is also equally interesting (and not infrequently of particular coincidental benefit) that, when higher molecular weight difunctional monomers of the Formulae LXXXVI through XCII are employed, unreacted residues thereof are frequently capable of advantageous functioning as internal plasticizers and/or lubricants for the resulting beneficiated treated coarse papers or the like composition(s) in which they are contained.

Still another possible variation as an adductive component, especially in admixtures with other materials, is to add elemental sulfur (i.e., "S") to achieve a cross-linking or network-building effect somewhat in the nature of elastomeric (such as rubber) vulcanization. Curing during fabrication of the "adduct"-provided treated newsprint and the like is ordinarily at a temperature adequately in excess of the melting point of sulfur (ca., 120° C.).

Consistent with what is above indicated as suitable ranges of additions for the adductive component feed stock(s) employed, quantities of same as may be based on the dry weight of the cellulosics involved in the treated coarse papers and the like intermediate stuff(s) employed may generally range rom between about ½ and about 15 wt. %. Quite often, especially when the "adducts" are phenol itself or other relatively simple phenols, urea, malamine, casein or mixtures thereof or with other adductive components possible to employ (which, of course is correlative to the actual moisture content of the treated given cellulosic mass involved), an amount of the adductive component feed stock that is between about 1 and about 8–10 wt. %, based on dry cellulosic weight, is found to be satisfactory. In this connection, finally-fabricated shaped articles and the like prepared from the compositions involved in practice of the present invention that are bonded with an amount of resin provided therein that is between about 1–5 wt. %, more often from about 1½ to 4 wt. %,, are found to be quite satisfactory in literally all aspects for practical usages in and for intended and contemplated purposes. Of course and in given instances, these ranges may be found to vary (either coincidentally or by purposeful design) on a ±50% range of magnitude.

It is sometimes desirable and advantageous to incorporate other materials in the both the normally-gotten or the "adduct"-containing, bonded newsprint, etc. and the like compositions and resulting products to be made and fabricated therefrom in accordance with practice of the present invention.

As an illustration of this, various thickening agents may also be utilized in the compositions involved. These may help in water take-up potential with respect to the treated coarse papers formed of compositions, etc., which (as is hereinafter displayed) is actually the product of an auto-catalytic reaction between the involved cellulosic being treated and the oxidizing reagent employed for the treating purpose. While the auto-catalysis in the oxidizing reaction is usually rather markedly exothermic in nature, it seldom generates enough heat to accommodate the thermal-input requirements for condensation- or equivalent- or analogous-type reactions needed or final resin setting with the incorporated adductive component feed stock(s).

In fact, there is generally found to be available in the treated given cellulosic stuff an excess of aqueous spent liquor which, in one or another way, requires removal. This, at least in part and to a substantial degree, may be achieved by physical pressing, filtering and so forth. Nonetheless, a good proportion of the water involved in the compositions employed is, in final actuality, most frequently driven out by evaporation and drying under the influence of the heat at elevated temperature utilized in fabrication thereof to achieve the at least partially, if not substantially entirely or entirely, thermo-set type resinous binder material produced in practice of the invention, whether or not additional cross-linking "adducts" are employed.

Thus, any assistance in water take-up is generally beneficial; and, accordingly, utilization of thickening agents as further additives to the compositions can often be quite helpful in this regard. Of course, casein (and many other of the proteide "adducts" possible to employ) also to at least some extent additionally serve as thickening agents in a water take-up aspect of their potential and function.

Yet, above and beyond that and when purposive thickening agents are utilized (and as is recognizable to those skilled in the art), the utilization of same for thickening effect and purposes cumulative to the integral-bonding action achieved in the preparation of compositions in practice of the present invention oftentimes requires a certain amount of "Edisonian-type" investigation to determine optimized results with use of such additives. In other words, several tests may need to be performed with given made-up cellulosic compositions to determine maximized "water-binding" expectancy-(ies) for obtention with any particular thickening agent in question. Such factors as water content variations in the reaction mass and encountered equilibrium rates in performance of any involved thickener enter into this.

Nonetheless and with some analogy to the possibilities along the indicated lines when casein and other proteins are used primarily for function as "adducts", still many other thickening agents may be incorporated for the preparations in practicing the invention (the same being generally employed in amounts not in excess of about 10 wt. %, advantageously from 1 to 5 wt. %, of the composition), if desired, in the compositions for added water absorption capabilities. These include such materials as algin, the various alginates, the already-mentioned gelatin, methyl cellulose, carboxylated methyl cellulose and their likes and euqivalents plus gum arabic, tragacanth and other natural gums and gum resins (above and beyond those naturally present in any given coarse paper stock and/or "wet" sawdust) such as aloes, ammoniacum, asafoetida, euphorbium, galbanum, gamboge, myrrh, olibanum, opopanax, sagepenum, scammony, etc. Worthwhile of note along this line is the fact that most starches themselves, especially if in superabundance in the composition, are quite capable of exerting pronounced thickening and stiffening propensities and effects in interaction with moisture associated therewith.

Another additive often useful to employ for water-absorption and structural strength-adding function is Portland cement or certain of its components, such as limestone (all very well and thoroughly described and defined in "THE CHEMISTRY OF PORTLAND CEMENT" by Robert Herman Bogue, published in 1947 by REINHOLD PUBLISHING CORPORATION of New York City). As is well known, Portland cement, in its "setting-up" reaction, is quite hydrophilic in nature. When utilized in practice of the present invention, it should be employed in integratable minor amounts of, say, 1 to 5 or 10 wt. %, and sometimes even more, based on total composition weight.

A still further additive of frequently very useful employment to imbue some modicum of water-proofing or water resistance to the products of the invention are latexes, such as the styrene/butadiene (which may be ordinary, vinyl- or acrylic-modified carboxylated, etc.), acrylic and the like or equivalent varieties added in minor proportion of the composition on an order of, say, not more than about 5 wt. % and, advantageously, between about 1 and about 2 wt. %. Low molecular weight waxes are also quite good along with or to replace a latex.

An excellent material for rendering the products of the present invention notably water-resistant or -repellant is the so-called hydrophobic fumed silica (which, typically, is fumed silica with an applied coating of hexamethyldisilazane), such as that brand which is commercially-available under the trade-designation "TULCOTE"(Reg. TM) from TULCO, Inc. at Tabot Mills Industrial Park in North Bilerica, Mass. 01862. Additive quantities of hydrophobic fumed silica to employ are analogous to that for the latex and/or wax additaments. Thus, while as much as 10 wt. % can be utilized, that much is ordinarily an uncalled-for and extravagent amount with a more realistic and ordinarily practically beneficial incorporation being somewhere between about ½ and about 2-3 wt. %.

Almost needless to mention but, as desired, colorants and pigments in effective, conventional amounts can also be incorporated in the compositions to give specific fanciful and decorative effects to the products to be fabricated therefrom. Likewise, fire-retardant additives or self-extinguishing components (per current concepts and definitions for same as come about from and relate to "actual fire situations") as well as fungicides, anti-rot components and other desirable additaments may also be utilized, if and as desired.

It is oftentimes quite beneficial and desirable to provide various filamentary and other reinforcements in the compositions to be fabricated. These may (with dry weight inclusions of total up to half or even ⅔) include metal powders, filling, shavings, cuttings, etc., as well as rods and wires of ferrous and/or non-ferrous composition. Fibers, staples and strands of glass and other synthetic or natural filamentary material (such as textile products from nylons, polyesters, acrylics as well as those from wool, cotton, etc.) are often of great advantage to utilize for product strength reinforcement. In this connection, even cloth and fabric may be analogously utilized for internal and/or external (i.e., surface covering) reinforcement purposes.

A significant and extraordinarily-practical advantage in providing physical reinforcements (such as glass fibers, etc.) and other desired additaments in compositions to be fabricated in accordance with the present invention is the relative ease and simplicity with which incorporation and generally uniform and oftentimes completely homogenous intermixing can be achieved. This is particularly the case when additives set to be included go in the properly moist and water-containing treated cellulose mass at the stage when just said treated newsprint or the like coarse paper mass (whether or no it contains supplementing "wet" sawdust increments and/or the like undried cellulosics and/or purposive additions of starch(es) and/or sugar(s) and also whether or not cross-link-enhancing "adducts" are further thereto added), taken as an intermediate stuff, is being handled prior to any decantation, pressing or other filtering-out or removal of the spent treating liquor involved. The same observation is oftentimes applicable, as indicated, even if addition of any one or more of the disclosed "adduct(s)" has been made to the involved newsprint and/or like or equivalent coarse paper mass, etc. The treated cellulosic coarse paper mass is, at such stage(s) in its handling in accordance with practice of the present invention, quite often in an easily pliable and/or masticatable paste-like or even slurry from letting relatively simple mixing and interblending procedures that require no great power and/or intensive-mixing processings—such as kneading, milling and the like—to be satisfactorily applied and utilized for the purpose with avoidance of real need for the usually quite expensive and complicated apparatus associated with intensive-mixing operations. This is so even when using mixed filler systems.

With literal and almost unbelievable surprise and unexpectability as to actually-attainable results thereabout, the use of certain silicous and/or silicate-containing filler materials generally provided for fabricated treated newsprint and the like coarse paper mass (with or without "wet" sawdust and/or other mentioned possible starting material(s) inclusions therein) having remarkably good properties and characteristics of strength, water-resistability, compactness, appearance and other attractive desiderata thereabout. For this, most particularly for instant purposes, mica (especially "expanded" forms thereof), and/or asbestos are very much preferred.

These siliceous and/or silicate-containing filler materials advantageously included in and utilized in connection with the coarse paper, etc., compositions and fabrications thereof in practice of the present invention may also additional to the mica and/or asbestos optionally include: sand; various clays; and/or various slags; as well as mixtures thereof. Most common sands, of course, are forms of impure silica. Clay, as is well known, is a widely-distributed earthy material; plastic when moist but permanently hard when baked or fired. Pure clay, or kaolin, is the mineral kaolinite, a hydrous aluminum silicate. Most clays, however, contain other hydrous aluminous materials with more or less finely comminuted quartz, feldspar, mica, etc. Slag, as is also well known, is the dross, scoria or recrement of a metal which, more specifically, is a product of smelting. Slags contain mostly silicate products of the substances not sought to be produced as the matte or metal in a given smelting procedure, with any given slag having a lower specific gravity than the metal obtained from the smelting. Especially in iron smelting, the slag is often called "cinder". The slag of an iron blast furnace is essentially a silicate of calcium, magnesium and aluminum while, by way of further illustration, that of lead and/or copper smelting furnaces contains iron silicate.

As is appreciable, the siliceous and/or silicate-type filler materials involved should, much like sand in its ordinary types, be particulated and granular in form for use as a filler in the treated coarse paper compositions of the present invention. If not so obtained when gotten, as is often the case with clays and slags (including, especially cinder and those obtained from open hearth or other iron converter processes), they need to be so rendered prior to usage in the embodimentations of the present invention utilizing same.

As little of a tangible included quantity as about 1 (and even less) to as much as 75 or so wt. % of the siliceoous and/or silicate-containing filler materials utilized in practice of the present invention may be employed. More often, however, the quantity included is between about 10–25 and 60, more advantageously about 50, wt. % of the treated coarse paper compositions to be so-benefited with such type fillers; taking care to reckon, however, that most of them yield heavier products than micra or asbestos.

Another satisfactory material to utilize for filling the treated coarse paper, etc., compositions of the invention is finely-divided (i.e., pulverulant) coal. This may be either of the anthracite (or so-called "hard") coal origin or the more-common bituminous (or so-called "soft") coal commodity. The powdered or otherwise small granular size coal filler(s) can be utilized in much the same proportions as those above set forth for the siliceous and/or silicate-containing fillers. In fact (as with many other additives possible to incorporate in the treated coarse paper compositions of the present invention), a coal filler may be included in combinations, if desired, within more or less final satisfactory loading level total(s) admixture(s) with said mentioned siliceous and/or silicate-containing fillers, as well as the latter may also be employed in admixtures with other additives diverse from coal grindings (whether or not of an inter-reactive nature).

With elucidative reversion to and further delineative explanation of the coarse paper goods utilized in practice of the present invention, the contemplated stocks are those that are, at least relatively speaking, unrefined or substantially so insofar as concerns their retention in their composition(s) of, additional to cellulose per se, other innate values of the plant or vegetable materials (particularly wood) from which they were prepared including, more specifically in this regard, unremoved remnants—to a greater or lesser individual degree—of the hemi-cellulosic(s), lignin(s) and starch(es) and sugar(s) constituents of the particular plant or vegetable, etc., raw material(s) from which the said coarse papers were prepared. In other words and as is hereinafter more explicitly demonstrated, the coarse paper goods to be utilized in practice of the present invention (whether in virgin or the more frequently advantageous for cost reasons waste forms) are not the at least substantially if not entirely pure cellulose forms of paper(s) as are present in the so-called "bond" grade writing papers and so forth and in most laboratory filter paper stocks or as is found in such products as pure cotton fibers and/or known equivalents of such naturally-obtained or processed-to-be at least substantially pure cellulose materials with little, if any, unremoved or not-originally-present companion ingredients of the specified types as are found in unprocessed wood and so forth as to other cellulosic raw material possibilities.

Paper, of course, has an ancient history including the legend of its first manufacture in China some Century or so in time B.C.

It was not until the 1800's, however, that the classic rudiments of the so-called caustic (or soda), sulfite and sulphate processes of paper-making were discovered and established.

Today, most paper is made of one of a combination of two or more wood pulps. Other fibrous materials, in addition to waste paper which is essentially wood pulp, are used to make papers of specialized and/or varying characteristics. For Example, in the UNITED STATES OF AMERICA, wood pulp is frequently supplemented by rags, straw hemp, rope stock, bagasse and, in particular cases, with a few other waste fibrous materials. In EUROPE, esparto grass from southern SPAIN and Northern AFRICA is used extensively in printing papers, thus replacing the soda pulp and waste papers of frequent usages in the UNITED STATES. In the ORIENT, grasses and bamboo find some limited use. In various pulping processes, the manner and extent to which the involved pulp is mechanically beaten can be adjusted to lend variation thereto so as to allow observable and important variety in given paper product to be made.

In practice of the present invention and as has been indicated, newsprint (especially in waste form) is ordinarily very advantageous to utilize. Newsprint, of course, is an ordinarily rather cheap, machine-finished paper made chiefly from wood pulp and used mostly for newspapers. Kraft paper, as indicated, may also be employed with benefit; the same being a relatively strong paper, usually more-or-less dark brown in color, which is obtained from sulphite pulp. Cardboards may also be employed. As mentioned, the coarse paper used can, if desired, be prepared as differing mixtures of newsprint with kraft paper and/or cardboard or kraft paper with cardboard and so forth.

The presence of printing ink on or oleagineous processing "pick-ups" etc., waste newsprint utilized in practice of the present invention is immaterial. The ink has no deleterious effect on product quality (despite the fact that there may sometimes—odd as it may seem—appear printing vestiges on the surface(s) of fabricated product(s) made rom treated newsprint masses in practice of the present invention). The same applies to inks and ordinarily-found oils in waste kraft paper and/or cardboard as well as to the glues or adhesives often left with waste forms of the latter (especially in the corrugated versions thereof). But, waxed or coated papers are better to be avoided. Yet, as below further expanded, "fluffing" (as is indicated in the foregoing) is frequently very worthwhile.

As has been cursorily disclosed and made evident in the foregoing, mica—especially expanded versions thereof (with greater degrees of expansion in such product yielding correspondingly lower density(ies) in the final compositions and shaped articles or other products obtained) and/or asbestos and/or desired mixtures thereof are very much preferred for use as the siliceous filler ingredients in practice of the present invention. In fact and for presently-desired results and benefits, this is crucial to and at the crux of instantly-contemplated practice. And, insofar as the same is here involved, it is generally most advantageous in keeping with optimum embodimentations of presently-conceived practice to utilize a mica and/or asbestos (or mixtures thereof) as the sole filling ingredient in and for present compositions. Of course, so long as some significant quantity of the mica and/or asbestos siliceous fillers (generally within the quantity inclusion ranges specified heretofore) are employed in preparation of the instant compositions for shaped article and/or application or deposit formations, some proportion(s) of other filler materials or mixtures of same of the other sorts above-described and -disclosed may also be utilized in the preparations if so desired. Notwithstanding, it is usually preferred, unless some specialized result obtainable with such other-than-mica or -asbestos filler component is wanted, not to admix for the best of present purposes the mica and/or asbestos component with diverse filler ingredients (as above mentioned) that, nonetheless, are possible to employ while remaining within the scope and comprehension of practice of the present invention.

Along this line, however, it is oftentimes of considerable advantage to utilize in and for the compositions of the present invention other (one or more) of the here-specified additaments possible to employ (including, in particular, water-proofing agents and/or cross-linking "adducts") to gain the benefits and advantages specifically possibilitated by such employments and propitious inclusions and makings due to such assimilations.

In most cases and for most applicabilities, at any rate, the use of an expanded mica siliceous filler ingredient as the only filling component employed in the present compositions is very much preferred and invariably procures and ensures for present purposes optimized and maximized quantums of improvement and most desirable features and characteristics to be obtained associative in the low-bulk and light-weight products of utmost preference to be obtained direct from newsprint and so forth in and with the compositions and resulting fabrications of the present invention.

As is rather well known to those skilled in the art, mica is a mineral goods and raw material that includes any of a group of same that crystallize in forms apparently orthorhombic or hexagonal but really monoclinic; being peculiarly characterizable by highly perfect cleavage, so that the material readily separates into very thin leaves that are more or less elastic per se. All of the micas are silicates; but they individually differ widely in composition and, as to color, also vary widely from colorless species to those that are pale brown or yellow and even to green or black. The transparent forms have, traditionally, been used in such things as lanterns and for the doors of stoves, furnaces, etc.; being popularly called isinglass. The mica division or family of minerals includes: the micas proper; the brittle micas (as in the so-called Clintonite Groups); and the chlorites. The important micas are: muscovite, common or potash mica, pale-brown or green (even often silvery) in color appearance and including demourite (also called and known as hydromica); biotite, iron-magnesia mica which is dark-brown, green or black in color; lepidomelane, a black iron mica; phlogopite, a colorless, yellow or brown magnesia mica; lepidolite, a rose-red or lilac lithia mica; paragonite, a soda mica that is yellowish, grayish or greenish; and zinnwaldite, an iron-lithia mica that, in color, may be pale violet or yellow to brown and even dark-gray. Mica is a prominent constituent of many igneous and metamorphic rocks. It comes commercially in granulated and other particulated form(s).

As noted, mica minerals are marked by high basal cleavage so that, as is also indicated, laminae therefrom may be made in very thin subdivision(s) by a process of continued separation. As is more amply illustrated in the following, this layering propensity of mica greatly facilitates and plays an important part in the provision of the preferred (for usage in present practice) expanded mica filler; this being a heat-expanded mica which undergoes and experiences a separation or "blow-up" between the mica layers upon exposure to heat at an elevated temperature. The resulting expanded mica product is a very porous and void-laden particulate material which may, in fact, contain as much as 96–97% of internal, empty, interstitial voids and void-spaces within its overall physical structure. This, of course, provides great lightness and extremely low bulk density to an expanded mica material. It is possible with exercise of adroit and calculated process control, as may be surmised and is known, to produce an incompletely expanded mica product wherein less maximum voids are provided in the cellular goods which, correspondingly, have relatively-proportionately greater bulk density values than that of a completely expanded form or version of the same mica starting material that is subjected to such physical transformation. Thus, and as an example, common muscovite particles usually have a density in the range of ca. 2.76–3.00 gms/cc.$^3$, with a 2.80 value being representatively typical. The fully expanded muscovite generally has a bulk density of only about 0.100 gms/cc.$^3$ and an empty or void space inclusion, on a volume basis, of about 96.4%.

Asbestos, as is well known, is a kind of mineral that is unaffected by fire. It is, in fact, a variety of amphibole (i.e., a silicate of calcium and magnesium and, usually, one or more other metals, as iron, manganese, etc.) occurring in long and delicate fibers or in fibrous masses or seams that are ordinarily of a white, gray or green-gray color. Amianthus, chrysotile and fibrous species or serpentine are forms of asbestos.

Actually, the term "asbestos" designates a group of minerals whose fibrous structure, in combination with special qualities and characteristic appearance, differentiates them from all other minerals. The said serpentine group is one of the major classifications of asbestos. The other (which includes said amianthus but not chrysotile) is the said amphibole group. The most common amphobiles are the rock-forming minerals known as hornblenders; with other fibrous forms of amphobiles recovered and used as asbestos or asbestiform product including: anthophyllite; tremolite; amosite; crocidolite (the blue asbestos of commerce); and actinolite. Amosite forms the longest fibers of all asbestiform minerals, and (like crocidolite) may be described by the general formula (MgFe).SiO$_3$.

Chrysotile (H$_4$Mg$_3$Si$_2$O$_9$), a fibrous form of serpentine, is the most important variety of asbestos for practical utilization. Actually, about 90% of asbestos fiber used for various fabrications is chrysotile; the same, when reference to asbestos is made, being the most commonly-intended material. When found in naturally occurrences, it appears in the rock as lustrous greenish veins which, when separated, become(s) a mass of soft, white, silky fibers. The so called "cross-fibers" of asbestos, frequently found in chrysotile outputs, is so defined due to its lodging in the vein(s) in which it is found with the fibers laid thereacross approximately at right angles to the walls. When the fibers are found in formations wherein they occur along slip fractures in the rock so as to be at least substantially parallel to the plane of slippage, they are identified as "slip fiber" product; this occasionally happening with chrysotile but much more prevalently with some of the amphobiles.

Needless to mention in practice of the present invention, the asbestiform materials used as essential filler components in keeping with such practice are employed in fibrillose form obtained by satisfactory comminution of the mineral deposits in which they are found. Even less needless to mention and as a very clearly and by now well-established precaution, extreme care and prudence must be taken in the usage and handling of asbestos so as to avoid respiration and/or skin contact thereof in order to preclude to the greatest possible extent, and completely if that can be, known health hazard dangers that can arise and be caused by asbestos contacts by persons associated therewith or exposed thereto.

Immediately infra are even other diverse concepts and possibilities hereto applicable.

As would be expectable, when bromine and/or a bromine-containing compound is/are employed as the strong oxidizing reagent that is used in practice of the invention, beneficial effects that are usually at least equivalent or analogous to those obtained when many of the above-mentioned fire-retarding additives are employed and may thus be thereby inherently achieved and realized. All of these things, as is evident and will occur to those skilled in the art, nicely enhance the improvement in certain frequently very desirable results obtainable and provide for particular beneficiation(s) of the contemplated compositions.

Another very attractive and frequently quite utilitarian variation of or extension in practice according to the microcosmic purview and scope of the present invention is to take advantage of the porosity (or intersticial void spaces, passageways, etc.) that are almost invariably found to some appreciable extent in fabricated articles from the treated newsprint and the like coarse paper, etc., masses of possible specifically differing composition and character obtained pursuant hereto. Thus, expecting for the nearly hypothetical situations wherein such tremendous forming pressure are utilized in fabrication of a given shaped article product of sufficient magnitude to at least closely approach if not render total preclusion of possible internal voids to exist, typical finished products made in accordance with the present invention oftentimes have a porosity that goes up to and may even exceed 50% by volume of the overall bulk or volume of the involved shaped article.

If desired as may often be the case to densify the void-containing shaped article involved, the interstics and so forth therein may be filled or loaded with any one of various impregnating materials to obtain at least partial if not near or fully total repletion of the hollows in the involved fabricated body. Such densening treatment may also in many instances serve to materially strengthen the so-modified product structure. Useful for such at least partial void fillings are such materials as epoxy resins, polyurethanes and other thermosettable compositions (with curing done in situ after filling) or thermoplastic materials (filled while molten then hardened in place upon cooling). In many instances, the impregnating filling accomplishment may be much expedited by pressure-forcing of the material into the porous body to facilitate the desired or attainable loading thereof with the material intended to be interjected in the hollows within the shaped article body or fabrication so treated. Time and temperature parameters are also of significance and determinable by routine investigation for any given variety of void-filling substance employed.

In further connection with the foregoing (and hereinafter-added) dissertation(s), the basic principles and limitations of: coarse paper(s); carbohydrates (including starches, sugars and cellulosics); lignins; "wet" sawdust and the like or equivalent undried cellulosics; strong (and as herein characterized and specified) chlorine- and/or bromine- and oxygen-providing oxidation reagent adductive components for producing thermo-set and thermo-set-like resin and the technology associated with same; thermoset and thermoplastic resins and plastic(s); cements; and other involved possible ingredients and components herein utilizable (especially mica, expanded mica and asbestos constituents) are so widely-known and comprehended by those skilled in the art that, above and beyond what is here previously and hereinafter set forth, further fundamental expostulation of or elaboration on the same is not herein made; that not being needed for total comprehension and recognition of the present advance in the art and all beneficially obtainable by practice in keeping with the present invention.

PARTICULARIZED DESCRIPTION FOR WORKING OF THE INVENTION

As is clearly evident and readily-enough apparent in (and not-difficulty deducible form) the foregoing disclosure and description, practice of the present invention in basic essence and substance proceeds and involves implementation in the following way (keeping mention of ingredients and particulars, at this point, to purposely specific and not greatly generalized characterizations and descriptions):

(I). The fundamental concept of what is involved and what is to be produced in practice of the present invention rests on and is engendered from the fact (rather difficult to exactly precise) of the treated coarse papers and the like chemical reaction that, broadly speaking, goes as:

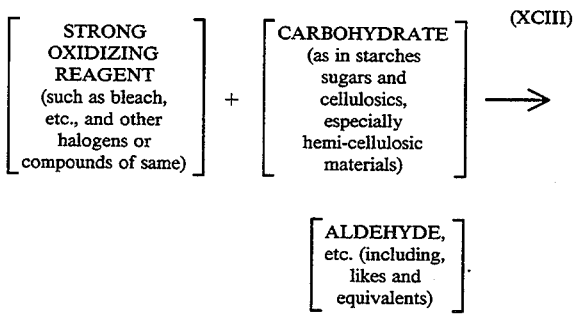

(XCIII)

This, in practical implementation and effect, is the result of the actual burning (or other oxidation) of a carbohydrate (such as: the saccharine materials in sucrose, fructose, etc.; starches with their involved maltose units; and even wood, etc., in the therein-innate cellulosic structure) in an oxygen-poor (i.e., insufficient air) atmosphere so as to yield the resultant aldehydic carbonyl-including formaldehyde and formaldehyde-type and -related materials which therein probably also contain some carboxylated cellulosics. Of course and by way of actual characterization, formaldehyde, per se, is readily available in usually about 40 wt. % aqueous solution. This is in products oftentimes known as "FORMALIN". It is also available in a form, commonly known as "PARAFORM". In any event, it is of the structure:

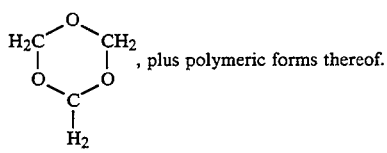, plus polymeric forms thereof. (XCIV)

The generalized paper cellulosic treating reaction tends to go more readily with the water-soluble or partially-water-soluble carbohydrates (when these are utilized or present) since it can apparently proceed with greater facility in such more homogenous aqueous media. Notwithstanding, especially after the reaction has commenced when the starches and/or sugars are employed, there is a tendency for at least some of the cellulose in the coarse papers reaction mass to enter into same despite the necessarily heterogeneous aspects involved in effectiveness of the oxidizing reagent(s) on cellulose, wherein more-or-less interfacial attack must proceed at the physical limits of the cellulose structure. Of course, the above-mentioned natural wood sugars and, to only a somewhat lesser extent, the hemi-cellulosic polysaccharide constituents of the coarse paper and the like are, as is evident, relatively prone to participate in and undergo the indicated chemical transformation. Of course and as has been explained the reaction does proceed with coarse paper(s) alone (even if at times some heated is in need for at least its commencement).

(II). Without limitation thereto or absolute certainty thereabout, the more particularized chemistry (or at least the more pronouncedly susceptible chemical procedures) in the provision of the necessary bonding substance ingredients that are capable (when properly adjusted according to and for content) of utilizing the moisture in paper stock(s) and the like appear to be as set forth in the following equations (with the same equally-applicable when "wet" sawdust(s) are included):

(A). One, and typical, of the basic involved reactions:

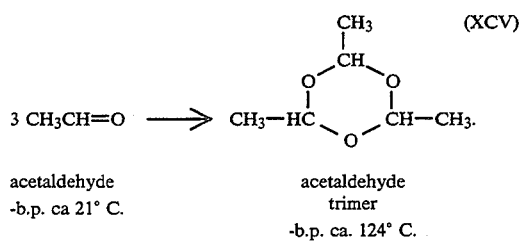 (XCV)

(B). Another possibility:

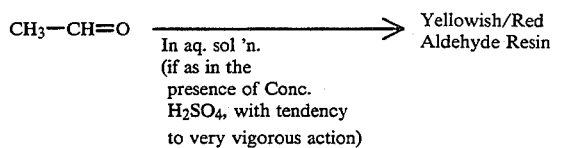 (XCVI)

In the above (and presumably):
(X) the Aldol condensation reaction goes first, e.g.:

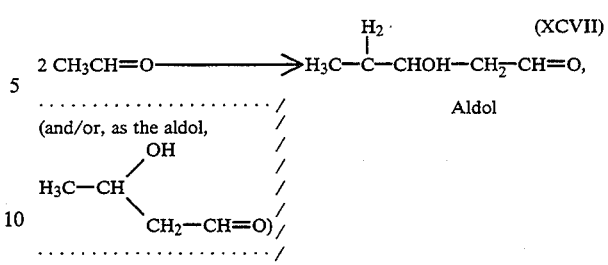 (XCVII)

Or, (Y) - (or X and/or Y), with the above-formulated Aldol losing water to yield:

$$H_3C-CH=CH-CH=O,$$ (XCVIII)

Croton Aldehyde

With, and next in the sequence, (Z); an acetaldehyde, such as

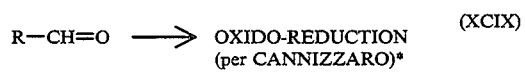 (XCIX)

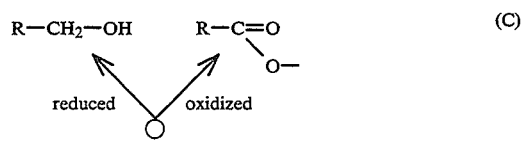 (C)

in which R is usually hydrogen or lower alkyl (i.e., containing up to about 6 carbon atoms), but can also be phenyl and/or cycloalkyl of from 6 to 10 carbon atoms.

(C). Firstly:

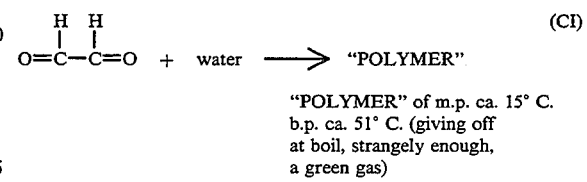 (CI)

"POLYMER" of m.p. ca. 15° C. b.p. ca. 51° C. (giving off at boil, strangely enough, a green gas)

Then:

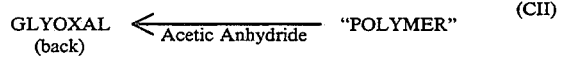 (CII)

And then:

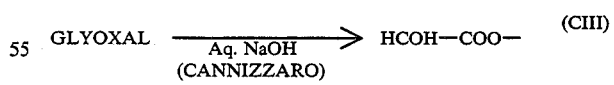 (CIII)

(NOTE: Effect of an oxido-reduction within one molecule).

*FOOTNOTE:—So named according to the discovery and teachings of the renowned and eminent Italian Chemist and Politician, Dottora, Dottora, Prof. Stanislao CANNIZZARO, whose principle work was "Sunto Di Un Corso Di Filisophia Chimica. . . ." (1980).

(D). Sugar (which, as has been noted, is present even without purposeful addition in wood as various saccharides, etc.), with the reaction of glucose possible as an aldehyde in some cases, due to such structural formations as:

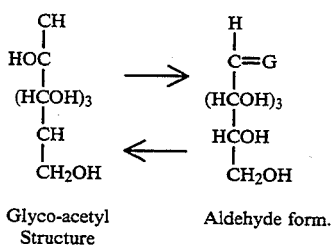

(III). The proportion of starch and/or sugar and/or starch/sugar combinations which such are added to the coarse papers composition or mixture in order to help obtain the bonding constituent therefor varies, as is logical to expect, with all of the particular: lower carbohydrate constituent utilized; oxidation reagent (or combination of reagents) involved; and, of course and to some extent, the given coarse paper, including any admixed "wet" sawdust material (including mixtures of various coarse papers plus any utilized sawdusts and/or the above-disclosed likes and equivalents thereof) involved in handling and manufacture in accordance with the present invention. If desired, as much as 75 wt. % (i.e., 3 out of 4 parts by weight or "pbw") based on total composition weight, of such lower carbohydrate constituents may be utilized. Generally, however, quantities between about 5 and about 50 wt. % are adequate; with levels on the approximately 10-30 (i.e., from, say, 8-22) wt. % oftentimes being quite suitable. When sugars or saccharine materials (such as sucrose, blackstrap molasses, etc.) are purposively added to and included in the lower carbohydrate component, lessened (down to as little as ½ wt. % or so) quantities thereof are generally found to provide very good and satisfactory results.

(IV). The effective proportion of the oxygen- and/or chlorine- and/or bromine-releasing strong oxidizing reagent (or mixtures) thereof and including elemental chlorine and/or bromine and/or oxygen which all effectively operating in chemically nascent form, may be employed individually, per se, or in satisfactory and operable combinations thereof or in beneficial incremental supplementation of other desired reagents) which are utilized for provision of the at least partially water-absorbing—or water-absorption —reaction product from the coarse paper stocks treated (whether or not containing admixing proportions therein of "wet" sawdust and the like or equivalent undried cellulosic plant or vegetable material) so as to intrinsically provide bonding agent in the intermediate or final treated mass to be fabricated depends on: the particular nature of the involved reagent(s); as well as, to at least some relevant important extent (and in the instances when one is utilized), the character of the lower carbohydrate ingredient being reacted and also, to the noted and fundamentally important extent, the given cellulosic material involved and being treated. In general and as a "rule of thumb" maximum, it is unnecessary to employ more than one (1) mole of the non-azotizing and non-alkali reagent or reagent mixture for each individual polysaccharide and/or monocarbohydrate unit (such as the separate maltose units in starch or the glucose and fructose units in sucrose etc.). In fact, such a quantity of the oxidizing reagent is ordinarily much more that that which is really required in order to effect the desired ring-splitting result to get the reactive, cross-linking-capable, hydrophlic (or however obtained insofar as concerns its response to water) cellulosic-bonding reaction product for function in practice of the invention. Thus, satisfactory results are often obtainable with amounts of the oxidizing reagent component that are as little as 0.001 mole, or so, per mole of the cellulosic carbohydrate and/or the starch and/or the sugar material in any purposively utilized or naturally present lower carbohydrate; this amount frequently being enough to bring about adequate ring-splitting and causation of the above-delineated basic chemical reactions believed to be and as is apparently evident involved in and as an integral part of conduction and carrying-out of the present invention. More often, a satisfactory mole ratio of strong oxidizing reagent to polysaccharide and/or starch and/or sugar moles involved may be as low as 0.01:1; and is usually very reliably workable when it is on the order of about 0.1-0.3:1.

(V). When a mineral acid, such as HCl (or hydrobromic, sulfuric, phosphoric and so forth), is utilized to assist chlorine (and/or bromine and/or oxygen) liberation from hypochlorites, hypobromites and the like or equivalent strong oxidizing reagents, it is added in very small proportionate quantities which are almost at a vanishing point level, such as those on the order of one (1) part by weight (i.e. "pbw") of the acid to each 50-1,000 pbw's of the reagent.

(VI). Suitable proportions of other optional but oftentimes particularly helpful and even novelistically advantageous ingredients for inclusion in practice of the present invention (such as reinforcements, thickening agents, latexes and other water-repellents, cements, "adducts", fillers including the siliceous and silicate-containing and pulverized coal types and so forth) are as disclosed in the foregoing Specification.

(VII). Illustration of an appropriate mixed-cellulosic starting material for treatment and use in accordance with the present invention is one that may be made up with: 325,000 pbw of waste newsprint shredded into strips having individual widths of about ¼" (specifically as a used and subdivided copy of the DETROIT FREE PRESS publication of Dec. 31, 1980 from Detroit, Mich.); 125,000 pbw of freshly-cut, approximately 60 wt. % water content (based on cellulose) and No. 12 Sieve Size poplar from Gladwin County Michigan's portion of the MICHIGAN TITTABAWASSEE STATE FOREST Preserve; 50,000 pbw of winter wheat flour (specifically, one such as "MONTANA SAPPHIRE" (Reg. TM Brand of same); and 18,00 pbw of "bleach powder" plus 200,00 pbw of average nominal 1/64" particulated muscovite mica. After thourough mixing and filling of the prepared composition into adequately-volumetric numbers of receptive, flat-slab, low-compression molds of ⅜"×4"×20" cavity size, the calculated reaction of the treated admixture of shredded newsprint and "wet" sawdust occurs. Within eighteen (18) days in the molds, nicely cohesive and rigid, fairly-light-weight, utile slabs or slab-like products are obtained from each. When the same is repeated excepting to add 5,000 pbw of sucrose (i.e., plain table-grade "PIONEER"(TM) Brand Pure Beet Sugar from the MICHIGAN SUGAR CO. of Saginaw, Mich. 48605 to the rest of the combined mass, the same sort of pleasing and satisfying results are obtained in somewhat shorter time. At least equally good results are obtained when either or both of the foregoing recipes are repeated excepting to: (i) replace the "bleach powder" reagent with 36,000 pbw of about 5¼% ordinary strength "household bleach" liquid reeagent (such as "CLO- ROX" (Reg. TM) Brand Bleach from THE CHLOROX COMPANY of Oakland, Calif. 95612); and/or (ii) 13,000 pbw of the chlorsodium salt derivative of cyanuric acid; and (iii) to replace the sucrose with "blackstrap molasses" (such as the "BRER RABBIT" (Reg. TM) Brand of same from RJR FOODS, Inc. of Winston-Salem, N.C. 27102)—or its commercial equivalents—of dark grade quality of same) in like pbw quantity for the beet sugar constituent of the composition(s). Yet, adding about 35,000 pbw of urea to each freshly-made intermediate and pressing each of same at about 160° C. under approximately 600 psi for about 75 minutes yields different (and, at least insofar as concerns physical strength aspects, superior), strong composition board product of the light-weight hardboard-resembling type.

(VIII). In making up a treated newsprint or the like coarse paper stuff (and/or an admixture of coarse paper stock and "wet" sawdust and the like or equivalent undried cellulosic and/or either sole treated coarse paper or admixed paper/sawdust, etc., compositions as well as those to which "adduct" provision for thermo-settability enhancement is intended), any sort of efficient and effective mixing techniques and/or apparatus may be employed. This includes even "hand"- or manual-mixing in the old-fashioned way (using paddles, hoes, shovels, etc., therefor) much in the manner oftentimes utilized for concrete (or cement) preparations wherein ingredient interblending is accomplished, for example, by manual stirring and blending in a trough or equivalent shallow, open tapered-wall tub or the like. More effiaciously, however (especially on larger scales), the mixing apparatus employed may be: a paddle or arm type with or without intermeshing fingers, blades or baffles; a horn shoe type mixer, with or without intermeshing elements; a rotating open pan-type mixer with offset blades, including those known as the "pony" style(s); mixers with double-motion paddles; kneading- and masticating-type(s) mixers; pug mill type(s); soap crutcher-type(s); ribbon-mixer-type(s), especially of the double-helical variety(ies); and so on and so forth. Although any addition sequence (barring prematurely possible deleterious reaction consequences thereof if material handling in not expediently done in appropriate time-wise sequences) is suitable, including when the same is done by means of continuous feeding of increments. A common and usually satisfactory "charge" of "feed" pattern for most purposes involves, by way of non-limiting illustration: addition of starch(ies) and/or sugar(s) (if employed) to coarse paper mass (properly moisturized and water-conditioned for facilitation of handling and treatment reaction) or to newsprint and/or the like coarse paper mass in admixture with "wet" sawdust supplement and/or the like or equivalent undried cellulosic material suitable for starting in and with: the coarse paper to be treated; along with, simultaneously or in short subsequence, filler(s); then reagent input; followed, if and when intended to be utilized in and for the composition, by "adduct" feeding. Of course and as has been indicated, workable variations may be followed in either the indicated or even other sequence(s)—as oftentimes is learned from and/or dictated by "trial and error" techniques, including as a further and often attractive and advantageous variable the partial sequential charging(s) in aliquot proportions of any of all of the involved ingredients employed for composition make-up (VIII-A). If the coarse paper stock to be converted (including any "wet" sawdust and/or other undried cellulosic raw material opted to therein be included with the charge to be treated) is intended to be beaten or "fluffed" to diminish its apparent bulk density, the same may be accomplished prior to reagent contact (with, of course, the cellulosic feed stock preferably carried in aqueous vehicle during the mechanical "fluffing" treatment) or after reagent admixture if bleach or the like is used for the purpose or, in any event, if enough water is present in the mass to facilitate the dedensification during the mechanical apparent-volume-lessening operations to be applied. High intensity mixers and "beaters" of the known type are satisfactory to use for such purpose. At any rate, the intensity of the mixing applied for the "fluffing" accomplishment should be at least about commensurate with that obtainable in the conventional, well-known and widely-employed "WARING" (Reg. TM) Blender apparatus or like or equivalent equipment.

(VIII-B). When the composition being made is to be provided in paste-like form resembling putty, caulking compound, moldable clay formulations, etc., for hand application and/or fabrication or shaping or for trowel-coating or -layering and so forth, the completed composition mass can be nicely and effectively handled for such preparations by means of heavy duty mixers of the sort represented by such masticating apparatus as Banbury Mixers and, sometimes even more advantageously, with the so-called Sigma Blade Mixers for mixing with ease many high viscosity materials. These Sigma Mixers (as exemplified by those of the type manufactured by PAUL O. ABBÉ INC. now located at 377 Center Avenue in Little Falls, N.J. 07424) may, as desired, have so-called sigma blades or varied dispersion blades and be also optionally provided for pressure or vacuum operation and with temperature control jacketing. In fact, the entire coarse paper composition mass preparation, in most cases, can if so wished be usually conducted throughout with expedience and benefit in such a mixing apparatus to make paste-like output.

(IX). If and when an "adduct" is desired to be utilized in preparation of the compositions in accordance with the present invention for subsequent shaped article fabrication(s) per desired product (or products) to be made, it is generally advantageous (sooner or later as the case may be) to incorate the "adduct" into the treated coarse paper, etc., mass and thereafter form and make the "adduct"-containing thermo-settable treated cellulosic mass as soon as practically possible after there has been achieved adequate intimate admixing of the "adduct" therein. Depending upon given particular shaped articles needed to be made or desired for production, any of a wide variety of shaping means and techniques may be utilized for the fabrication. Generally, especially if and when large unit-volume or merchant, relatively "rough"-type wood replacements are being made, fabrication should be done by the most economic, suitable means possible for the purpose. This includes such ways of shaping materials (with appropriate heating means therewith associated) as use of: very simple compression molds; basic extruders; calendar roll operations (especially when sheet- or slab-form products are wanted even if subsequent sizing needs to be performed to cut or sever the output to desired dimensions); embossing or corrugating mills and the like (especially when honeycomb-style shaped article products are desired, such as egg carton form varieties and so on and so forth. Of course, conventional commercial apparatus and equipment can be used (or readily adapted for use) when high quality composition board or synthetic hardboard and the like products are being prepared and/or when the compositions are being employed in and for the fabrication of plywoods and the like. The fabrication at the earliest convenience possible after initial admixture (with, at times and with certain compositions, some auto-curing or preliminary setting-up of the composition also being allowable) has been completed is generally desirable. Sometimes, setting-up delay lets the composition being handled assume a more plastic and pliable or readily-shapeable condition as compared to that in later stages of its bonding procedure (which, at least to some extent, is inherent and self-proceeding in the treated newsprint, kraft or the like coarse paper-derived cellulosic masses especially when the adductive component feed stock(s) have been thereto added); this being especially the situation if the permitted curing is not-too-long permitted to continue. However and not infrequently, somewhat relatively more-cured and comparatively clay- or putty-like, mastic and less gummose texture and characterizable compositions are also capable of fabrication and ultimate shaping (or even for use as "pre-forms" in and for certain molding procedures) prior to final, hardened, set-up attainment of the ultimately more-or-less thermo-set mass. A great deal of any given optimum fabrication procedure to observe depends on the particular equipage used for the purpose and the individual nature of the curable, intrinsically-bondable composition that has been prepared and is being handled. It is, needless to mention, of utmost economy to utilize as little as possible applied heat during or after fabrication to help set up and finally consolidatable and bond the goods being made; this being advantageously energy efficient. This and in connection with their possible optional use is more frequently experiencable when more active "adducts" are utilized and also, in many instances, when the treated coarse paper(s) intermediate stuff(s) contain some of the reacted lower cellulosic or, more properly, carbohydrate ingredients (i.e., starches, sugars, etc.) possible to employ. The extent and intensity of heating also, as may readily be determined in any given situation, depends upon the particular composition being fabricated and, also to some greater-or-lesser degree, the size, shape, configuration, etc., of the product article being made. Thus, relatively more intense and/or higher heating may be expedient (or even mandatory) when the integrally-bondable composition being fabricated is made from a treated given cellulosic intermediate stuff to be formed "as such" or when and if containing a relatively slow-curing and/or -reacting adductive component feed stock. Also, intensified heating assistance may often facilitate quicker and higher-cycle-speed production schedules. Nonetheless, at least certain of the compositions may be curable to suitable fabricated products (again, depending on the nature and quality amongst other features, of the shaped article being made) with minimized and in some cases literally no—or very little artifical—heat needing to be applied; this being the case when the composition involved, as some tend to be, is more-or-less self-curable especially when let to set undisturbed in fabricated form for some extended storage or long periods of self-curing time. Likewise, some of the compositions possible to utilize in practice of the present invention are nicely amenable to being partially cured, as it were, with purposive and substantial quantities of applied heat, after which upon storage for appropriate time periods with generally undisturbed holding therein an integral final curing and setting-up is observed to occur. Nonetheless, the fabricated and/or shaped compositions are handleable in most instances (even if and when some partial heat-curing is undertaken); although if tolerable and economically attractive storage may suffice to achieve the final cure and/or supplemental post-heating (with or without initial heating for thermo-setting purposes) may be necessary or advantageously utilized for achievement of the final product desired. Thus and by way of illustration of this, sheeted material from a calendar mill or roll ouput or leg-simulating products from an extruder are often advantageously stored (after minimum allowable heat input during fabrication) for final completion of fabricated product. Such storage is oftentimes—and with utmost associated economy from warehousing standpoints, etc.—possible to do outdoors and with minimized, if any, protection for period(s) of up to several weeks——or even months—to ensure maximum property development in the fabricated goods and articles being produced.

(X). The temperature levels for setting-up and curing the newsprint, kraft paper and the like cellulosic fabricatable masses involved in practice of the present invention are, most often, quite consistent with those involved in the curing of typical thermo-settable compositions, especially when "adduct(s)" is/are therein included. As is readily appreciable, nonetheless, this does vary with the particular constituents involved commencing with the type and nature of coarse papers or other involved cellulosic treated with the particular oxidizing reagent employed (which largely influences the type and character of substantially water-soluble, intrinsically-selfcurable resinous binder material provided therein) as well as the particular nature and reactivity characteristics, etc., inherent in the adductive component feed stock(s) employed. For any given composition, optimum curing temperature levels and schedules are readily determinable by routine-style of investigative testing. In any event, however, the curing temperature utilized should exceed by some substantial degree the boiling point of water; and, more often, should be at least in the neighborhood of 130°–150° C., or so, as a minimum. Of course, the temperature utilized should not meet or exceed the degradation point(s) of the cellulose materials and/or resinous products contained in any particular mass being fabricated. Frequently, temperatures between about 175° C. and about 350° C. are utilizable; with heat applied in the elevated temperature range between about 200° and about 350° C. being quite often found to be satisfactory. As to consolidating pressures to apply for fabrication purposes, these may be very low or literally at the "zero" point if bulky, non-densified (or low density) products are wanted. However, in order to obtain natural wood-resembling artifacts, a compacting pressure during fabrication of at least about 500 psi should be utilized. More often, when composite board or artificial hardboard and the like products are being made, the applied pressure should be on the order of at least about 1,000 psi; usually in this connection exceeding 2,000–3,000 psi up to 5,000 or more psi in order to obtain good density and fine quality products of the "MASONITE" sort of materials.

(XI). Especially when treated newsprint as coarse papers or equivalent oxidized paper-based cellulosic materials (whether or not in sawdust mixture) are utilized for admixing with any (if any) adductive component feed stock(s) suitable for purposes such an extended variation in practice of the present invention for incorporation therein, it is usually advantageous after initial preparation of the treated mass(es) for getting the like intermediate stuff(s) to drain, squeeze, filter, centrifuge or otherwise take out at least some of the involved spent treating liquor prior to subjection of the composition to to any sort of compressive fabrication. This is particularly the case when the oxidizing reagent employed provides a relatively voluminous quantity of liquid in the resulting mass of the treated cellulosic, as oftentimes results when ordinary liquid bleach formulations are utilized for the treatment. It is frequently preferable and sometimes necessary whenever "adducts" are used to so do prior to the incorporation of certain "adduct" materials in such treated cellulosic mass, especially in the instances when the adductive component may tend to too quickly react with the involved spent liquor and/or other additives which may have been included in the composition. The same applies to fabricatable treated cellulose masses in which other than adductive component reaction- and/or bonding-promoting additaments have been included (such as, for example, cement). In many cases, however, excessive spent liquor removal may satisfactorily be done even after an "adduct" provision (or incorporation of other additives) in the treated goods to make an intermediate stuff mass. To a large degree, the matter of spent treating liquor removal depends to a significant measure on the particular modus operandi of the involved intrinsically-bondable fabricatable composition. Thus, care must be taken to guard against undesirable and detrimental loss of chemically-reactive ingredients in spent treating liquor prior to essential need therefor in the bonding resin formation phenomenon in the mass being handled as might occur with premature spent treating liquid removal therefrom. Also and in the interests of greatest materials-usage efficiency and economy, must also depends on what is to be done with isolated spent treating liquor in determining when, to what extent (if any) and how it should be removed from either the treated intermediated stuff(s) per se prior to "adduct" incorporating or thereafter. Thus, if spent treating liquor is to be merely discarded (a generally wasteful handling thereof), it is relatively immaterial except with respect to materials handling requirements when it is taken from the composition to be or being fabricated. However, and as hereinafter more thoroughly explained, if spent treating liquor is to be utilized for conversion to adhesive by-product materials and/or if it is possible to be re-generated for re-use in treating fresh coarse papers or the like to be subjected in its preliminary handling to the action of the strong oxidizing reagent employed for such purpose, the point or stage of its collection during handling and processing of the involved masses may well be quite material and important. Along this line and especially when the completed mass for fabrication does retain significant proportions of spent treating liquid, it is generally expedient to provide good drainage and collecting means for the remaining spent liquor (particularly if any re-use or recovery is possible or contemplated therefor) in the apparatus and shaping and forming equipment and machinery involved in the ultimate shaped article manufacture. Further in this connection if "adduct(s) are used and as has been indicated, a typical "adduct"-containing treated paper newsprint or the like fabrication operation also and as without same usually yields a considerable quantity of spent liquor whether or not pre-squeezing is done due to the pressing out thereof from the composition of the liquid therein as a result of its compression for shaping and prior to its becoming and conversion into an integral, intrinsically-resin-bonded mass. Extrusion operations also tend to give comparable spent liquor yields.

(XII). Provided no inhibiting reaction occurs and as is oftentimes possible, spent treating liquor may be re-constituted for re-use by regenerating it with a fortifying source of the particular reagent employed for the oxidation reaction on the given cellulosic raw material employed. Thus, if reaction product of the "adduct" employed whenever one is used would be harmfully degraded or rendered undesirable or inept by subjection to an oxidizing reagent (whether or not as a result of the heating during fabrication it is in an already thermo-set form) or if the desired function thereof for use in connection with any given adductive component addition purposes would be deleteriously influenced and incapacitated, regeneration for re-use of spent treating liquid is accordingly impossibilitated and out of the question. Nonetheless, as indicated, and in many cases nothing of such an intolerably unacceptable harmful effect is noted to occur in the refortification of many spent treating liquors possible to encounter and utilize in practice of the invention. When procurement thereof is possible, refortified spent treating liquor is usually found to be an excellent sole or supplementing reagent for further oxidizing reation in initial treatment of the given cellulosic and/or other carbohydrate material(s) involved in the intermediate stuff(s) even when they are prepared for "adduct" inclusion. This is due to the fact that therein-contained residuals after treatment and or thoroughly-wetting, particle-soaking leaching (or equivalent penetration) of the given cellulosic(s) involved plus other possible ingredients in the intermediate stuff(s) or, as well, ever after "adduct" incorporation is being made therein—especially if the spent liquor is obtained prior to final thermo-setting of the involved, inherent resin-providing ingredients of the final fabricatable mass—do furnish yet additional adhesive- and binding-promotional-materials for utilization in and for the resin-bonding potential(s) and capability(ies) of the fabricatable mass being prepared. In this regard and when it is feasible to obtain and utilize spent treating liquid in practice of the present invention, a refortified spent liquor re-used as an oxidizing reagent is frequently found to lend superior bonding characteristics to the unmodified and/or even "adduct"-containing treated given cellulosic material obtained with re-constituted spent treating liquor stock. As an illustration of how a satisfactory spent treating liquor may be obtained in any instance when not prohibited by deleterious reactions involved in the fortification, if common bleach is employed as the strong oxidizing reagent for treatment of the course paper starting materials and sawdust mixture or the like, the spent liquor therefrom may be regenerated satisfactorily by addition in appropriate aliquotes of strong bleach stock or by treatment in alkaline or alkalized media with elemental chlorine. Needless to re-emphasize, such practice may be followed in any event with spent treating liquor taken for refortification prior to "adduct" inclusion in the treated given cellulosic intermediate stuff(s) prepared.

(XIII). Spent treating liquor may also be employed to give a useful adhesive by-product. This may be procured from any or all of the spent liquor obtained in any given operation provided its retained resinous ingredients have not been subject to so much heat at elevated temperature as to cause substantially, if not complete, thermosetting therof so as to (for most purposes) render them incapable of further glue-like or adhesive and bonding capability. Of course, by-product conversion is not undertaken in cases where spent treating liquors (or at least as regards the portion(s) of same to be so recycled) are intended for regeneration to allow re-use thereof as or with the oxidizing reagent employed or if, for one or another reason, they are to merely be wastefully discarded. The adhesive by-product is simply obtained by straightforward drying at temperatures insufficient to cause non-retractable and more-or-less permanent thermo-setting thereof or (equivalent relatively low temperature) evaporation of the spent liquor supply available. The adhesive by-product thereby obtained is generally pulverulent in character and of a heat-settable nature (although, in many instances and regardless, it can also act as a glue with mere drying—even if more-or-less already thermo-set—when employed in aqueous dispersion or other solvent suspension or solution. The obtained by-product is much in the nature and displays a very analogous behavior to the well-known animal glue compositions that have been used for many article-bonding purposes; this being especially so when obtained from spent treating liquor containing no adductive component feed stock(s) additions therein. When not made up into liquid or flowable compositions and if not too far gone in the already-fully-thermo-set sense, the adhesive spent liquor by-product can be used dry to effectable bonding by heat fusion thereof (this being done in the known manner.

(XIV). In addition to exceptionally utile paste-like (plastic) mass very high quality composition board and the like or equivalent hardboard products as well as more-or-less "rough"-quality slabs, slats, boards and sheets, a wide variety of yet other and distinctive varied useful and desirable fabricated articles and products may be provided by practice of the present invention. These are additional to log and other substantially large cross-sectional shapes (which, incidentally, when cut into proper cordage lengths are capable of excellent utilization, amongst other evident applications, as firewood and/or for fireplace and furnace or boiler fire logs and, further to that and when of good quality, inherently high-strength stock, for constructional purposes). In any event and for purposes of non-limiting illustration, particularly when compositions adaptable for fabrication into more-or-less "rough"-stock products are involved, such additional items include: blocks; plankings; shingles; battens (as, for example, those useful for fruit and vegetable crate and box constructions); fence and telephone poles and posts; container separators; decorative trims and shapings; and so forth which are the like(s) of end/or the equivalent(s) of the mentioned items. As is obvious, any or all of said mentioned items can also, if desired, be fabricated from appropriate compositions in accordance with the present invention adapted to provided, high-quality strong and dimensionally-good shaped article products thereof.

(XV). Of particular interest and attraction is the very desirable incorporation of any or all of the aforementioned shapes, forms and so forth in further exceptionally utile composites such as, for example and by way of non-limiting illustration, in a three-ply laminate structure of the bonded newsprint or other coarse paper with or without supplementing ingredient(s) options in the like compositional fabrications pursuant to the invention as the internal consituent or filling of such a construction. Such sort of structure may, quite advantageously, frequently be reinforced by or, probably more importantly, surfaced by and contained within face plies or skins of paper, paper board, cardboard, textiles (such as woven and/or non-woven fabrics of cotton, rayon, nylon, polyesters and/or other natural and artificial and or synthetic fibers), wood veneers, metal and/or sheeted or film-forms of plastics (including inserts and-/or face thereof) whereby—to provide a fundamental but non-restrictive illustration —novel plywood or equivalent forms and the like can be most efficaciously and economically made and provided. These types of sandwich structures or panelings are particularly attractive for many constructional and other apparent usages and end-applications.

(XVI). Loosely-compacted layers of the fabricated coarse (including those with "adduct" modification) paper after its oxidizing make-up and the like compositions (including those with "adduct" modification) pursuant to the present invention (whether in unitary, laminated or sandwich panel constructional form) find good acceptability and wide applicability for insulating, acoustical, panel- or dry-wall or even plaster overlay-backing purposes and other analogous utilizations wherein they need not be fabricated into structurally sufficiently-strong forms for fulfilment of independently self-supported (or supporting) functions but provide other desirable and needed cooperative and associated utilities.

(XVII). Many of the shaped articles possible to prepare in practice of the present invention, including but even additional to those mentioned in the above Items (XIV) through (XVI), may be made——and sometimes with considerable advantage(s) thereabout—from starting coarse paper stocks treated into fabricatable cellulosic compositions in which only a portion thereof consists of a paper material (optionally "wet" sawdust and-/or the like or equivalent undried cellulosic, including mixtures thereof, supplemented that has been subjected to and treated into intermediate stuff(s) form(s) by and with the strong oxidizing reagent utilized. By way of illustration of this, the composition to be fabricated or shaped by any desired means may consist of 1 pbw of newsprint and/or kraft paper and/or cardboard of the like mixed with another pbw of the same (or even a different) non-treated coarse paper stock and/or "wet" sawdust or other undried cellulosic starting raw material with or without any desired and/or appropriate content therein of suitable adductive component feed stock(s). In so doing, the residual oxidizing reagent liquor in the treated cellulosic as well (should an "adduct" be used) as any available and not-totally-consumed "adduct" component therein, also becomes effective on the untreated material contained in the mixture. Such practice tends to reduce the amount of spent treating liquor as well as any (if and when one is employed) "adduct" which may be surplusage in and available from the composition involved and intended for or being fabricated. While literally any proportion of an untreated given cellulosic may be utilized in and for such starting composition mixtures (down to as little, based on total involved composition weight, as 1 or so wt %), it is generally advantageous to keep the ratio of untreated-to-treated given cellulosics in any such mixture in the respective 1:3-4 to 3-4:1 relative weight ratio range; with a 40-50/50-60, especially something just about equal (i.e., 50/50) in respective weight ratio mixture being oftentimes particularly utile and relatively preferable. Excellent quality product is also obtainable by practice of such procedural variation with respect to raw materials utilization. Along this line, all or any desired portion of the untreated given cellulosic raw material of the feed material and equivalent particle or other taken or reduced (as for coarse paper) size variety may likewise be replaced by raw (or even treated to the extent that greater involved particle size allows insofar as concerns effectiveness thereof) wood or other appropriate untreated cellulosic starting material of a particle or other diminished size that is, on the average, greater than that normally considered as fitting within the sawdust range(s). Thus, and by way of illustration, wood (or the like or equivalent cellulosic) chips, particles, shavings, slivers, etc. (of the type(s) normally used in chipboard, particle board and so forth) may be thus incorporated in compositions in accordance with the present invention for the preparation and production of truly chipboard-, particle board- and other larger particulate composite hardboard (or composition board-) resembling products; if not, in fact and for all practical purposes, amounting to the same thing. For such manufacturers (as well as for many other of the products and shaped articles obtainable in practice of the invention) it is desirable, along the already-noted lines, if the final bonding, intrinsically-generated and provided, resin content is kept within reasonable latitudes thereabout within the approximate 2 or so to 4–5 wt % range, based on final weight of the involved shaped article product or article of manufacture contemplated. Novel (and also useful) paste-like and plastically formable masses (for putties, coatings, etc.) may also be analogously ameliorate benefited.

(XVIII). At any rate, newsprint and the like or equivalent coarse paper stock per the foregoing disclosure(s) thereof is/are the fundamental and primarily-contemplated starting untreated cellulosic material stock(s) mica (expanded or not) and/or asbestos filling and for utilization in practice of the present invention. The coarse paper materials tends to provide very fine-grained and other excellently-propertied and -charactered fabricated end products in the practice hereof. Notwithstanding and as has been indicated in the foregoing Specification including that pertaining to incorporated utilization of untreated cellulosic complements of various sorts in compositions according to the present invention as is set forth in the immediately-preceding Paragraph (XVII), admixtures of the newsprint and/or other coarse paper stock to be treated and tremendously upgraded into novel and exceptionally-utile products with "wet" sawdust(s) and the like or equivalent undried cellulosic materials may oftentimes and very nicely be utilized. In such coarse paper(s)/"wet" cellulosics admixtures, a very great proportion of the latter may, if so desired, be utilized in and combined with the coarse paper component of the raw material cellulosic starting mass to be treated and handled pursuant to the invention. This, actually, may be to the very great extent that only a relatively-miniscule measurable amount of the coarse paper ingredient —as something on the order of perhaps 5–10 down to only 1 or so wt. % of the starting material admixture—is in the composition. In most cases, however and in events when the starting material is not entirely a coarse paper stock, the proportion of the course paper component in an admixed "wet" sawdust or the like mass is usually desirable to be at at least $\frac{1}{4}$ and more often at least $\frac{1}{2}$ by weight of the total admixture.

ILLUSTRATED EXEMPLIFICATION OF THE INVENTION

Figure 2:
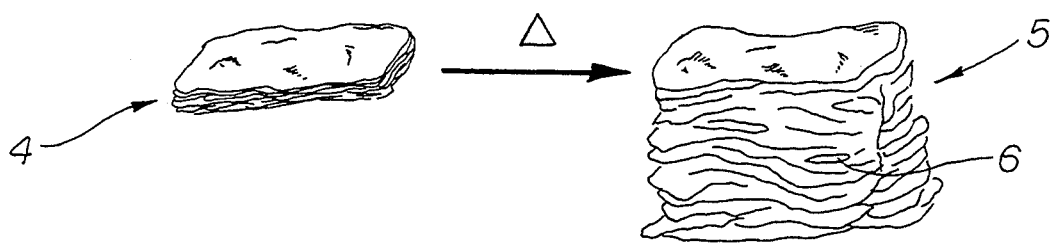

The invention is pictorially represented and demonstrated in and by the four (4) views of the accompanying Drawing, wherein, as they may be taken in conjunction with the Written-Portion of this Specification and the overall instant disclosure (as well as a basis for the following claimings):

FIG. 1 is, for simplicity and convenience, a flow-sheet type of diagrammatical presentation representing procedure(s) and results —with advantageous variations and alternatives also therein depicted—of manner(s) of practice beneficially possible to embody in keeping with the present invention, the same being demonstrative in this regard of more-or-less preferred forms of the invention in both basic and/or diversely-altered extended possibilities thereof and therefor so as to amply show somewhat particularized ways in which the said invention may be aptly and satisfactorily worked and accomplished;

FIG. 2 figuratively portrays the making of expanded mica;

FIGS. 3A through 3E, inclusive, are illustrative of the "fluffing" phenomenon which, by intensive beating procedure(s), can beneficially be resorted to for physical treatment of the coarse paper (including other cellulosic raw material) stock being converted and processed; and FIG. 4 contains graphs illustrating test results obtained in the Second and Third Illustrations hereafter set forth.

By way of recapitulated explanation of what is brought forth in the above-described FIG. 1 of the Drawing, the flexibility and multiple operational procedure(s) possibilities and variability(ies) of practice according to the invention is therein made abundantly plain and quite evident. The discernable context in the FIG. 1 flow-sheet presentation is in full keeping with that which is herein revealed and disclosed. As may readily be gleaned by and is in clearly-focusd apparency from introspection of FIG. 1, a variety of product goods and article products are nicely possible to quite readily be put out and obtained by selected following of the therein-demonstrated results indicated.

For example, using shredded used and waste newsprint as the cellulosic starting material which is adjusted to proper moisture content for best handling and treatment purposes and without purposive addition of any extraneous lower carbohydrate and/or "wet" sawdust components as supplemental carbohydrate or cellulosic values in the raw material feed stock, treatment with the strong oxidizing reagent utilized is first done. After that, with appropriate liquid removal, etc., fabrication as desired of the treated newsprinted mass can be accomplished.

Optionally, as has been explained, the starting coarse paper mass may be: (i) supplemented with a "wet" sawdust admixed for simultaneous oxidizing treatment with the coarse paper in the mass; and (ii) physically diffused and conditioned by "fluffing", likewise, one or more starch(es) and/or sugar(s) may also be fed into for supplementation of the starting raw material coarse paper mass.

Further optionally, and as has also been explained, there may be made an "adduct" incorporation in any desired starting new material coarse paper mass which may be done at the time of or after initial treatment of the coarse paper mass with the strong oxidizing reagent. The "adduct"-modified composition may then, by way of a somewhat more particularized description at this point, be pressed for manufacture of a fabricated shaped article product using beneficial heating assistance at a suitably-elevated temperature in and for the operation. There is thus possible to obtain a composition board sort of product (remarkably like, in strength and quality, "MASONITE"). This, in illustration thereof, may be made in feet-(i.e., "'")-measured dimensional sizes of customary and rather general popularity such as $4' \times 8'$ panels having a nominal $\frac{1}{4}$ to $\frac{1}{2}"$ (and even greater) thickness.

If outdoor utilizations of other than paste-like mass products are envisaged for any particular compositional form (vis., straight forward or modified) of the treated coarse paper mass, the preparation to be fabricated may be further so constituted as to provide a so-called "tempered" hardboard product by beneficial addition thereto of a low molecular weight wax or paraffin and/or a latex ingredient and/or hydrophobic fumed silica, etc. Using appropriate molding or calendering apparatus for product formation, the output may be of the type (as is consistent with common trade designations and nomenclatures) that is known as "SIS" —meaning smooth on one side; or "S2S"—meaning smooth on both sides. Such sorts of products (depending on specific formulations used) usually a density in the approximate 7-10 or so pounds per cubic foot (i.e., "lbs/ft$^3$") range (with, if or when conversion to the Metric system is wanted, can be multiplied by the numerical factor "0.016018463" if gram(s)/cubic centimeter are called for or by the factor "16.018463" if and when kilogram(s)/cubic meter are called for).

With slight alternations (and, again, also variable with formulation) in the compacting pressure and application of appropriate necessary heating as is illustrated in the FIG. 1 flow-sheet, a comparatively low-quality and more-"roughly"-natured product, more-likely-terminatable or described as "ersatz" wood, may be obtained. This may be imbued with either only indoor or indoor/outdoor durability characteristics and capabilities. Such a product may be made into any panel or sheet structure dimension(s) as needed or wanted, such as $4' \times 8'$ (or more or less) in typical thickness(es) of $\frac{1}{4}$ or $\frac{3}{8}"$ to $\frac{3}{4}$ to 1" in such dimension. Density of such a product may advantageously range from between about 5 and about 7 lbs/ft.$^3$.

With further apparent and already-explained alterations in the compacting pressure (using, of course, appropriate—if any—heat input), formulation and apparatus utilization per the same illustration of FIG. 1, a type of thermal and/or accoustical insulation board (whether or not contained or to be contained within "skins" in a sandwich panel and the like plywood-type construction) can readily be gotten in both regular and fire-resistant or retardant grades (depending on adroit oxidizing reagent usage and/or additive selection for the purpose) in typical density ranges of from about 3–5 lbs/ft$^3$.

As also indicated in FIG. 1, the final shaped article product may be surface-coated or finished for any desired decorative and/or furtherly protective purpose(s) and/or, especially if a more dense and/or stronger product is wanted, may have its internal void spaces filled or partially-filled with epoxy(ies) and/or other plastic or at least flowable or interjectable material or substance capable of being so utilized and functional for such extra feature incorporation in and modification of product(s) made according to the invention.

Of utmost salience and significance, however, is the fact that when maximumly expanded mica is employed as the sole filler ingredient in practice of the instant invention, especially when news-print as the coarse paper is utilized as the only cellulosic raw material stock involved, unusually light-weight and non-bulky products are obtained either in paste-like mass forms (as for putty, caulking, coating and overlay applications and the like or equivalent usages) or in solid, slab-like board stock of one sort or another. In fact, the densities of such variety of products in accordance with the present invention and as may be obtained from the immediately-above-delineated variations of composition(s) pursuant hereto is frequently on the literally amazing order of only about 0.9 lbs/ft$^3$ or so and generally, regardless of how handled in manufacture, seldom (if ever) in excess of about 2.5 lbs/ft$^3$. This, as has previously been indicated, is clearly and easily within the normal and typical ranges of and for balsa wood.

The spent or waste treating liquor from many of the operations possible to conduct pursuant to the flow-sheet representation of FIG. 1 typically contains, along with any leached-out and non-combined or even possibly combined but not adhesively set "adduct", somewhere in the neighborhood of 15 or so wt. % (based on total liquor weight and, oftentimes, with a $\pm 2\frac{1}{2}$ wt. % latitude thereabout) of solids —mostly at least partially (if not entirely) oxidized lignin and, likewise, at least partially oxidized sugars and so forth from the treated cellulosic material. Possible re-fortification and re-use thereof for oxidizing reagent purposes, although discussed in some detail in the foregoing, is not indicated or portrayed in FIG. 1. Alternatively and as is indicated in FIG. 1 (and consistent with the explanation thereabout put forth in the foregoing), the spent liquor (or a portion thereof) may be converted to by-product adhesive material on non-thermo-setting (especially if adductive components and/or reacted resinous products thereof are also therein included) evaporation or drying thereof.

With further reference to FIG. 1 of the Drawing and as has been mentioned in the foregoing, care and common sense must be taken to not mix and "adduct" material(s) that may have been used directly with the raw material coarse paper stock or the like if any interference will thereby be caused to the necessary preliminary oxidizing reaction of any given and utilized oxidizing reagent upon and with the given cellulosic being treated and converted to the final or preliminarily to the intermediate stuff(s) utilized in practice of the present invention.

And with yet further reference to said FIG. 1 and at the risk of some tautology thereabout, overemphasis cannot be had of the extreme care and caution for avoidance of inhalation, skin- and clothing-contact, etc., that must be taken when any utilization of any form of asbestos for composition-filling and/or resultant composition and article-material-of-construction is undertaken.

In FIG. 2 of the Drawing there is illustrated the already-described conversion of mice particles to expanded mica form thereof. As is therein illustrated, reference numeral 4 generally identifies a normal mice flake or particle obtained by comminutation of the mineral recovered from its natural deposit. Upon application of heat at an elevated temperature (according to well known procedures and manufacturing processes for the purpose), an expanded mica particle is formed which is composed of the expanded mica flake, shown generally by reference numeral 5, within which there are thereupon formed and contained internal, interstitial void or air spaces 6.

The mica particles employed should generally and preferably be of relatively fine granular size. Forms of same along this line that are comparable to ordinary, fine beach sand are usually suitable. In any event and for most purposes, nominal average granule or particle size of the mica employed (whether merely subdivided and particulated from the mineral as it occurs and is mined or otherwise recovered or partially- or fully-expanded) is ordinarily satisfactory when on an order of between about 1/64" and ⅛. Deviations to lesser-sized fines or coarser grains in this for particularized and/or specialized product purposes may, as will be readily appreciable by those skilled in the art, sometimes be followed depending on unique requirements that may be encountered in given instances. In any event, process mixing(s) tends (as to actual ultimately-gotten sizings) to significantly pulverize the mica.

FIGS. 3A–3E, inclusive, of the Drawing dispositively demonstrate, with illustration (in imitations of actually-performed testings) in relatively-small, laboratory-scale utensiles for the visual showing, the effects of "fluffing" by intensively-applied mixing or "beating" means (such as commercial pulp beating apparatus and the like(s) or equivalent(s) thereof). For the indicated depictions, screw-cap glass bottle containers of about ¼ liter capacity are portrayed in replication of what was actually utilized as basis for the portrayals made. The cellulose raw material demonstrated was shredded newsprint equivalent to that more completely described in Part One of the Second Illustration of the following WORKING EXEMPLIFICATION OF THE INVENTION Section of this Written-Portion of the Specification. The materials that were "fluffed" in the exhibits of FIGS. 3E and 3F were intensively beaten for about a minute each in a standard, laboratory-style "WARING" (Reg. TM) Blender machine at the top (i.e., highest speed) setting thereof.

Figure 3A:
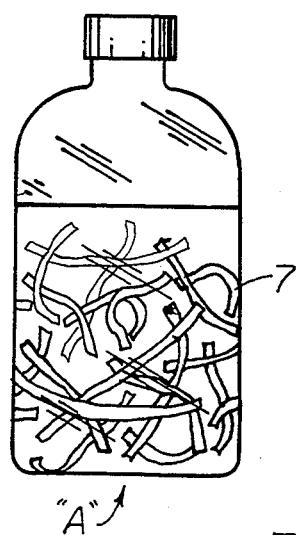

FIG. 3A illustrates the appearance of ½ gm. of the shredded newsprint (identified by reference numeral 7) in 100 gms. of water (making about a ½% by wt. incorporation of the newsprint in the water) without any reagent or mixing influence of any sort being applied to the contents of depicted bottle "A". As is apparent, the shredded newsprint addition to the covering quantity of water as were employed 9 wherein the former was charged into the latter) resulted in a mere sinking of the shedded newsprint in the water with it more-or-less remaining in such posture in submerged, somewhat-uniform dispersion in the aqueous medium without separation or other disintegration to any appreciable extent of the newsprint shreddings or other noticeable change thereabout (excepting for the obviously-expectable thorough "wetting" soak thereto imparted). It is significant to take into account that, as has been proven and recorded by experimental investigation, such undisturbing immersion of newsprint in plain water remains the same for a period of as long as eighteen (18) Months with no signs after the time of alteration of or in the noted condition.

Figure 3B:
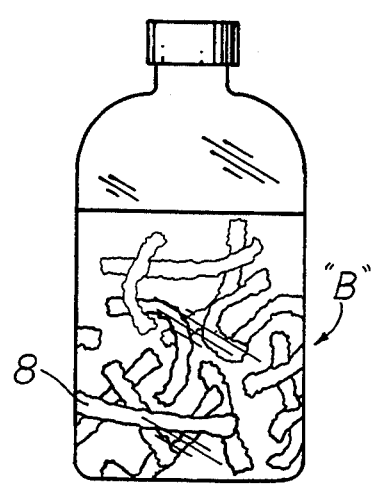

FIG. 3B shows the appearance of a like charge of news-print and water as employed in connection with the basis for FIG. 3A excepting that, as to the contents of bottle "B", the mixed newsprint and water were exposed for one (1) hour to heat so as to remain at a temperature of 100° C. (i.e., at boil) for that length of time. As can be observed, the boiled newsprint shreds 8 kept about the same appearance as the unboiled shreds 7 in bottle "A" only, as differentiation therebetween, some observable slight swelling of boiled shreds 8 in bottle "B". This condition also remained for the same, above-mentioned 18-Month period.

Figure 3C:
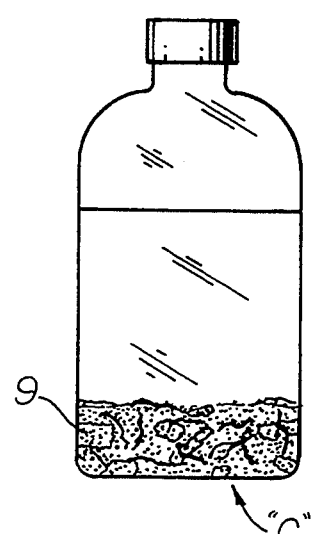

FIG. 3C shows the appearance of the same charge of newsprint and water as employed in connection with the bases for FIGS. 3A and 3B excepting that, in bottle "C", there was also added about 5¼ wt. % of common household bleach (with, of course, NaOCl as the active strong oxidizing reagent therein). As shown and after 18 Months standing in the bleach-containing aqueous medium, the shredded newsprint strips 9 in bottle "C" exhibit a reduced volume level in settled dispersion in the liquid covering them and have become partly disintegrated insofar as concerns their original physical cut-strip integrities.

Figure 3D:
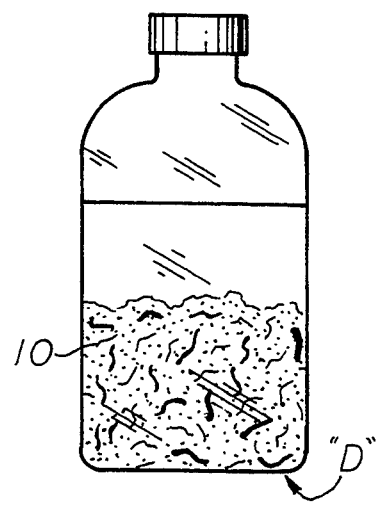

FIG. 3D shows the appearance of the same newsprint/water charge utilized for the illustration of FIG. 3A excepting that the combined materials were subjected to the explained, intensive mixing and pronounced and very strong shearing agitation affecting of the said "WARING" Blender treatment. As portrayed, the residual disintegrated and diffused newsprint strip remnants 10 show the relative bulk volume increase (and corresponding gain in apparent density) imparted to the "fluffed" shreds in bottle "D".

Figure 3E:

FIG. 3E shows the same bleach-containing charged contents mentioned in connection with the above-explained FIG. 3C excepting to also physically impart thereto the said "WARING" Blender treatment. The newsprint shred remnants so exposed and treated (identified by reference numeral 11) in bottle "E" are, as illustrated more finely subdivided with less resulting apparent bulk volume in water suspension increase —with much more definite and noticeable settling thereabout—than that of the non-bleach-treated shred remnants 10 as depicted in bottle "D" of FIG. 3D. This appears to be a physical influence of the reaction.

As is brought forth and plainly discernable in and from the showings of FIGS. 3A–3E, inclusive, of the Drawing, the "fluffed" shredded (or equivalently size-reduced) newsprint raw stock (especially) which may oftentimes be utilized with marked benefit for obtension of maximumly-lightened products in practice of the present invention has and is characterizable by the fact that it is imbued (due to its intensive mechanical beating) with a greater-than-normal apparent bulk volume (and/or bulk density) as compared to the undiffused and at least substantially non-disintegrated raw material stock when suspended in a covering quantity of equal volumes of water for dispersion thereof, the same or at least substantially closely analogous phenomenon is effected when other coarse paper stock is subjected to "fluffing" and/or when admixtures of suitable undried cellulosic raw materials (including "wet" sawdust(s) are analogously subjected to an intensive beating treatment.

In many cases, as has been demonstrated in and by said FIGS. 3A–3E, inclusive, of the Drawing, the "fluffed-up" cellulosic has a dispersed apparent bulk volume as great as twice (and sometimes even more) as that of a corresponding dispersion of the same cellulosic raw stock in water not exposed to such mechanical diffusing treatment.

WORKING EXEMPLIFICATION OF THE INVENTION

The following illustrative Examples and demonstrations still further illustrate the invention. In these, all parts and percentages (unless otherwise indicated) are to be taken on the weight basis by which they were worked and (also unless otherwise indicated) all temperatures are in °C. For the bulk of the data produced and as a matter of greatest expedience at the time for the testings done, the oxidizing reagent employed was ordinary bleach (i.e., the aqueous solution of NaOCl) used either in the household strength grate of about 5–5¼ or so % or in the commercial (so-called) "swimming pool" grade having a typical concentration of 10–15%. The stronger swimming pool bleach was generally diluted with water for utilization at a desired strength or for any regeneration(s) done of spent treating liquor for re-use.

First Illustration

The below-listed generalities, "rules of thumb", guidelines, advantageous conditions of and for working and other observations come from a great deal of experimentation and investigation in actual reductions to practice of the invention. These, as will appear, are supportive of the revelation s and disclosure set forth in the Specification foregoing.

(1). The coarse paper employed (be it newsprint, kraft paper or cardboard stock insofar as concerns the most common source availabilities of same) is must advantageously and as has been mentioned used, waste or scrap material from the sole but understandably more than coincidental aspect and basis of economic cost availability. In fact, used and discarded newspaper(s), besides being of exceptionally good suitability for employment with obtention of consistently good results thereabout as the starting cellulosic material for practice of the invention and quite satisfactory from such point of view, is likely as readily collectable and obtainable (as well as probably as easy to physically handle as a raw material) as any of the coarse paper stocks possible to employ. While virgin or unused coarse papers, as also has been mentioned, are certainly workable, there is generally for present aims and benefits and also in connection with the fundamental merit of sailient economy achievable in practice of the invention a decided disadvantage cost-wise when fresh and unused stock is gotten for supply furnishments. Shredding on and with ordinary and rather conventional paper-shredding machinery for physical size subdivision of the stock to be used is a very practical and expediently-good means of raw material preparation for utilization pursuant hereto; this being especially the case with newsprint. No other special preparation of the coarse paper goods is necessary for their adaptation to processing input; and, as has likewise been brought out in the preceding Specification, even the indicated shredding or the like cutting is not an absolutely mandatory pre-conditioning requirement. Particularly with waste newspaper(s) but also with other raw material stocks of coarse paper feed materials, care should be taken to avoid in the supply excessively objectionable and possibly intolerable containments of such undesirable things as greases or oils, metal wires and other pieces, string and cordage, stones and other sorts of rocks, debris or yet-different foreign objects which may deleteriously influence the intended processing and/or detract from the desired end products to be made.

(2). When the coarse paper supply for treatment is to be supplemented by feed (at any desired point) admixture at the beginning of or during treatment therewith of an undried cellulosic constituent, "wet" sawdust is a practical, exceptionally-useful and in most situations and locations a relatively readily-available commodity for combination with the coarse paper employed. "Wet" sawdust from softwoods (including coniferous varieties of trees) is oftentimes advantageous in that more natural resinous materials are therein to be found which, in the course of the processing, tends to inherently enhance to at least some small degree the bonding effect obtained. On the other hand, sawdust from hardwoods frequently is found to provide rather good-propertied and strong product with oftentimes thereabout fabrications having better surface characteristics more or less skin and quite-favorably comparable with that commonly-observable in such commercially-available particle wood products as "MASONITE". Sawdust from such States as Michigan and Wisconsin (as is also the case with those from Ontario in CANADA) tend largely to be from such timber as pine, spruce, birch and popler amongst many other varieties there obtainable. Sawdust from States such as Ohio and those with closely-like geographic and climatic conditions are largely of the hardwood variety coming from such trees as oak, maple and hickory.

(3). If and when a "wet" sawdust feed supplement or after-addition is undertaken in practice of the present invention, a good uniform fineness therein tends to provide superior results in both the intermediate, if any, and in any event the final stage(s) of the processing. In this and above and beyond the foregoing teachings as to suitable particle size and chip or larger wood-particle after-additions, it has been found that any sawdust utilized as an undried cellulosics (or even other) material in practice of the present invention containing chip pieces therein that have a length of about 1 cm. (ca., 0.3933" or 393.3 mils) and a width of from about 0.2 to about 0.1 cm. (ca., 39.3 to 76.6 mils) will work well; but too many inclusion much larger than the tends for undesirable and possibly inconsistent bonding and handling problems in the material being worked (unless purposely added to an already fully-compounded formable mass).

(4). When using aq. NaClO bleach of about 7% concentration, a good volumetric ratio for coarse paper mass treatment in it (whether or not supplemented with "wet" sawdust and/or the like and reckoned on packed-down and non-fluffy or voluminous bulks of the coarse paper) is roughly about 1 volume of relatively compacted coarse paper with or without other cellulosic constituents to ¼ volume of the bleach. This, of course, will be found to vary with the fluffiness or apparent density of the coarse paper stock (especially, as is contemplated in this connection, when it is in shredded or other finely-substituted form) as well as with the nature of the particular coarse paper and/or other cellulosic being treated and also as well as with the strength of the leach employed. And, regardless, optimum ratios of the oxidizing reagent to the coarse paper stock made up for utilization are readily determinable for given situations by routing testing procedures.

(5). The container or vessel (even when enclosed) in which the coarse paper is to be treated should have a capacity of about 4–5 or so times the volume of the liquid involved in the reaction. This ensures avoidance of spillage or undesirable overflow which otherwise might occur during early stages of the treatment when a considerable amount of bubbling and boiling is typically and quite generally encountered as a result of the reaction. Exceptions to this, as will be apparent, may be found in instances as when continuous processing(s) is/are utilized and the coarse paper mass being treated is put in a forced passage through a suitable reactor for such handling particularly when pressure conditions are in effect during the treatment.

(6). Bleach concentrations of about 7% are ordinarily observed to be quite satisfactory for most usages, lower strength bleach compositions are operable, expecially when a relatively-warm ambient temperature is encountered and/or some heating is utilized. In such situations, only 5–6% bleach is found to be quite suitable. When the treatment is conducted in colder (i.e., notably less than a normal room temperature) surroundings, bleach strengths of 8–9% are advisable. A 10% bleach composition generally causes a very rapid and "hot" oxidizing treatment reaction. The spent liquor taken after treatment is generally salty and slightly alkaline in nature; and it has nowhere near the potentially-hazardous nature in use and as a consequence of contact as the fresh (or reconstituted) bleach, per se.

(7). Excess spent liquor may be decanted or filtered-off of the treated coarse paper mass (including masses of same supplemented with admixed "wet" sawdust and/or like or equivalent undried cellulosic starting material). If drier treated coarse paper stock is desired, resort may be had to pressure-squeezing techniques for increasing spent liquor removal. Sometimes a relatively drier treated coarse paper mass avoids inconveniences and/or difficulties in handling excessive amounts of the spent liquor during the fabrication operation. This is especially so when substantial pressure is applied to the treated coarse paper material being formed into a desired shaped article product. If and when such is to be undertaken and included, "adduct" incorporation at this point is frequently advantageous and tending for an optimized effectiveness.

(8). In terms of water levels or containments in the course paper masses being treated and worked using bleach as the oxidizing reagent for the purpose (and/or to ensure given cellulosic saturation and provide media or vehicle function for both physical handling and chemical reaction with bleach or other reagents) that of an about 87 or so % water content is typical in the mass undergoing or after it has finished treatment; with, correspondingly-typical, associated salts(s) (mostly from bleach) content(s) of about 4 or so % and, with a generic characterization thereof, "woody" (or diverse cellulose-originating) solids of about 9 or so %. The woody solids, of course, are from the course paper stock employed excepting in instances wherein the supply of course paper is extended or supplemented with a "wet" sawdust or like undried cellulosic under which circumstances the woody sources come from all the cellulosic starting ingredients. The mentioned figures relate to a common sort of operation with reference to the involved coarse paper reaction mass during treatment make-up and reaction and prior to pressing during which incremental or sequential given cellulosic starting material(s) is/are not added after the initial feed point. Nonetheless, "they are on balance fairly representative of overall-valuated analyses expectable in practice of the invention with bleach oxidizing reagent employment. When economies are made in bleach input (as is hereinafter more specifically illustrated), the mentioned salt(s) level(s) may be found reduced to something on the order of only 2% and possibly even lower. Actually, the range of water (particularly with bleach oxidizing reagent) workable in coarse paper masses (including those with "wet38 sawdust, etc., supplmentations) prepared for and subjected to treatment is from about, in most instances, 50 to about 99% water. A more widely-usable range lies within the approximate 75–95% water content limits; while quite often the same is found to be and carried out within the 85–90% parameter.

(9). For many pressure molding (and equivalent) fabrication operations when good heating is utilized to facilitate the shaped article formation, pressures on the order of between about 250–500 to 6,000 pounds per square inch (i.e., "psi"), advantageously from about 750–3,000 psi, may be utilized; all in general line with that disclosed in the foregoing. If and when conversion of these given pressure values are wanted or need to be in the Metric System, each (1) psi exerted can be multiplied by the numerical factor "0.0680460" to arrive at the pressure in atmospheres or by the factor "70,306958" to determine applied grams/square centimeter or by the factor "0.070306958" for measurement(s) in kilogram(s)/square centimeter or, for expression in millimeters of mercury at 0°, the factor "51.749" may be used. In order to at least accelerate total product bonding, accompanying molding and fabrication temperatures of from at least 100° to about 400°, advantageously between about 150° and 350° are useful. Under such conditions, a completely-formed and fully-cured, bonded product, depending in specific behaviorism(s) to actually-involved particular composition, can generally be obtained in molding cycles of from 5 or less minutes to usually appreciably less than but up to an hour or so; the indicated generalities holding at least about the same even when cross-linking-facilitating "adducts" are included in the treated compositions to be fabricated.

(10). Ordinarily, anywhere from between about 10% and about 60%, usually in the neighborhood of from 20% or so to about 40 or so %, of the treated (vis, with bleach or other oxidizing reagent) coarse paper mass is found to have thereby been rendered more-or-less "water-soluble" in nature. This is representatively so whether or not the starting raw material coarse paper supply is or is not extended and/or supplemented with a "wet" sawdust and/or like or equivalent undried cellulosic supply and/or by addition to the reaction mass of lower-carbohydrate starch(es) and/or sugar(s). The materials generated by the bleach or equivalent oxidizing reaction, of course, serve to provide the intrinsically-generated resin-bonding components for binding the residue of the treated given cellulosic during fabrication and, further if and when employment of same are utilized and in addition to the basic binding function involved, to additionally react with any utilized "adduct" materials to additionally enhance binding and structure-integrating capability(ies). In instances when one or more "adducts" are employed, there is an ameliorated tendency for the water-soluble fraction of the treated mass (so produced by reaction with the oxidizing agent) to revert in the article formation process to water-insoluble material; this being more pronounced when heat is employed in the fabrication procedure. The integrally-bonded products are commonly found (along and within the above-indicated lines) to contain between about 2 or so and, more likely 5% and about 15%, more frequently on the order of 8 or so (like from 6 to 10%), of the binding material derived from and generated by the reaction product with and from the coarse paper with or without the sawdust of the bleach or other oxidizing reagent; the said binding material, as disclosed, being very capable of and prone to combine with any "adduct" constituent in the composition when such cross-link enhancing substances are also utilized in practice of the invention.

Even additional and more specific illustrations now follow in further exemplification of the immediately-foregoing mentions.

Second Illustration (Part One)

Three (3) separate experimentations were conducted to demonstrate the results obtainable with three (3) differently-composed preparations of newsprint obtained as waste paper. For all of the experiments, the used newsprint employed was discarded printed copy of the MIDLAND DAILY NEWS (For Midland, Mich.) from its publications during the beginning of November, 1982. The waste newspaper was passed through a standard paper shredder for sample preparation so as to provide it in uniform strips about $\frac{1}{8}$" (cs. 0.203 cm.) in width. The newsprint had a thickness—at least nominally and actually quite uniformly—of approximately 3 mils (cs., 0.003" or 0.0763 cm.). Its moisture content, as calculated on total weight of undried newsprint, was about 9.3%.

The first Preparation (identified here and for present purposes as "Sample "A"") was a simple and straightforward formulation mixture of 68.2 pbw of the shredded, waste newsprint (which actually contained 61.8 pbw dry mass essentially and literally-completely cellulosic wood-originating solids) and 600 pbw of tap water. Sample "B", the second Preparation, was made-up with another 68.2 pbw of the same used and shredded newsprint with 600 pbw of "ROMAN" Brand Cleanser (Household) Bleach manufactured and distributed by the ROMAN CLEANSER COMPANY of Detroit, Mich. 48212 and containing, besides inert ingredients standard for such commercial products, $5\frac{1}{4}$% active NaOCl in aqueous solution. For the third Preparation (Sample "C"), a duplication was made of Sample "B" excepting to add thereto after the bleach treatment (as is below more fully described) 6.2 pbw, about 10% of the total dry cellulosics in the newsprint, of commercial, agricultural grade urea.

Sample "A" which, in effect, merely had about a ten-times (i.e., 10X) water addition made to the newsprint was allowed to soak for about 1 hour. The water-saturated newsprint was then pressed into a plurality of individual test specimens at 160° under 50 atmospheres of applied pressure for 1 hours, after which each specimen, following removal from the mold for preliminary inspection, was returned to the mold for another hour of exposure to the heat at said elevated temperature to ensure obtention of constant final weight specimens. Each of the test discs had a diameter of approximately 3" (ca., 7.62 cm.) and an average thickness of about $\frac{1}{4}$" (ca., 0.846 cm.). The average finally dried weight of the Sample "A" newsprint discs was about 3.5 grams (i. "gms.").

The Sample "A" disc had a white visage on which there was replicated in a pretty-much uniform and fairly dense pattern remnant of flecked and still-legible print registrations from the waste newspaper. Needless to emphasize, these were utterly garbled and, excepting for some individual-letter ghost imagery, incomprehensible. Strips could be peeled off the disc surfaces with considerable ease; and each disc appeared to have a more-or-less layered structure semblance. While remaining fragilely somewhat integral, the architechurally essentially frail discs were not particularly good or other-than-mundane in looks or to be possessed, both appearance-wise and in connection with physical properies therein evident, any better than (if, indeed, actually comparable to or as good as) papier mâché. They were, as is brought forth in the following Part Two of this Second Illustration, greatly prone to being quickly penetrated by water and to exhibit a relatively sponge-like propensity to water-absorption; the results of same causing marked distention and deformation in and of each of the discs when subjected to the water to render them somewhat puffy (with accompanying retention of such fairly-sleazy sort of swollen and distorted, non-abrasion-resistant and substantially-bloated condition even after consequent re-drying of same following hydro-soaking). No significant weight loss in either disc was discernible as a result at the soaking. But, easy physical disintegratability was well pronounced.

The Sample "B" shredded newsprint/bleach Preparation was, after and with uniform mixing, permitted to remain in combination for almost two (2) hours to effectuate the autocatalytic oxidizing treatment of the "ROMAN" Brand Bleach on the cellulosics in the coarse paper supply. As it occurred, this phenomenon is further particularized and displayed in the ensuing Part Three of this Second Illustration.

After the treatment, excess spent treating liquid was removed from the reacted newsprint mass by gravity filtration. The thus-treated material was then molded into a plurality of separate discs in the same manner (and of the same dimensional sizes) as was done with the Sample "A" formulation. After final drying, each disc was found to contain about 23.8 gms. of remaining materials from the initial newsprint charge. Thus, from the original newsprint feed involved for Sample "B", there was found in the ultimately-fabricated, treated Preparation therefor a yield of about 92% of and from initial dry mass solid newsprint starting material employed. Furthermore, upon re-checking after the hydro-soaking test detailed in the below-given Part Two of this Second Illustration, the ultimately re-dried Sample "B" material was noted to have experienced an additional loss in solid residuals of about 4%.

The Sample "B" discs were very strong and smooth-surfaced in nature, exhibiting a very fine grain and a good, solid structure. They looked and felt much like regularly-available and commonly-employed present-day grades of commercial hardboard(s) of the artificial variety. Their resistance to becoming abraded by an ordinary fine-toothed, double-cut, flat standard carpenter's file was excellent, being at least as durable and withstanding of filing action as a piece of natural white (hard) oak construction lumber of the quality adequate for furniture making. They could be sew-cut to fine, square-cut edge facing exposures or sections with a common band saw. Additionally, they had exceptionally good and remarkably surprising and gratifying resistance to water penetration under most rigorous exposure testings for determination of same; that being more fully brought out in said Part Three of this Second Illustration.

The Sample "C" Preparation was started and done exactly through finish of the bleach treatment of the shredded newsprint charge per the same manipulations outlined above for the Sample "B" specimens. When the excess treating liquor had been squeezed out of the treated mass after conclusion of the two-(2)-hour bleach treatment, the 6.2 pbw charge of urea was dissolved directly in the extract. The "adduct"-containing spent liquor was then returned to the treated newsprint mass and thoroughly mixed therethrough and therewith. Then, following another gravity filtration, the Sample "C" final Preparation was molded into another plurality of disc specimens using the identical fabrication procedure for same as followed in the above-described making of the Samples "A" and "B" disc specimens. Each of the Sample "C" specimen discs weighed approximately 29.3 gms. The proportion of originally present liquid recovered upon final extraction of the treated, urea-containing mass prior to mold charging for fabrication was measured to be about 445 pbw, this as seen in the involved material balance representing about 66% of total feed stocks and materials charged its solids content on total spent liquor weight basis was 13%. Since the final Preparation of urea-modified Sample "C" was fed to the molds for fabrication at a very high water-to-solids ratio (roughly 3:1, respectively), about 22.3% of all the water plus solids (dissolved or not) contained in the obtained mass (just prior to final liquor extraction before molding) was determined to have been evaporated from the discs specimens during their molding-fabrication operation in the oven heated to the indicated 160° temperature for the purpose. Final gravimetric analysis of each Sample "C" disc made after the hydro-soaking investigation reported in said Part Three of the Illustration showed an additional 4.5% weight loss to have been caused by this vigorous subjugation to water.

The Sample "C" discs were at least equal in all respects to those made from the Sample "B" material being of analogous good appearance, properties and qualities. Their resistance to water penetration, as shown in said Part Three of this Second Illustration, was even better than that of the Sample "B" molded product.

Second Illustration (Second Part)

Specimen discs as obtained in the first Part above of this Second Illustration from each of Samples "A", "B" and "C" were then subjected to a Water Penetration Test. In this Test, each disc specimen being evaluated as to water-penetration resistance was immersed for a two-(2)-hour at ambient room temperature in a 0.7% aqueous solution of "TIDE" (Reg. TM) Brand Home Laundry Detergent manufactured and distributed to PROCTER & GAMBLE COMPANY, Inc. of Cincinnati, Ohio 45202. A 500 cc, bath of the hydro-soaking, detergent-containing bath was employed for the testing of each disc, with a fresh batch of the bath used for each individual specimen testing operation that was performed. During the test and at regular time intervals, each disc specimen undergoing the evaluation was removed from the bath, drip and towel dried, weighed to assess water pick-up and then returned to the hydro-soaking until it was again time for data taking. Specimen time when withrawn from the bath for weighings was discounted as regards the actual soaking time durations to which the test specimens were subjected. The results obtained are set forth in the following TABLE I as well as being graphically depictable, if desired, by plotting(s) of same for any study and/or comparison purposes wanted.

TABLE I

| Water Penetration Time Into Various Disc Specimen Moldings. | | | | | | |
|---|---|---|---|---|---|---|
| Sample "A" Disc (Below) | | | | Sample "B" Disc (Below) | | |
| Disc Wt. Start (gms). | From Start Δ Wt. (gms.) | % Wt. Gain | Soak Time, Min. | Disc Wt. Start (gms.) | From Start Δ Wt. (gms.) | % Wt. Gain |
| 30.7 | 0 | 0 | / 0 / | 28.7 | 0 | 0 |
| 45.0 | 14.3 | 46.6 | / 17 / | 30.9 | 2.2 | 7.7 |
| 47.7 | 16.7 | 54.5 | / 51 / | 32.2 | 3.5 | 12.2 |
| 49.0 | 18.3 | 59.6 | / 84 / | 33.1 | 4.4 | 15.3 |
| 49.8 | 19.1 | 62.2 | / 120 / | 34.0 | 5.3 | 18.5 |
| 27.8 | 0 | 0 | / 0 | | | |
| 30.0 | 2.2 | 7.9 | / 17 | | | |
| 31.1 | 3.3 | 11.9 | / 51 | | | |
| 31.9 | 4.1 | 14.7 | / 84 | | | |
| 32.6 | 4.8 | 17.3 | / 120 | | | |
| Sample "C" Disc (Above) | | | | | | |

As is evident in the foregoing tabulation as well as would be seen in any graph to be made of this data, the disc specimens from Samples "A" and "B" were vastly superior in water-penetration resistance and capability. This, as is readily comprehensive, is indicative and dispositive (along with some other of the results pointed out in the above Part One of this Second Illustration) that practice of the instant invention for preparation with particular respect to the oxidizing bleach treatment of the waste newspaper charge provided (unlike the nothing that happened in and with the Sample "A" Preparation material) results in a highly-crosslinked coarse paper mass structure capable of providing excellent quality fabricated product having very desirable properties and characteristics. In this, it should be noted that as compared to the test specimen evaluated from fabricated Sample "A"—which experienced a literally intolerable for artificial composition board purposes 62.2% water weight gain after two (2) hours of the hydro-soaking—the Sample "B" test disc gained only 18.5% water pick-up after undergoing the same soaking test. Sample "C" product, having the benefit of additional reaction contribution of the urea "adduct" component in accordance with a varied and extended (as explained) practice of the present invention was even superior in its hydro-soaking resistance to water penetration the the Sample "B" product. As indicated and given, the two (2) hour immersion testing of the Sample "C" disc resulted in only a 17.3% water pick up at the conclusion of the test.

To further demonstrate the properties and characteristic of newsprint converted to fabricated finished shaped article structure a Sample "B" disc was subjected to a three-(3)-day hydro-soaking in the same "TIDE"-containing formulated bath as used for the water-penetration evaluations above given. At the end of this prolonged period, the discs specimen was removed from the bath (wherein all its accessible internal voids and pore structures had become very near to being if not completely filled with the detergent-containing water from the bath. Upon removal from the bath, the disc was very thoroughly dried throughout its entire body structure. It was found to have lost 10% of its original weight, the extracted substance(s) being the water-leachable components on intensive soaking of the Sample "B" Preparation. Notwithstanding, the exterior dimensions of the heavily-soaked and re-dried Sample "B" disc remained precisely as when first molded; this further indicating the positive presence of a crosslinked, water-resistant, porous structure in and of the Sample "B" fabricated product.

When taken out of the detergent-containing water after its three-(3)-day soaking and prior to its drying, the Sample "B" disc test specimen weighted, in its water-filled condition, 48.1 gms. After its final drying (in and by which there was removed from the soaked, water-filled disc about 19.4 gms. of water), the remaining test specimen disc weighted 25.9 gms. Accordingly (taking into account for the given result that the "dry" density of cellulose is 16.1 gms/cm.$^3$), the dry density of the Sample "B" disc specimen was, after its prolonged soaking and ultimate re-drying, 0.73 gms./cm$^3$ (ca., 45.58 lbs/ft$^3$). Its "void" volume factor was 55%.

When a thermosettable epoxy resin formulation, such as a suitably-catalyzed "D.E.R.-331" preparation, is forced under pressure to preponderantly fill the pores in the 55% void Sample "B" specimen disc, and followed by "in situ" curing, so exceptionally strong and densified, further worked and fabricated product having a density approaching 0.85 gms/cm.$^3$ can readily be obtained characterized in posessing, for many purposes, even better qualities and properties than the non-impregnated base specimen from which it was made.

Second Illustration (Third Part)

To demonstrate the autocatalytic behavior of the waste printed newsprint mass/bleach reaction, the temperature was kept during the bleach-treating phase of a Sample "B" Preparation. Time/temperature measurements were made in the course of this treatment of the newsprint with the oxidizing reagent. The room temperature in which the experimentation was done was about 21°. The time/temperature data measurements are as below indicated in the following TABLE II. No heating of the reactant materials was provided for the autocatalytic reaction which took place.

TABLE II

| Autocatalytic, Self-Heating Newsprint/Bleach Reaction | | |
|---|---|---|
| Time, In Minutes | Temperature | Remarks |
| 0 | 21 | Soaks Readily And Turns Yellow In Color Quite Quickly |
| 3 | 32 | |
| 6 | 38 | |
| 9 | 45 | |
| 10 | 50 | |
| 11 | 53 | Reaction Mass Assumes Gray Coloration |
| 12 | 58 | |
| 14 | 61 | Gas Bubbles Observed To Commence Escape From Reaction Mass |
| 19 | 62 | |
| 23 | 60 | With Continuation Of Gas Bubbling From Reaction Mass |
| 27 | 59 | Same as Immediately-Above As To Bubbling |
| 29 | 56 | |
| 43 | 48 | Gas Bubbling Diminished If At All Continuing |
| 80 | 37 | Swollen Thick Mass Free From Visible Water But Readily Rid Of Considerable Water From |

TABLE II-continued

| Autocatalytic, Self-Heating Newsprint/Bleach Reaction | | |
|---|---|---|
| Time, In Minutes | Temperature | Remarks |
| | | Contents By Squeezing, Pressure Filtration, Etc. |

The data in the above TABLE II is graphically portrayed and demonstrated in and by the Curve (I) in FIG. 4 of the Drawing hereof.

When shredded kraft paper (as, for example, that obtained from common Grocery Store carrying bags) is used to replace the newsprint in combination with the bleach, the same sort of autocatalytic reaction is experienced with "heat peaking" during the course of the oxidation treatment thereof usually not quite as pronounced, albeit closely analogous, during the course of the reaction. Curve (II) in FIG. 4 is a plot of such a reaction.

This is more explicitly shown in the immediately-following example of same that was done to bring out the point.

Ordinary heavy duty kraft paper grocery bags (like those obtainable in 1/6 bbl. capacity 12"×7"×17" sizes from the CURD PAPER BAG MFG. CO. of Ludlow, Ky. 41016 under the Registered Trademark "EXTRATUFF") were shredded to ⅛" strips. The moisture content of the kraft paper was 7.9%. The procedure for making Sample "B" set forth in Part One of the foregoing Second Illustration was repeated excepting to substitute this shredded kraft paper for the newsprint. The autocatalytic reaction phenomena was noted during the bleach treatment, with the same going in just about the same pattern (excepting to involve slightly lower rises in temperature) as illustrated in said Curve (II) FIG. 4 of the Drawing.

In this connection, when the entirety of all three (3) Parts of this Second Illustration was identically duplicated except to replace the newsprint coarse paper stock with similarly shedded grocery bag kraft paper, very close to directly corresponding results are obtained.

Likewise, when the immediate foregoing (as to substitution of kraft paper for mewsprint) as well as the entirety of all three (3) Parts of this Second Illustration are identically repeated excepting to replace the bleach with either "bleach powder" or the chloro-sodium salt of cynauric acid in proportional equivalent quantities (relative to bleach quantities disclosed) of each and employing about the same amount or ratio(s) of water in the coarse paper masses being treated, etc., for fabrication, closely analogous results are realized in and for all instances involved.

Still further likewise, when all of this Second illustration (including the immediately above-mentioned variations) are redone in the same way—and even with cardboard as the coarse paper stack—excepting to make filled mica and/or asbestos formulations, commensurate and directly comparable results are also in and for all involved instances achieved.

Third Illustration

To show the incapability of pure cellulose to be utilized in practice of the present invention and its inapplicability for present contemplations and purposes, a supply of while "bond"-grade writing paper (literally pure cellulose without appreciable content of the hemi-cellulosic(s), starches, sugars and lignins contents of coarse paper) was shedded into ⅛" as was done with the waste newspaper in the Second Illustration hereof.

To 40.4 pbw of this shredded "bond" paper there was added 400 pbw of the same "ROMAN" Brand Bleach utilized in said Second Illustration. The materials were thoroughly mixed at the approximate 20° room temperature at which they were blended.

Over a period of five-(5)-hours, temperature measurements were taken at fairly regular intervals during twelve (12) readings so made. No temperature rise whatsoever (not even a single (1) degree) could be detected during the period. At the end of the 5-hour period, the excess liquid was squeezed out of the "bond" paper that had been soaking therein. It remained the substantially unchanged, insofar as was detectable by routine test, bleach composition as originally charge. No satisfactory fabrication could be made of the bleach-soaked "bond" paper mass. Curve (III) in FIG. 4 of the Drawing is a plot of this.

As is demonstrated in the immediate foregoing, it is evident that cellulose alone is insufficient for purposes of usage in practice of the present invention.

Fourth Illustration

To about 68 pbw of "ARGO" Brand Pure Corn Starch for cuisine use, etc., as obtained from the Best Foods Division of CPC INTERNATIONAL INC. of Englewood Cliffs, N.J. 07632 there was added at a temperature of about 21° 600 pbw of the same "ROMAN" brand Bleach as utilized in the first illustration. With stirring, the combined mass spontaneously heated up and resulted in a permanent solution (or apparent solution without any solids flocculation being experienced after the treatment even after four (4) months standing) of the reaction product of the bleach-treated corn starch. As is well known, corn starch in plain water causes no exothermic resultant and will not long remain in dispersion but tends to quickly settle out of the physical mixture therewith made.

This demonstrated that in the practice of the present invention the oxidizing reagent treatment involved on the given cellulosic(s) in the coarse paper mass(es) being handled and converted into intrinsically-generated resin-bonding substance inclusions making the entire treated mass suitable for direct fabrication likely first proceeds via the hemi-cellulosics present along with attack on the lignin constituents(s) also involved. The initiating reactions suspected, without limitations or restriction to any such theory of the invention, probably and as has also been indicated then nurtures and possibilitates at lest some actual oxidative reaction(s) upon the polysaccharide cellulosic values contained in the coarse paper masses being utilized.

Fifth Illustration

A commercial supply of muscovite expanded mica particles was obtained. These, by and large, were somewhat cylindrical in particle conformation and had, roughly, a nominally-average particle length of, say, about 1/64" to ⅛" or so and a nominally-average particle width of approximately 1/32"→<1/16". The muscovite material prior to its cellularization and conversion into expanded mica had a density of 2.80 gms/cc$^3$. The bulk density of the product expanded mica therefrom which was employed for this and subsequent. Illustrations was 0.100 gm/cc$^3$. The expanded mica material thus contained, by volume, about 96.4% of empty or void (air filled) space on an average in each of the blown up particles.

To demonstrate the effect of mere mixing with water of the expanded mica filler above described, 105 gms. of same (having a settled volume measure of about 1,050 ml.) were doused (or poured over) with 550 gms. of water. In a very short while, all of the applied water, with some stirring assistance for uniformity, soaked into the expanded mica filler component. The resulting wet expanded mica had about the same look about it as and very much resembled ordinary loose mica particles.

However, when the same above-specified proportions of expanded mica and water is intensively-admixed in a "WARING" Blender, a smooth liquid (which, surprisingly, very much reminded one of the appearance of "chocolate milk") resulted. The weight of the intimately blended mixture was 655 gms. It had a density of 1.081 gms/cc$^3$ with an included solids content, based on total weight of mixture, of 16.0%. The suspended solids were determined, even after their intensive interblending with the water, to still contain about 33% by volume of entrapped air therewithin. Thus, these suspended particles were made up approximately of ⅔ mica mineral content and ⅓ encapsulated air figured on the volume basis.

To show the result of merely drying the intensively-mixed suspension of mica in water, a portion of same was dried without any application of pressure thereupon in an open, rectangular "PYREX" (Reg. TM) Brand glass dish which had been lined with aluminum foil for reception therein of the suspension. The dried contents, after some minimal shaping with a file in order to secure a rectangular block therefrom, were recovered in such geometrical form with dimensions in centimeters of 4.2×5.1×1.6 and a volume of 34.2 cm$^3$ with a wight of 66.7 gms. Its density, accordingly, was 0.37 gms/cc and its porosity (i.e., volume percentage of entrapped air) was determined to be 86.8%. The sample had poor strength and was pronouncedly friable in nature.

The percentage of shrinkage upon drying of the above-described, intimately-mixed mica/water suspension was found to be about 53%. This shrinkage is probably due to capillary forces within the water medium which attract the solids therein contained as if given particles of the mass are being pulled together with yet others therein. Incidentally, the 16% mica suspension employed is, insofar as concerns disperable solids contents achievable in such mixtures, about the maximum practically-obtainable in order to still maintain a pourable mass or mixture of such sort.

Sixth Illustration

In order to characterize and emphasize the difference(s) between water-soaked expanded mica filler, as is brought out in the immediately-foregoing Fifth Illustration and that, per se, of otherwise unmodified, bleach-treated newsprint, the following experimentation was done.

To 252 gms. of shredded newsprint (as identified in the Second Illustration above)there was added, with mixing, 1,260 gms of boiling water and 1,260 gms. of 5½% "ROMAN" Brand Household Bleach which, in fact, taking into account the NaCl salt content of same, contained in aqueous solution a total of about 10¼ wt. %, taken on total solution weight, of solids. The total weight of the of the resultant mixture was 2,665 gms.

After allowance for completion of the autocatalytic reaction which occurred in the mixed mass (during which there was an evaporation during the involved reaction of 107 gms. water), the remnant, converted material had a weight of 2,665 gms. and contained a 14.5 wt. % of total dispersed solids therein of which 252 gms. were organic in nature and 132 gms. were salts. Of this remnant, the measured density of the bleach-treated newsprint was 1.055 gms/cc while that of the used bleach liquor was about 1.0 gms/cc.

It was difficult, upon drying of the removed, converted newsprint substance to sharply define the % shrinkage involved upon drying thereof (unlike the case in analysis of the water-soaked, subsequently-dried mica of the Fifth illustrated). Noteworthy as a reason for this is the fact that, even by hand pressure(s), the liquor-soaked newsprint suspension is possible to be squeezed and compacted together with increasing diminution of volume thereof without any exactitude being capable of possible ascertainment as an indication of such mechanical densification manipulation.

Seventh Illustration

With an overview maintained of the results of the foregoing Fifth and Sixth Illustrations, experimentation was performed as reported immediately in the following upon a bleach-treated newsprint mass (in aqueous, etc., suspension) with expanded mica filler (of the same characteristics as described in the Fifth Illustration) added thereto.

To do this, a quantity of the same newsprint as identified in the Second Illustration was admixed with about five-times (i.e., "5X") its weight of boiling water plus 5X its weight of $5\frac{1}{4}$% household bleach. After the reaction (autocatalytically) of this, the bleach-treated newsprint mass was further disintegrated by intensive mixing in a "WARING" Blender machine.

More specifically: the newsprint mass was 229 gms. of the shredded raw stock; 1,150 gms. of the boiling water; and 1,150 gms. of the bleach which, in actually, was composed of 11 wt. % total salt (of which $5\frac{1}{4}$ wt. % was NaOCl) from 127 gms. of the salt dissolved in 1,024 gms. of water for bleach make-up). The newsprint/bleach admixture was permitted to autocatalytically undergo reaction over a two (2) hour period during which time it heated up spontaneously to a maximum temperature peak of about 160° F. (i.e., ca. 70° C.).

Next, along the lines given in the Fifth Illustration, a mixed expanded mica filler suspension was prepared in and with the aid of "WARING" Blender mixing, in which 229 gms. of the mica was interblended with 1,197 gms. of water to so as to give a resulting thick, 16 wt. % suspension of the expanded mica in the water medium.

After that, the prepared newsprint/bleach admixture and mica suspension components were fully mixed together. This resulted in a mass for further working in accordance with the present invention that contained: 585 gms. of solids (consisting of: 229 gms. of the shredded mewsprint; 127 gms. of salt; and 229 gms. of the pulverulently-comminutated mica) and a total of 3,371 gms. of water (with 1,024 gms. of that from the bleach reagent, 1,150 gms. of same from the added hot water dilution; and 1,197 gms. of that from the water utilized in mica suspension make-up). The fully-mixed mass had a dispersed solids content of 14.8 wt. %, based on total mass weight, and a measured density of 1.08 gms/cm$^3$. Its composition, based on total weight basis, was: 85.2% water; 5.8% mica; 5.8% newsprint; and 3.2% salt. In verification of this, an actual oven dried sample of the fully-mixed mass was determined to have had 14.6 wt. % solids therein (well within tolerances of experimental error insofar as regards analytical confirmations). The clear liquid constituent of the fully-mixed mess (when physically squeezed-out of same) was determined to contain 3.2 wt. % dissolved salt(s) solids.

Emulating the slab-making procedure described in the above Fifth Illustration, 1,315 gms. of the fully-mixed mass was placed in an aluminum foil-lined "PYREX" tray and dried in a 150° C. oven until a constant weight of 192 gms. of dessicated solids was reached. A rectangular specimen piece, firm and strong in physical aspects and characteristics, was thus finally obtained. Its density was 0.24 gms/cm$^3$.

The percentage of volumentric shrinkage found to have been experienced by the fully-mixed mass subjected to (and after completion of) the drying process was 57%. This, for practical purposes, was literally identical with that (53% value) shown in the above Fifth Illustration for the dried expanded mica sample, per se.

Eighth Illustration

Another portion of the fully-mixed preparation of the foregoing Seventh Illustration (specifically, the make-up with the 14.6–14.8 wt. % solids content) was further modified by water dilution down to a 12.4 wt. % solids level so as to better fluidize same for flowability, working and more effective and easier handling in the "WARING" Blender. After further intensive shearing agitation treatment in the Blender, the diluted mass was considerably smoothed in appearance and texture (i.e., the included solids components thereof were even additionally physically-triturated and noticeably less cumbrous to handle and process as to the entire involved mass). In this diluted condition, the mass was too thin in its consistency to be able to be manually kneaded, shaped, etc., in order to form (by hand) art objects and so forth.

The diluted mass was then subjected to dessication treatment without heat application by putting it on a mild vacuum filter until there was therein reached a solids content of 18 wt. %. This de-watered composition was excellently-manipulable, -formable and -shapable by hand, holding any shape into which it was conformed after such working(s). A 4.8 cm$^3$ per side cube was therefrom formed. After oven drying, the product cube was found to have: a total weight of 25.5 gms.; a density of 0.37 gms/cm$^3$; and a percent shrinking (upon drying) factor of only 38% by volume (again but even more considerably less than that of the plain mica/water formulation of the Fifth Illustration).

Ninth Illustration

An extra low density composition in accordance with the present invention was prepared by the expedient of (after making-up of the finally fully-mixed mass for fabrication) resorting to drying procedure wherein rather slow dessication conditions (in which the involved chemical reactions continued to take place) were first utilized followed by exposure to heat at a more elevated temperature to get the finally-dried product.

For this composition, a reacted and converted newsprint mass was prepared by adding 1,260 gms. of $5\frac{1}{4}$% "ROMAN" Bleach and 1,260 gms. boiling water to 252 gms. of the same sort of shredded newsprint as was utilized in the Second Illustration. During the autocatalytic reaction that immediately followed, the temperature of the mass undergoing the strong oxidation treatment peaked at 168° F. (ca. 75.58° C.) without any application of external heat from the ambient Room Temperature condition at which the bleach and water-mixed newsprint mixture was started for the desired reaction. The converted newsprint component was then intensively-mixed in the "WARING" Blender.

Along with this, a 252 gms. expanded mica filler constituent was made into an aqueous 16.5 wt. % slurry according to the procedure set forth in the Fifth Illustration.

Both the bleach-treated newsprint and the slurried mica components were then intimately-, physically-mixed together, A very smooth resultant composition was thereupon obtained. It did not show the slightest "breaking-up" propensity as is sometimes exhibited, upon kneading and physical working thereof, by analagous bleached newsprint (and other coarse paper) compositions left unfilled with mica (and/or asbestos) components. This very even-consistency composition was found to therein contain about 15.2 wt. % of dispersed solids (again, on total composition weight).

The resulting, fabricatable composition was then poured into a saran film-lined "PYREX" tray of rectangular shape to a depth of about ¾". This was then subjected to drying in an oven that, for the initial ½-day, was at a "slow", 100° C. setting after which the piece was finally-dried for several additional hours at 140° C. in the oven.

A very strong, board-like object was thereupon obtained. It's density (as the described shaped-article product) was measured to be an unusually-low and extraordinary 0.15 gms/cm$^3$. There was practically no shrinkage detected in the finally dried slab from the fabricatable composition first poured into the drying tray. In other words, the approximately 15 wt. % solids composition poured into the tray was converted upon drying, with literally no volume change, to the resultant 0.15 gm/cm$^3$ density object finally obtained.

The undried, fully-mixed mass was also found to make an excellent caulking compound which could be readily and easily applied to places needed and air-dried in place after deposition to an excellent caulking emplacement well fixed in place for subsequent function as such.

Tenth Illustration

The undried, fully mixed preparation of the Ninth Illustration was pressed (in such undessicated formulation) over and on to a metal chicken wire substrate. This was done by hand- and spatula-trowelling, after which it was permitted to dry into a very sound ¼" composite, reinforced structure. This sort of product was found, by actual implementations thereof, to be very good for the construction of various structural objects of either novelty and the like design or for shelter (such as housing) elements and purposes.

As is notable in the foregoing, many of the products of the present invention are particularly characterizable in minimizing, after fabrication, shrinkage from the composition(s) used for their preparation to very low density products and/or those showing a very low, minimized and often "vanishing-point" shrink loss extents.

Analogous and equally surprising and unexpected results can also be realized when the same or equivalent emodimentations in accordance with the present invention as revealed in the foregoing Illustrations are repeated with other compositions pursuant thereto including those made up with other coarse papers (or mixtures thereof with newsprint) and those containing other subdivided undried cellulosic raw starting materials, including particulated "wet" sawdust, in the cellulose mass utilized as well as those compounded and filled with unexpanded mica and/or asbestos alone or in combination and mixtures with one another and/or with expanded mica constituent.

Many changes and modifications can be readily made in and adapted to embodiments and practices in accordance with the present invention without substantial departation from its apparent and intended spirit and scope, all in pursuance and accordance with the same as it is set forth and delineated in the Claims hereto appended. With didactic specificity thereabout and further in this connection, it is to be clearly understood and taken into account in reading of the Claims that the compositions herein involved are reactive in nature from the point of their first preparation to final finishing thereof which may be in and/or with the ultimate fabrication procedure that is utilized. Hence, especially insofar as concerns specific and particularized Composition Claims of those hereinafter set forth, the same are to be considered, construed and taken as reading upon the involved compositions in either starting, intermediate or fully-reacted stages.

What is claimed is:

1. An article of manufacture comprising a fabricated, shaped and integrally-bonded, cured article having a matrix built up from oxidation of at least a part of a cellulosic mass prepared by subjection to curing and bonding conditions of a basic fabrication composition comprising, in admixture, components of:
   (a) the cellulosic mass, useful for chemical conversion by strong oxidation into a curved, essentially reticulated resinous material portion of the intractable fabricated article, which contains, based on the total weight of components (i) and (ii) of said cellulosic mass, as follows: (i) at least about 1 weight percent of a coarse cellulosic paper stock selected from the group consisting of a newsprint, a kraft paper, a cardboard, and mixtures thereof, which has retained a substantial remnant of a lignin and which has retained some of at least one remnant selected from the group consisting of a hemicellulosic, a starch, and a sugar; (ii) from 0 to about 99 weight percent of an at least substantially undried, particulated, fibrous plant cellulosic material, plus (iii) from 0 to about 75 weight percent, based on the total weight of the fabrication composition, of a lower carbohydrate constituent in addition to any in components (i) and (ii) of said cellulosic mass, selected from the group consisting of a starch, a sugar, and mixtures thereof;
   (b) an effective quantity from about 0.001 to about 1 mole for each carbohydrate unit in said cellulosic mass of a strong, non-azotizing, non-alkali oxidizing reagent for said chemical conversion, and for at least partial water-solubilization of at least a portion, of components (i) and (ii) of said cellulosic mass and all of component (iii) of said cellulosic mass, said strong oxidizing reagent capable of destructive attack upon at least some of components (i) and (ii) of said cellulosic mass when subjected to article-fabricating conditions and also upon all of component (iii) of said cellulosic mass, and said strong oxidizing reagent being nascent-oxidation-reactant-forming and selected from the group consisting of a chlorine-releasing material, a bromine-releasing material, an oxygen-releasing material, chlorine, bromine and mixtures thereof, adapted for suitably providing chlorine, bromine and/or oxygen for said chemical conversion;

(c) which water, in addition to any in said cellulosic mass and any in components (a) and (b), is present in an amount from 0 weight percent, based on the total weight of the fabrication composition, to that amount which is adequate to furnish sufficient moisture to the fabrication composition in order to facilitate physical handling and said chemical conversion, and (d) from about 1 to about 75 weight percent, based on the total weight of dry solids contents of the fabrication composition, of a finely divided filler inclusion selected from the group consisting of particulated mica, fillibrated asbestos, and mixtures thereof, uniformly incorporated throughout the admixture;

provided that the basic fabrication composition excludes added resin-forming adduct feedstocks of a non-cellulosic and of other non-carbohydrate nature, and wherein the basic fabrication composition components are present in an amount sufficient to substantially prevent shrinking and swelling of the matrix of the fabricated article, after contact of the fabricated article, dry, with water for three days at room temperature followed by re-drying.

2. The article of claim 1, wherein the component (ii) of said cellulosic mass is "wet" sawdust, and wherein said coarse paper stock contains a newsprint sheet material.

3. The article of claim 2, wherein said coarse paper stock is a newsprint sheet material, and wherein the component (iii) of said cellulosic mass is 0 weight percent.

4. The article of claim 3, wherein the component (ii) of said cellulosic mass is 0 weight percent.

5. The article of claim 1, wherein internal void spaces of the matrix of the basic fabrication composition of the fabricated article are further at least partially filled with epoxy(ies), other plastic or at least flowable or injectable material(s).

6. The article of claim 1, wherein said filler inclusion is present in a gravimetric quantity at least approximately equal to the gravimetric quantity of said cellulosic mass.

7. The article of claim 2, wherein said filler inclusion is expanded mica.

8. The article of claim 4, wherein said filler inclusion is expanded mica present in a gravimetric quantity at least approximately equal to the gravimetric quantity of said newsprint.

9. The article of claim 1, which is in the form of a slab, panel or sheet.

10. The article of claim 7, which is in the form of a slab, panel or sheet.

11. The article of claim 1, which has thermal insulation and density values commensurate with these of conventional balsa wood.

12. The article of claim 5, which has thermal insulation and density values commensurate with those of conventional balsa wood.

13. The article of claim 6, which has thermal insulation and density values commensurate with those of conventional balsa wood.

14. The article of claim 1, which has a density about from 0.15 to 0.37 grams per cubic centimeter.

15. The article of claim 1, which forms at least a section of a shelter construction.

16. The article of claim 3, which forms at least a section of a shelter construction.

17. The article of claim 5, which forms at least a section of a shelter construction.

18. An article of manufacture comprising essentially a low-bulk and light-weight intractable, fabricated, cured product formed from oxidation of a basic reactant mass containing the following components:

(I) cellulosic component(s) of a substantial amount of wet newsprint, kraft paper, and/or cardboard, which has retained a substantial remnant of a lignin and which has(have) retained some of at least one remnant selected from the group consisting of a hemicellulosic, a starch, and a sugar;

(II) an effective quantity from about 0.001 to about 1 mole for each carbohydrate unit in said cellulosic component(s) of a strong, non-azotizing, non-alkali oxidizing reagent for chemical conversion into a cured, essentially reticulated resinous material portion of the intractable fabricated product, and for at least partial water-solubilization of at least a portion, of said cellulosic component(s), said strong oxidizing reagent capable of destructive attack upon at least some of said cellulosic component(s) when subjected to article-fabricating conditions, said strong oxidizing reagent being nascent-oxidation-reactant-forming and selected from the group consisting of a chlorine-releasing material, a bromine-releasing material, an oxygen-releasing material, chlorine bromine and mixtures thereof, adapted for suitably providing chlorine, bromine and/or oxygen for said chemical conversion, and (III) water, in addition to any in said cellulosic component(s), present in an amount from 0 weight percent, based on the total weight of the basic reactant mass, to that amount which is adequate to furnish sufficient moisture to the basic reactant mass in order to facilitate physical handling and said chemical conversion;

wherein said product contains a substantial amount of direct chemical bonds of a nature significantly greater in force than hydrogen bonds and van der Wall's forces among initially cellulosic molecule backbones provided by the wet newsprint, kraft paper, and/or cardboard, such that highly reticulated matrix is provided having a molecular weight substantially greater than the molecular weight of such reactant mass component(s), and said product has substantial resistance to water absorbency, and provided that said reactant mass excludes added resin-forming adduct feedstocks not of a cellulosic and other carbohydrate nature, and wherein substantially no shrinkage nor swelling of the product occurs after contact of the product, dry, with water for three days at room temperature followed by re-drying.

19. The article of claim 18, which is formed from oxidation of wet newsprint.

20. The article of claim 19, which is a molded product, wherein exterior dimensions of the re-dried article remain the same as when first molded.

* * * * *

UNITED STATES PATENT AND TRADEMARK OFFICE
CERTIFICATE OF CORRECTION

PATENT NO. : 5,348,621
DATED : September 20, 1994
INVENTOR(S) : N. Jerome Rudy, Deceased It is certified that error appears in the above-identified patent and that said Letters Patent is hereby corrected as shown below:

In the Abstract, line 2, delete "a" and insert -- as --.
In the Abstract, line 20, "substiuents" and insert
    -- substitutes --.
At Column 1, line 35, delete "190" and insert -- # --.
At Column 3, line 7, delete "natureal" and insert -- natural --.
At Column 3, line 34, delete "possibiliy(ies)" and insert
    -- possibility(ies) --.
At Column 3, line 40, delete "product" and insert -- produce --.
At Column 5, line 18, delete "12-1718" and insert -- 12-7178 --.
At Column 7, line 23, delete "staturary" and insert
    -- statuary --.
At Column 9, line 41, after "also" insert a comma.
At Column 9, line 65, delete "openable" and insert -- operable --.
At Column 10, line 16, delete "carbohdrate" and insert
    -- carbohydrate --.
At Column 10, line 37, delete "a" and insert -- as --.
At Column 11, line 4, delete "interplended" and insert
    -- interblended --.
At Column 12, line 4, delete "beeter" and insert -- better --.
At Column 13, lines 8-14, delete "It ... struc-" entirely.
At Column 26, line 15, delete "ti" and insert -- to --.
At Column 26, line 17, delete "povalent" and insert
    -- polyvalent --.

UNITED STATES PATENT AND TRADEMARK OFFICE
CERTIFICATE OF CORRECTION

PATENT NO. : 5,348,621

DATED : September 20, 1994

INVENTOR(S) : N. Jerome Rudy, Deceased

It is certified that error appears in the above-indentified patent and that said Letters Patent is hereby corrected as shown below:

At Column 26, line 20, delete "amine-substituents" and insert -- amino-substituents --.

At Column 26, line 23, delete "phenyl" and insert -- phenol --.

At Column 26, line 42, right hand side, change the formula to -- $HOC_6H_3(CH_3) \cdot CH(CH_3)_{2(1,5,2)}$ --.

At Column 26, line 45, delete "∅-hydroxyacetophenone" and insert -- o-hydroxyacetophenone --.

At Column 26, line 62, delete "icorporated" and insert -- incorporated --.

At Column 28, line 59, delete "an" and insert -- and --.

At Column 29, line 27, delete "MONDUR MR"," and insert -- "MONDUR MR", --.

At Column 30, line 32, delete "atome" and insert -- atoms --.

At Column 30, line 54, delete "substiuents" and insert -- substituents --.

At Column 30, line 56, delete "another" and insert -- other --.

At Column 30, line 58, delete "etheres" and insert -- ethers --.

At Column 31, line 22, delete the second recitation of "are."

At Column 31, line 53, delete "polyosy" and insert -- polyoxy --.

At Column 32, line 19, delete "ICII" and insert -- XCII --.

At Column 33, line 46, between "%" and "are" delete the repeated comma.

UNITED STATES PATENT AND TRADEMARK OFFICE
CERTIFICATE OF CORRECTION

PATENT NO. : 5,348,621                                   Page 3 of 4
DATED      : September 20, 1994
INVENTOR(S): N. Jerome Rudy, Deceased It is certified that error appears in the above-indentified patent and that said Letters Patent is hereby corrected as shown below:

At Column 33, line 54, after "etc." insert a comma.
At Column 34, line 59, delete "euquivalents" and insert -- equivalents --.
At Column 36, line 8, delete "no" and insert -- not --.
At Column 37, line 22, delete "micra" and insert -- mica --.
At Column 38, line 14, after "straw" insert a comma.
At Column 38, line 25, delete "uct" and insert -- ucts --.
At Column 38, line 45, delete "rom" and insert -- from --.
At Column 42, line 26, delete "form" and insert -- from --.
At Column 42, line 37, before "exactly" insert -- be --.
At Column 43, line 29, after "explained" insert a comma.
At Column 44, line 62, delete "(1980) and insert -- (1880)
At Column 45, line 64, change "that that" to -- than that --.
At Column 45, line 67, change "hydrophlic" to -- hydrophilic --.
At Column 47, line 46, delete "of" and insert -- or --.
At Column 48, line 44, change "incorate" to -- incorporate --.
At Column 51, line 37, change "must" to -- much --.
At Column 52, line 55, change "course" to -- coarse --.
At Column 52, line 58, change "aliquotes" to -- aliquots --.
At Column 53, line 3, change "therof" to -- thereof --.
At Column 53, line 55, change "end/or" to -- and/or --.
At Column 53, line 59, change "provided" to -- provide --.
At Column 55, line 35, delete "rate" and insert -- rated --.
At Column 55, line 67, change "course" to -- coarse --.
At Column 57, line 28, change "S25" to -- S2S --.
At Column 58, line 65, change "mice" to -- mica --.
At Column 58, line 67, also change "mice" to --mica--.
At Column 59, line 56, change "shedded" to -- shredded --.
At Column 61, line 30, change "revelation s" to -- revelations --.

UNITED STATES PATENT AND TRADEMARK OFFICE
CERTIFICATE OF CORRECTION

PATENT NO. : 5,348,621
DATED : September 20, 1994
INVENTOR(S) : N. Jerome Rudy, Deceased It is certified that error appears in the above-indentified patent and that said Letters Patent is hereby corrected as shown below:

```
At Column 64, line 10, delete" "wet38" and insert -- "wet" --.
At Column 65, line 29, delete "cs." and insert -- ca. --.
At Column 65, line 67, change "i." to -- i.e., --.
At Column 66, line 64, change "sew-cut" to -- saw-cut --.
At Column 70, line 46, change "mewsprint" to -- newsprint --.
At Column 71, line 18, delete "charge." Insert
   therefor -- charged --.
At Column 71, line 67, delete the period after "subsequent."
At Column 75, line 34, change "It's" to -- Its --.
At Column 76, line 40, in Claim 1, delete "curved" and insert
   therefor -- cured --.
```

Signed and Sealed this

Twenty-ninth Day of August, 1995

Attest:

BRUCE LEHMAN

*Attesting Officer*     *Commissioner of Patents and Trademarks*